United States Patent [19]
Kuzumoto et al.

[11] Patent Number: 5,948,374
[45] Date of Patent: *Sep. 7, 1999

[54] OZONE GENERATING APPARATUS

[75] Inventors: Masaki Kuzumoto; Youichiro Tabata; Shigenori Yagi; Kenji Yoshizawa; Masahiro Mukai; Junji Ochi; Tateki Ozawa, all of Hyogo, Japan

[73] Assignee: Mitsubishi Denki Kabushiki Kaisha, Tokyo, Japan

[*] Notice: This patent is subject to a terminal disclaimer.

[21] Appl. No.: 08/939,989

[22] Filed: Sep. 29, 1997

Related U.S. Application Data

[63] Continuation of application No. 08/422,900, Apr. 17, 1995, Pat. No. 5,759,497.

[30] Foreign Application Priority Data

Apr. 28, 1994 [JP] Japan ................................. 6-092718
Mar. 7, 1995 [JP] Japan ................................. 7-047647

[51] Int. Cl.⁶ .................................................. B01J 19/12
[52] U.S. Cl. ............................................... 422/186.07
[58] Field of Search ........................................ 422/186.07

[56] References Cited

U.S. PATENT DOCUMENTS

| | | | |
|---|---|---|---|
| 3,309,304 | 3/1967 | Caplan | 422/186.07 |
| 3,742,301 | 6/1973 | Burris | 317/4 |
| 3,903,426 | 9/1975 | Lowther | 250/532 |
| 3,996,474 | 12/1976 | Lowther | 250/532 |
| 4,603,031 | 7/1986 | Gelbman | 422/180.18 |
| 4,818,498 | 4/1989 | Bachhofer et al. | 422/186.2 |
| 4,960,569 | 10/1990 | Fovell et al. | 422/186.19 |
| 4,960,570 | 10/1990 | Mechtersheimer | 422/186.21 |
| 5,098,671 | 3/1992 | Shiota | 422/186.07 |
| 5,250,177 | 10/1993 | Cho | 210/192 |
| 5,254,317 | 10/1993 | Fischer et al. | 422/186.18 |
| 5,366,702 | 11/1994 | Rimpler | 422/186.07 |
| 5,413,769 | 5/1995 | Okazaki et al. | 422/186.07 |
| 5,435,978 | 7/1995 | Yokomi | 422/186.07 |
| 5,503,809 | 4/1996 | Coate et al. | 422/186.18 |
| 5,516,493 | 5/1996 | Bell et al. | 422/186.07 |
| 5,529,760 | 6/1996 | Burris | 422/186.07 |

OTHER PUBLICATIONS

Ozonizer Special committee in the Electrical Society "Ozonizer Handbook", Jun. 10, 1960.
S. D. Razumovskii and G.E. Zaikov "Ozone and its Reactions with Organic Compounds" Studies in Organic Chemistry 15.

Primary Examiner—Daniel J. Jenkins
Attorney, Agent, or Firm—Wolf, Greenfield & Sacks, P.C.

[57] ABSTRACT

There is provided a highly efficient and compact ozone generating apparatus in which a very short air gap of about 0.2 mm is formed at high accuracy. Non-discharge portions are dispersed and disposed to cover an entire discharge space, or a spacer is provided to form the non-discharge portion. Further, an elastic body is mounted on a back face of an electrode, thereby enhancing an air gap accuracy of the discharge space.

52 Claims, 35 Drawing Sheets

$$v_s = \frac{\eta_s}{d} = \frac{[O_3]}{[n_e s] \cdot d}$$

O : OXYGEN
+ : AIR

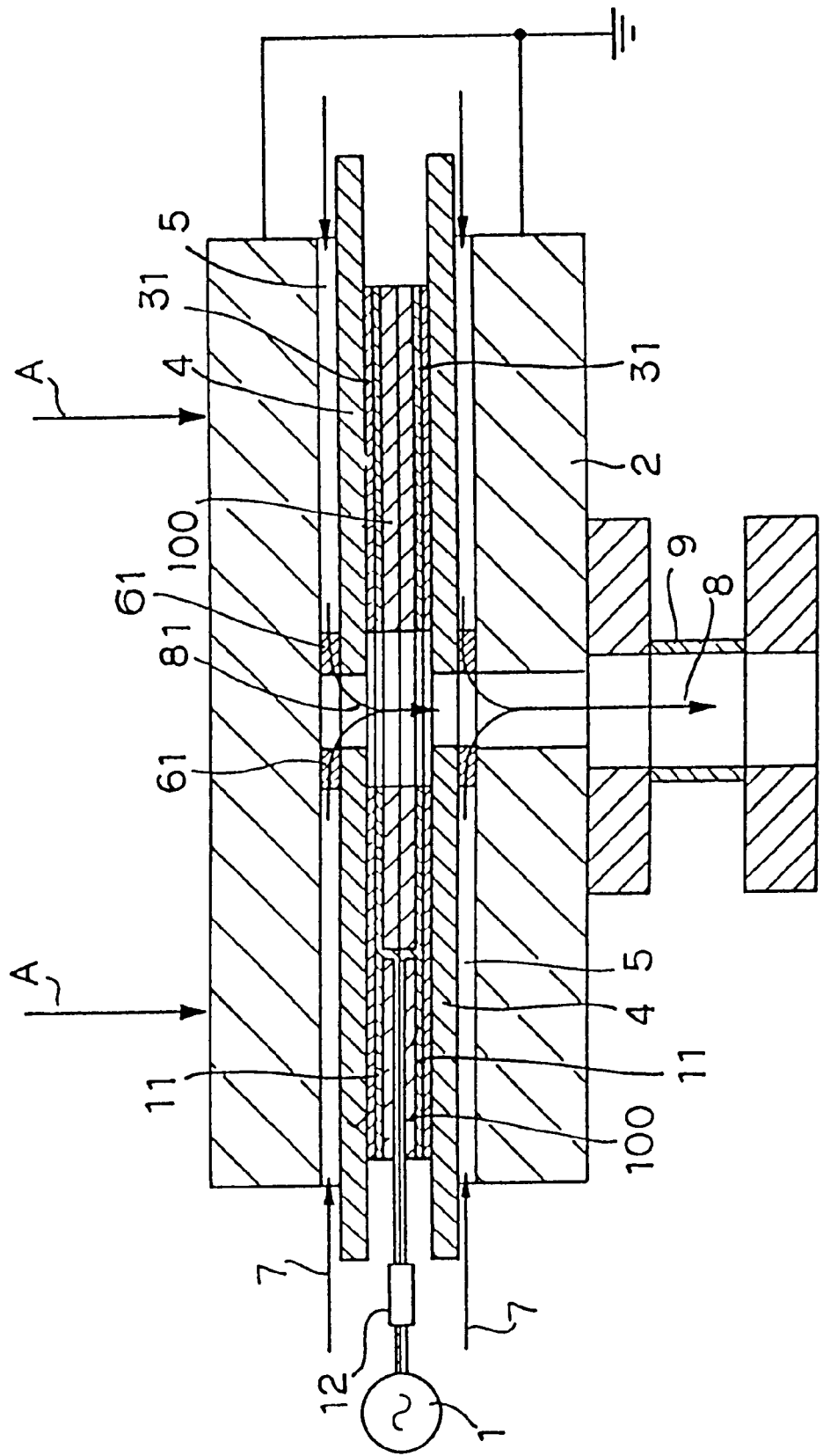

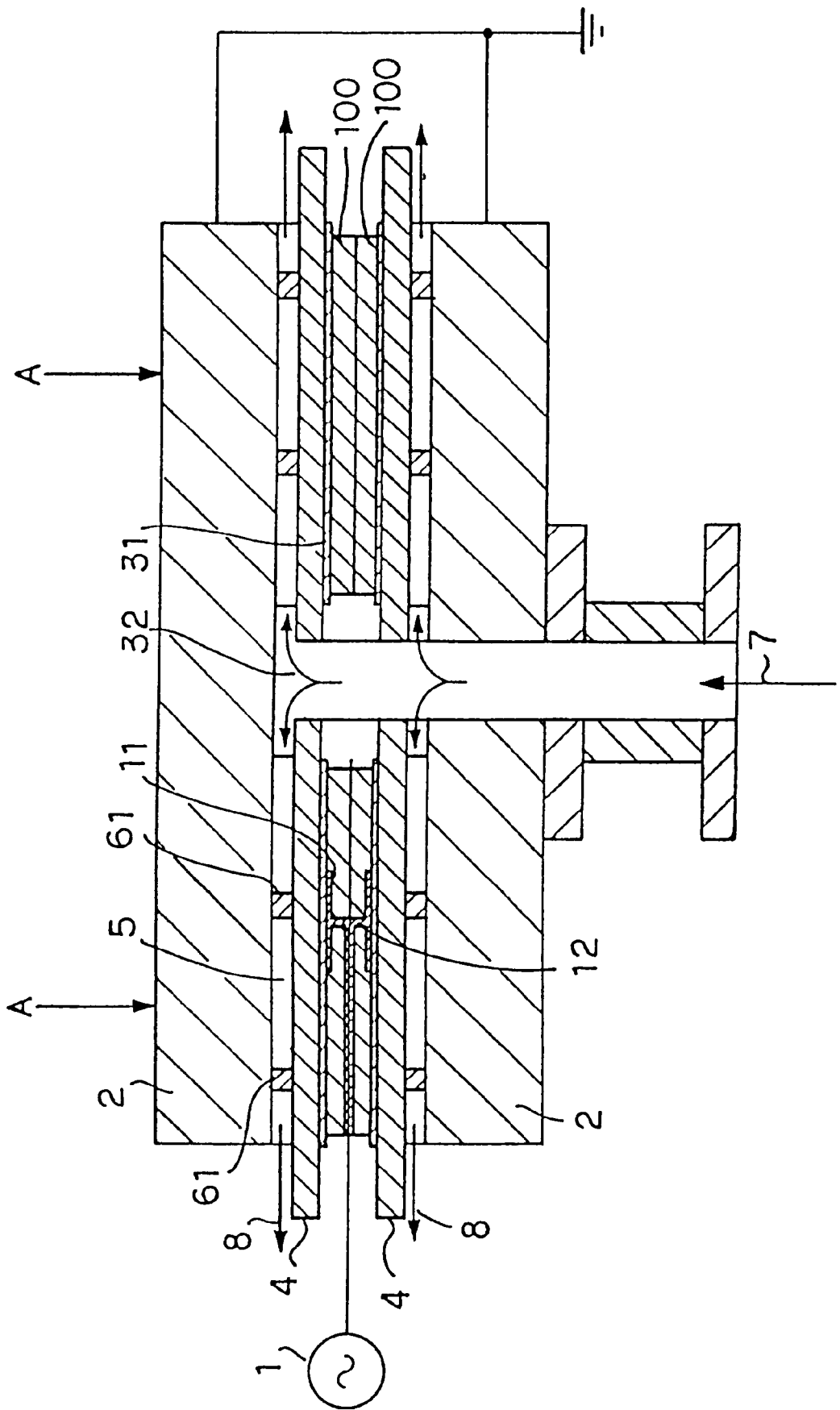

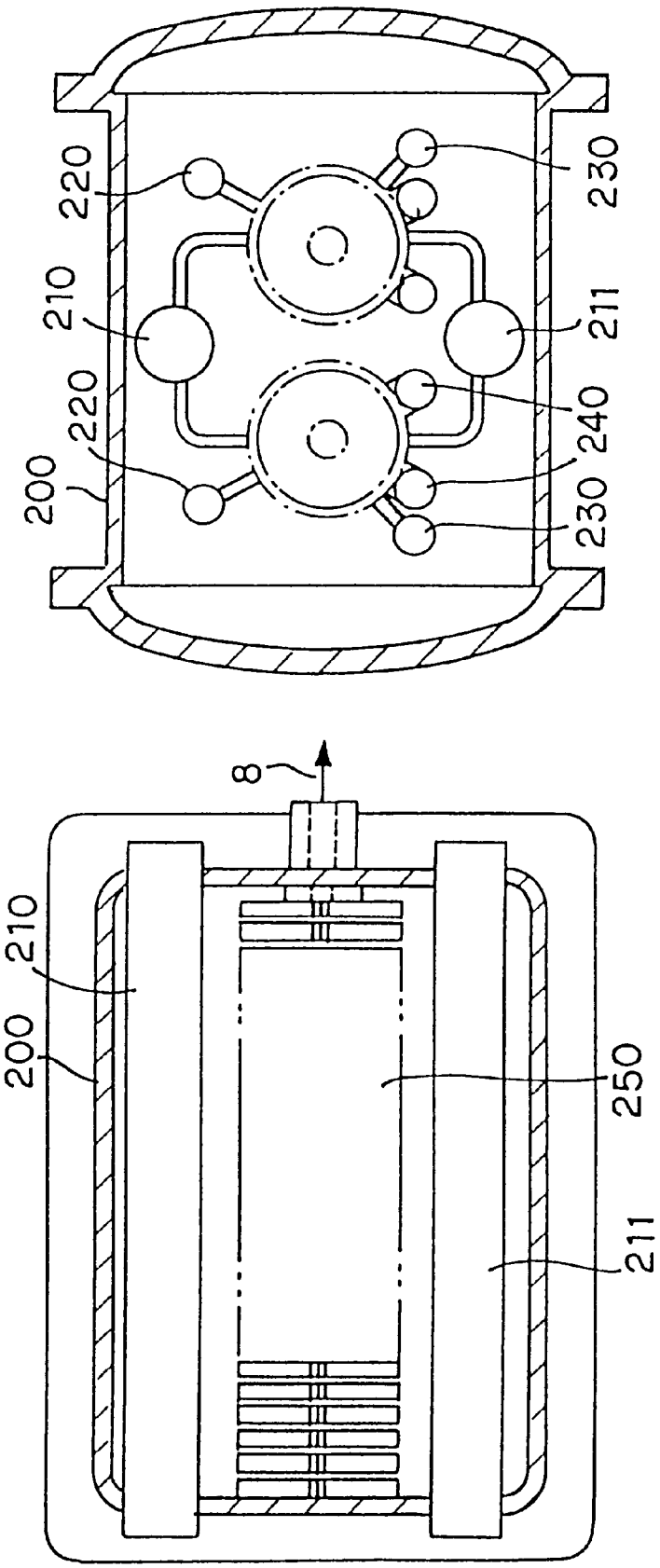

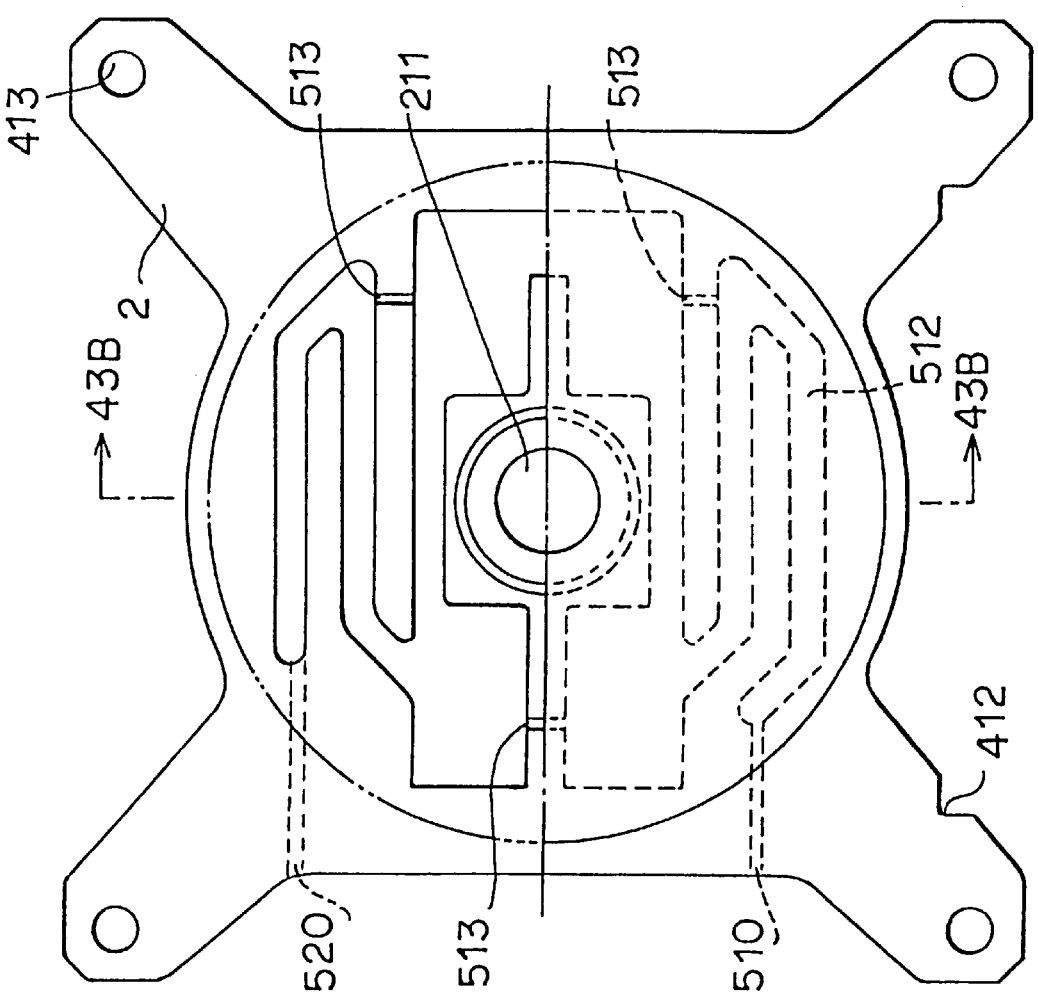
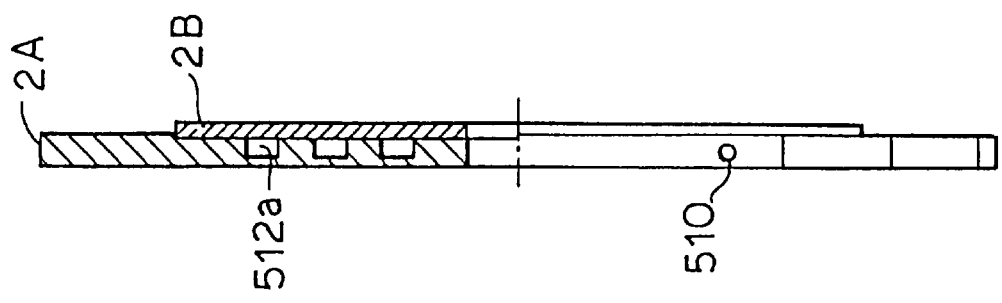

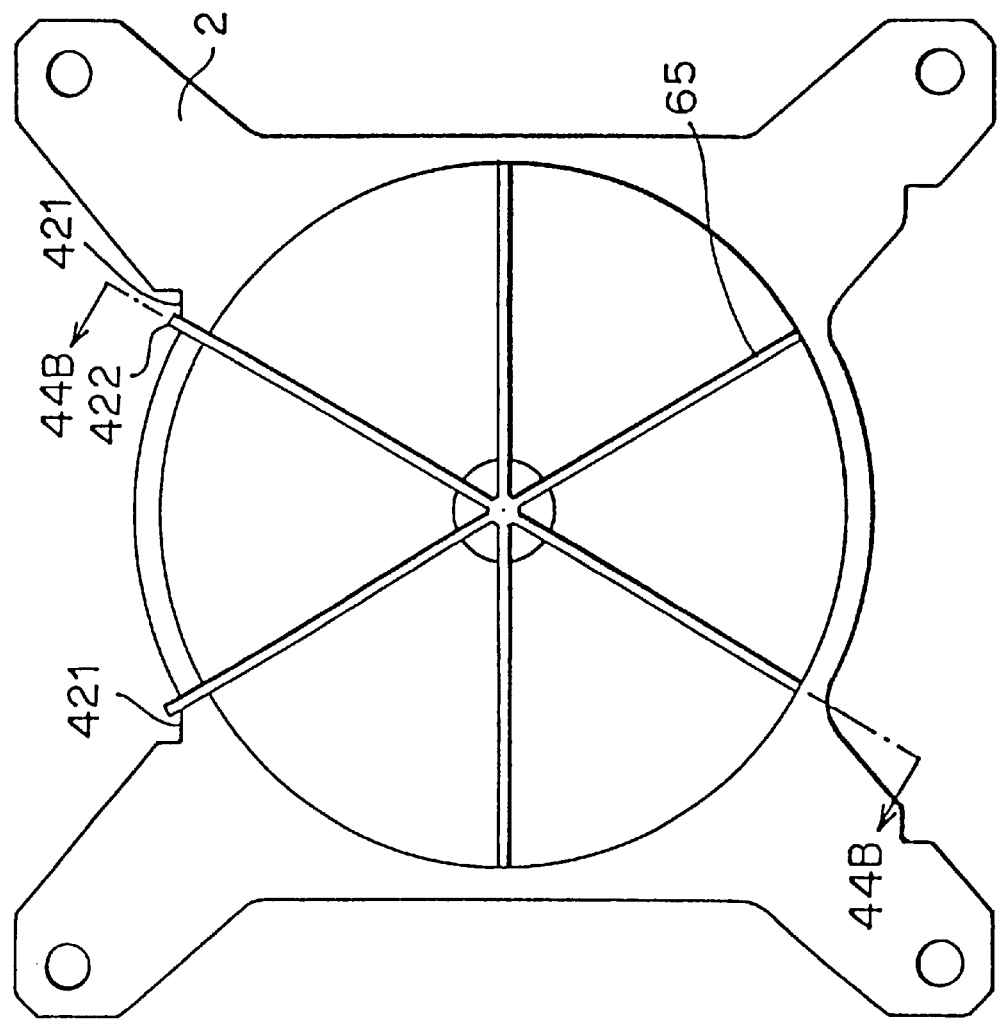
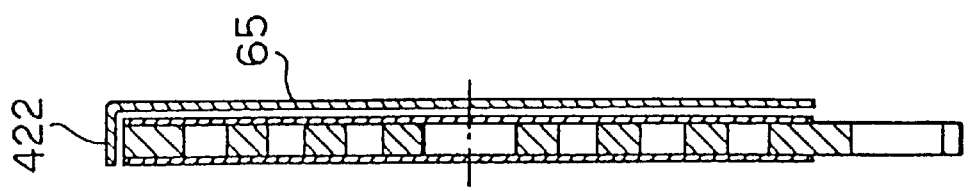

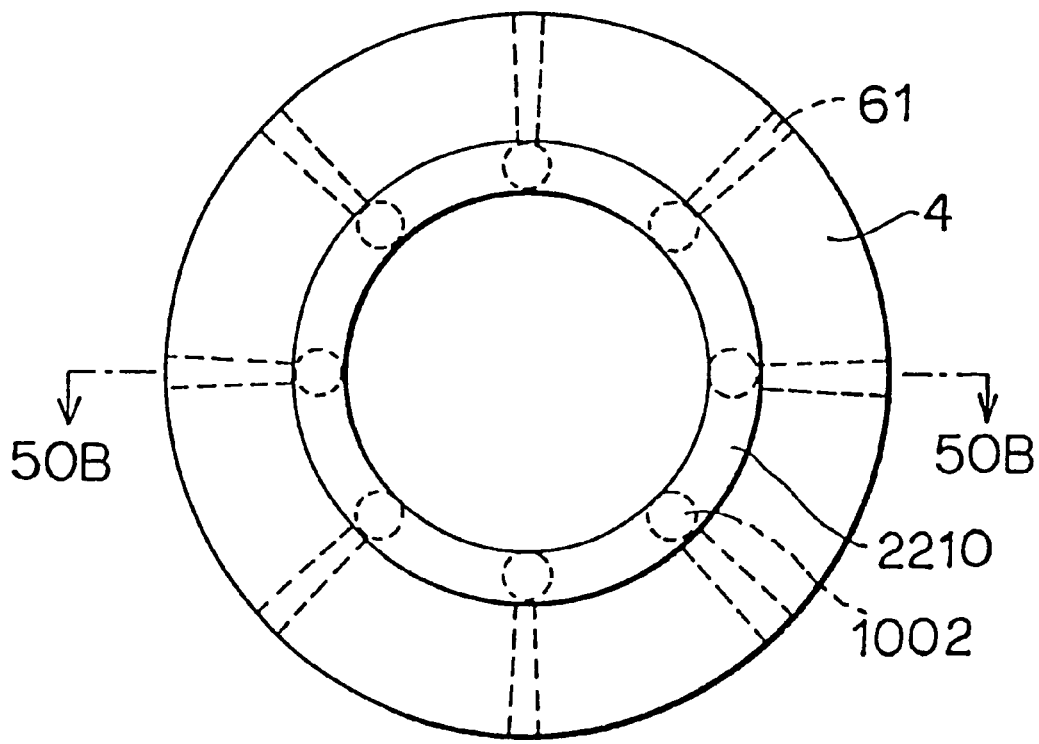
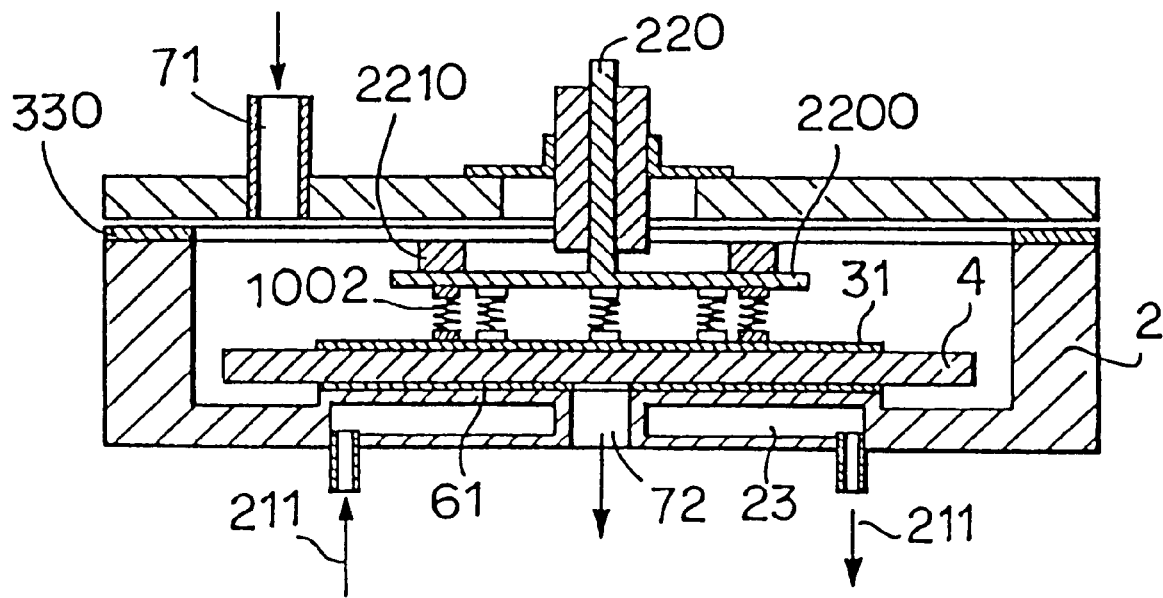

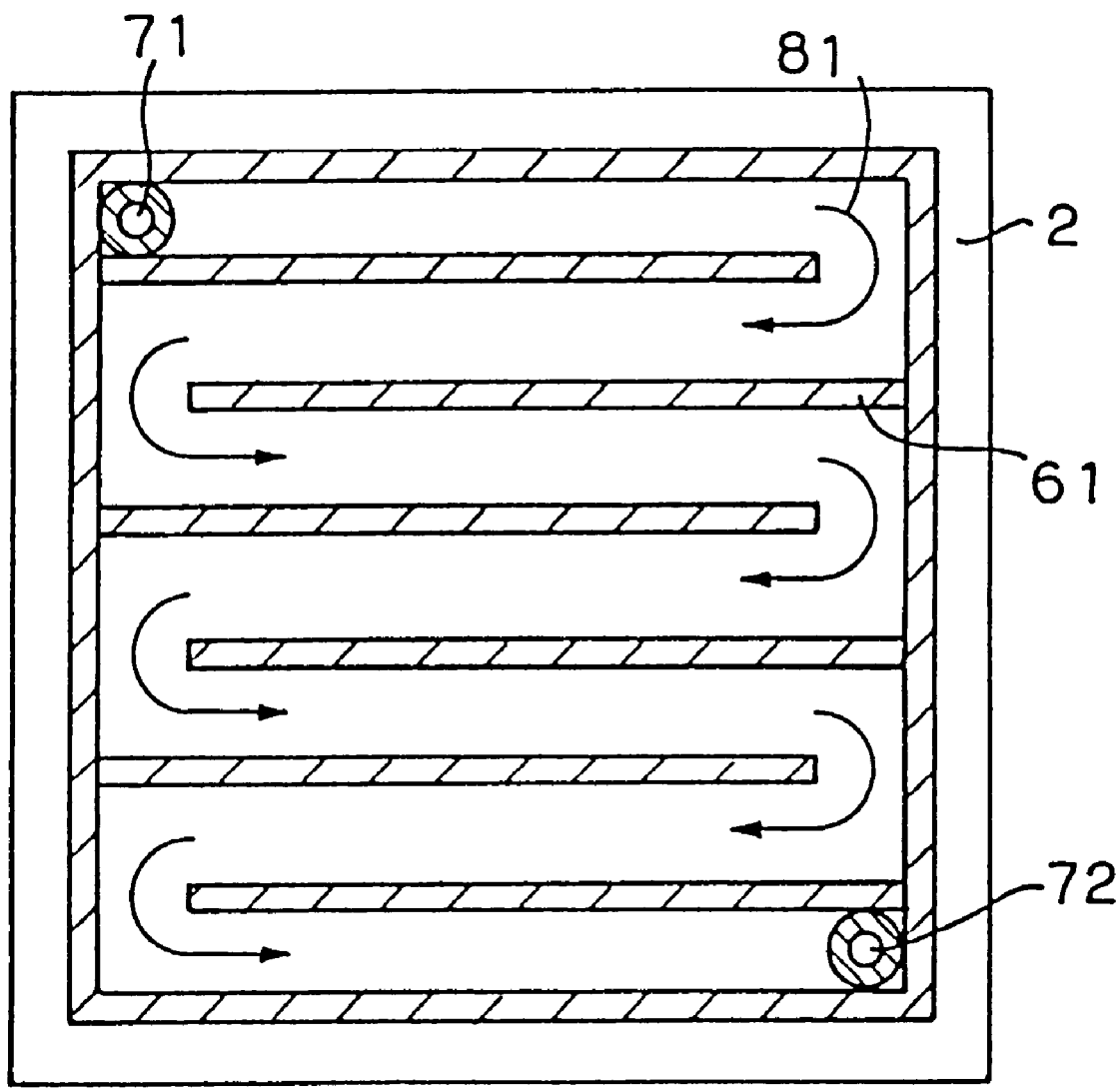

OZONE GENERATING APPARATUS

This application is a continuation of application Ser. No. 08/422,900, filed Apr. 17, 1995, entitled OZONE GENERATING APPARATUS and now U.S. Pat. No. 5,759,497.

BACKGROUND OF THE INVENTION

1. Field of the Invention

The present invention relates to an ozone generating apparatus, and more particularly to an ozone generating apparatus which can generate high concentration ozone at high efficiency.

2. Description of the Related Art

FIG. 1A is a sectional view showing a conventional ozone generating apparatus of a so-called Otto-Plate type which is disclosed in, for example, Ozonizer Handbook, Ozonizer Ad Hoc Committee in the Institute of Electrical Engineers of Japan, (Corona Publishing Co.,Ltd., 1960) p.249, and FIG. 1B is a front view of a left half of the ozone generating apparatus. In the drawings, reference numeral 1 means a power source, 2 is grounded metallic electrodes, and 3 is high-voltage electrodes opposed to the grounded electrodes 2 and connected to the power source 1, and high voltage is applied to the high-voltage electrodes 3. Further, reference numeral 4 means dielectrics (glass plates) mounted on surfaces of the grounded electrodes 2 and the high-voltage electrodes 3, 5 is a discharge space in which discharge is generated, and 6 is electrical insulating (dielectric) spacers to form the discharge spaces 5. Reference numerals 7 and 8 mean arrows respectively showing a gas supply port and gas exhaust ports, and 9 is an exhaust pipe to exhaust an ozonized gas. FIG. 2A is a sectional view showing another ozone generating apparatus of a so-called Lowther Plate type disclosed in, for example, S. D. Razumovskii et al., Ozone and its reactions with organic compounds, ELSEVIER, (1984), and FIG. 2B is a sectional view taken along line B—B of FIG. 2A. In the drawings, the same reference numerals are used for component parts having the same functions as those in FIGS. 1A and 1B, and descriptions thereof are omitted. Reference numeral 41 means ceramic layers applied onto the grounded electrodes 2 and 3, having the same function as that of the glass plates 4.

A description will now be given of the operation. In the conventional ozone generating apparatus, a.gas exhausting hole is provided in the grounded electrode 2, the high-voltage electrode 3, and the dielectric plate 4 at their intermediate portions. In the above publication disclosing the Otto-Plate type of apparatus, no description is given of the spacer 6. However, as shown in FIG. 47, in order to ensure an interval (an air gap length) between the dielectrics 4, 4, the electrical insulating spacer is mounted around the discharge space 5 in reality in such a way that the spacer does not interfere with a gas inflow. An oxygen-containing raw gas is introduced in a direction of the arrow 7 from an entire circumference of a peripheral portion of the ozone generating apparatus. Then, oxygen is partially turned into ozone when the gas passes through the discharge space 5 in which the discharge is caused by high voltage supplied from the power source 1. As a result, the ozone-containing gas is taken out as an ozonized gas in a direction of the arrow 8 through the gas exhausting pipe 9 mounted at the intermediate portion.

In the discharge spaces 5, heat is generated due to the discharge. Consequently, if the gas passing through the discharge space 5 is not effectively cooled, a gas temperature in the discharge space 5 is increased, and an amount of ozone generation is reduced. Hence, the grounded electrodes 2 and the high-voltage electrodes 3 are cooled by electrical insulating liquid such as insulating oil, thereby reducing a rise of the gas temperature.

The ozone generating apparatus in FIGS. 2A and 2B has the same basic structure as that of the ozone generating apparatus shown in FIGS. 1A and 1B. In this case, the two ozone generating apparatus are different from an ozone generating apparatus shown in FIG. 47 in that the gas supply port and the gas exhaust port are separately mounted, and the gas flows in a direction shown in the drawings. Further, in the ozone generating apparatus shown in FIGS. 1A and 1B, the electrical insulating spacers 6 (made of, for example, silicone) are illustrated. The spacers 6 can ensure the interval (the air gap length) between the electrodes 2 and 3, and are used as sealing members to prevent gas leakage from the discharge spaces.

A description will now be given of a characteristic of the conventional ozone generating apparatus with reference to FIGS. 3 to 6. In the drawings, reference numeral $Q_N$ means a flow rate of the raw gas (converted according to Standard Temperature and Pressure [STP]), W is discharge power, $C_{O3}$ is an ozone concentration (converted according to STP) at the gas exhausting port of a discharge portion, $T_w$ is a temperature of cooling water, d is a discharge gap length, S is a discharge area between the electrodes 2 and 3, and $\eta$ is ozone yield. $W/Q_N$ means discharge power consumption per gas molecule, and serves as an important parameter of an ozone generation characteristic. W/S means discharge power (power density) per unit area of the discharge space between the electrodes 2 and 3, and serves as a parameter reflecting the gas temperature. The ozone yield $\eta$ means the amount of ozone generation per unit discharge power, and can be expressed as $\eta = C_{O3}/(W/Q_N)$. In view of performances (about a compact size and an efficiency) of the ozone generating apparatus, $\eta$ and W/S are preferably set to larger values, and $C_{O3}$ is also preferably set to a larger value.

FIG. 3 is a diagram showing a relationship between power consumption per molecule $W/Q_N$ and the ozone concentration $C_{O3}$ when the power density W/S and the discharge gap length d are kept constant, and the temperature of cooling water is varied. As set forth above, the power consumption per molecule $W/Q_N$ serves as a basic parameter related to ozone generation, and the ozone yield $\eta$ is more reduced as the power consumption $W/Q_N$ is more increased (in the drawing, the straight lines can be described when the ozone yield $\eta$ is constant, and the ozone yield $\eta$ becomes larger in the upper line). Further, the temperature $T_w$ of cooling water does not have a great effect when the power consumption $W/Q_N$ is small. However, when the power consumption $W/Q_N$ becomes larger, the ozone concentration $C_{O3}$ (and the ozone yield $\eta$) becomes larger as the temperature $T_w$ of cooling water becomes lower. That is, for higher concentration ozone, it is important to set a low temperature of cooling water and keep a low gas temperature.

FIG. 4 shows a relationship between the power consumption $W/Q_N$ and the ozone concentration $C_{O3}$ when the temperature $T_w$ of cooling water and the discharge gap length d are kept constant, and the power density W/S is varied. It can be understood that an increase in the power consumption W/S results in the same effect as that obtained by an increase in the temperature $T_w$ of cooling water in FIG. 3. This is because the increase in the power consumption W/S and the increase in the temperature $T_w$ of cooling water can have the same effect on an increase in the gas temperature in the discharge space 5.

FIG. 5 shows the ozone concentration $C_{O3}$ with respect to the power consumption $W/Q_N$ when the temperature $T_w$ of cooling water and the power density W/S are kept constant, and the discharge gap length d is varied in the range from 0.8 to 1.6 mm. An increase in the discharge gap length d can provide an effect which is very similar to the effect obtained by the increase in the temperature $T_W$ of cooling water.

Here, when an average gas temperature $\theta_{av}$ in the discharge space is defined as the following expression (1), another average gas temperature in the discharge space of the ozone generating apparatus in which the only single side of the electrodes is cooled can be represented by the expression (2). Further, the expression (3) can be held when both sides of the electrodes are cooled.

$$\theta_{av} \equiv \frac{1}{d}\int_0^d \theta(x)dx \quad (1)$$

$$\theta_{av} \equiv \frac{1}{d}\int_0^d \theta(x)dx = \frac{W/S}{3k_a}d + T_W \quad (2)$$

$$\theta_{av} \equiv \frac{1}{d}\int_0^d \theta(x)dx = \frac{W/S}{12k_a}d + T_W \quad (3)$$

where x denotes a distance in an air gap direction, d is the discharge gap length, $\theta(x)$ is the gas temperature in case of the distance x, ka is coefficient of heat transfer of the gas, and $T_W$ is the temperature of cooling water.

From the expressions (1) to (3), though different coefficients are required according to methods of cooling the electrode, it can be seen that the average gas temperature $\theta_{av}$ is proportional to the discharge power density W/S and the air gap length d. That is, when the air gap length d is set to a small value, the average gas temperature $\theta_{av}$ can be limited to a lower value even if constant power is supplied, resulting in the high concentration ozone as in the case of d=0.8 mm in FIG. 5. However, when the set air gap length d is extremely short, and a plurality of ozone generating units are provided to have a multi-stage structure, a larger variation is generated in the air gap length d of the discharge space of the ozone generating units. Therefore, another variation is caused in the flow rates $Q_N$ of gases passing through the discharge spaces, thereby causing still another variation in the discharge power W supplied into the discharge spaces. As a result, the equivalent power consumption $W/Q_N$ is increased so that an ozone generating efficiency is reduced as shown in FIGS. 3 to 5. Further, as shown in FIG. 6, it is known that an excessively small air gap length d lowers an ozone exciting efficiency itself. FIG. 6 is a diagram illustrated in Czech, J. Phys., B38, (1988), FIG. 7, p.648, in which the transverse axis defines the air gap length, and the ordinate axis defines the ozone generating efficiency. Further, the symbols ○ and + respectively represent the results of two cases, that is, one case where air is used as the raw gas and the other case where oxygen is used as the raw gas. The article teaches that the optimal air gap length for the ozone generation is in an approximate range of 0.8 to 1.1 mm (see the first line on page 645). In particular, it is emphasized that a narrow air gap of 0.6 mm or less reduces the ozone exciting efficiency. Hence, in the conventional ozone generating apparatus, the air gap length d is set in the range of 0.8 to 1.5 mm, and a thermal problem is avoided by operation with the power density W/S in a low range. That is, the apparatus is designed to have a large form and have a large discharge area, thereby improving the ozone generating efficiency.

The conventional ozone generating apparatus is provided as set forth above. As a result, there are problems in that, for example, a low gas temperature in the discharge space should be held, and for this purpose, the power density W/S should be reduced by providing the large ozone generating apparatus and the large discharge area S.

SUMMARY OF THE INVENTION

In order to overcome the problems as described above, it is a first object of the present invention to provide an ozone generating apparatus in which a very short air gap length of about 0.6 mm or less can be provided at high efficiency, a high cooling performance of a gas can be provided, a simple structure and a compact shape can be realized, and high concentration ozone can be obtained.

It is a second object of the present invention to provide an inexpensive ozone generating apparatus which includes a small number of parts, and can be easily fabricated.

It is a third object of the present invention to provide a large-capacity ozone generating apparatus having a good ozone generating efficiency.

It is a fourth object of the present invention to provide an ozone generating apparatus which is also suitable even when water leakage may occur or a pressure loss in a gas passage should be reduced.

It is a fifth object of the present invention to provide an ozone generating apparatus having good durability.

It is a sixth object of the present invention to provide an ozone generating apparatus which can facilitate operation such as assembly operation, check operation, replacement operation for electrodes.

It is a seventh object of the present invention to provide an ozone generating apparatus causing no gas leakage.

It is an eighth object of the present invention to provide an ozone generating apparatus in which electrodes of ozone generating units can be easily positioned during installation of the electrodes, and maintenance can be carried out in a short time.

It is a ninth object of the present invention to provide an ozone generating apparatus in which ozone generating units can be easily assembled, and water leakage hardly occurs in a main body.

It is a tenth object of the present invention to provide an ozone generating apparatus in which, when ozone generating units are stacked to provide a multi-stage structure, a gas passing through the ozone generating units never leaks without discretely preparing a vessel for accommodating the stacked ozone generating units.

It is an eleventh object of the present invention to provide an inexpensive and light ozone generating apparatus having an excellent cooling performance.

It is a twelfth object of the present invention to provide an easy-assembling ozone generating apparatus in which a spacer can be easily mounted between electrodes even when a plurality of ozone generating units are stacked in a horizontal direction.

According to the first aspect of the present invention, for achieving the above-mentioned objects, there is provided an ozone generating apparatus in which gas pressure in a discharge space is set to a value of one atmosphere or more, and a discharge gap length is set to a value of 0.4 mm or less.

As stated above, in the ozone generating apparatus according to the first aspect of the present invention, the gas pressure is set to the value of one atmosphere or more, and the discharge gap length is set to the value of 0.4 mm or less. Consequently, it is possible to realize discharge having a large converted electric field, that is, large electronic energy.

As a result, it is possible to reduce ozone decomposition due to low energy electron, and provide very high concentration ozone.

According to the second aspect of the present invention, there is provided an ozone generating apparatus in which a discharge gap length is set to a value of 0.6 mm or less, and the product pd of the discharge gap length d and a gas pressure p is set to a value of 120 Torr·cm or more.

As stated above, in the ozone generating apparatus according to the second aspect of the present invention, the discharge gap length d is set to the value of 0.6 mm or less, and the product pd of the air gap length d of the discharge space and the gas pressure p is set to the value of 120 Torr·cm or more. Consequently, it is possible to reduce production of nitrogen oxide $NO_x$ even when the discharge gap length is short, and realize highly efficient ozone generation even when a raw gas having a high nitrogen partial pressure is employed.

According to the third aspect of the present invention, there is provided an ozone generating apparatus in which non-discharge portions are dispersed and disposed to cover an entire discharge space of the ozone generating unit.

As stated above, in the ozone generating apparatus according to the third aspect of the present invention, the non-discharge portions are dispersed and disposed to cover the entire discharge space. Consequently, it is possible to realize the discharge space having a uniform and very short air gap, thereby cooling a gas at high efficiency and reducing thermal decomposition process of ozone. Further, when a plurality of ozone generating units are used to form a large-capacity ozone generating apparatus, a good air gap accuracy causes no variation in a gas flow rate in the discharge spaces and no variation in discharge power supplied into the discharge spaces. Consequently, it is possible to provide a highly efficient large-capacity ozone generating apparatus.

According to the fourth aspect of the present invention, there is provided an ozone generating apparatus in which an electrode of an ozone generating unit is provided in a flat form.

As stated above, in the ozone generating apparatus according to the fourth aspect of the present invention, the electrode of the ozone generating unit is provided in the flat form. Consequently, it is possible to extremely easily form a discharge space having a uniform and very short air gap.

According to the fifth aspect of the present invention, there is provided an ozone generating apparatus in which adjacent units are mutually opposed and stacked such that adjacent electrodes of the adjacent ozone generating units are held at the same potential.

As stated above, in the ozone generating apparatus according to the fifth aspect of the present invention, the adjacent ozone generating units are mutually opposed and stacked such that the adjacent electrodes are held at the same potential. Consequently, it is possible to provide a compact ozone generating apparatus having a simple structure.

According to the sixth aspect of the present invention, there is provided an ozone generating apparatus in which high voltage having anti-phases are applied to two electrodes.

As stated above, in the ozone generating apparatus according to the sixth aspect of the present invention, the high voltage having anti-phases are respectively applied to the two electrodes so as to form an electric field for discharge. Consequently, it is advantageously possible to halve a necessary insulating distance to the ground, and provide a more compact ozone generating apparatus.

According to the seventh aspect of the present invention, there is provided an ozone generating apparatus in which a conduction layer is formed on an area corresponding to a discharge portion of the ozone generating unit, and the conduction layer is employed as at least one of electrodes.

As stated above, in the ozone generating apparatus according to the seventh aspect of the present invention, voltage is applied to only a discharge space, and no power is supplied to a non-discharge portion. Consequently, no induced current flows in the non-discharge portion, and in addition to the effects, the power can be efficiently poured into the discharge portion.

According to the eighth aspect of the present invention, there is provided an ozone generating apparatus in which an area of a non-discharge portion is set in an approximate range of 0.5 to 120% of an area of a discharge portion.

As stated above, in the ozone generating apparatus according to the eighth aspect of the present invention, the area of the non-discharge portion is set in the approximate range of 0.5 to 120% of the area of the discharge portion. Consequently, it is advantageously possible to realize a 10% or more rise of an ozone generating efficiency.

According to the ninth aspect of the present invention, there is provided an ozone generating apparatus in which a grounded electrode and a non-conductive portion are integrally formed.

As stated above, in the ozone generating apparatus according to the ninth aspect of the present invention, the electrode and the non-conductive portion are integrally formed. Consequently, it is possible to provide an inexpensive ozone generating apparatus which includes a small number of parts, and can be easily fabricated.

According to the tenth aspect of the present invention, there is provided an ozone generating apparatus in which a convex portion and a concave portion are provided for a surface of a metallic electrode to form a non-conductive portion and a conductive portion.

As stated above, in the ozone generating apparatus according to the tenth aspect of the present invention, the convex portion and the concave portion are provided for the surface of the metallic electrode to form the discharge portion and the non-discharge portion. Consequently, it is possible to provide an inexpensive ozone generating apparatus which includes a small number of parts, and can be easily fabricated.

According to the eleventh aspect of the present invention, there is provided an ozone generating apparatus in which a dielectric and a non-discharge portion of an ozone generating unit are integrally formed.

As stated above, in the ozone generating apparatus according to the eleventh aspect of the present invention, the dielectric and the non-discharge portion are integrally formed. Consequently, it is possible to provide an inexpensive ozone generating apparatus which includes a small number of parts, and can be easily fabricated.

According to the twelfth aspect of the present invention, there is provided an ozone generating apparatus in which a convex portion and a concave portion are provided for a surface of a dielectric of an ozone generating unit to form a non-discharge portion and a discharge space.

As stated above, in the ozone generating apparatus according to the twelfth aspect of the present invention, the convex portion and the concave portion are provided for the surface of the dielectric to form the non-discharge portion and the discharge space. Consequently, it is possible to provide an inexpensive ozone generating apparatus which includes a small number of parts, and can be easily fabricated.

According to the thirteenth aspect of the present invention, there is provided an ozone generating apparatus in which a surface of an electrode of an ozone generating unit is cut to form a convex portion and a concave portion.

As stated above, in the ozone generating apparatus according to the thirteenth aspect of the present invention, the surface of the electrode is cut to form the convex portion and the concave portion. Consequently, it is possible to provide an inexpensive ozone generating apparatus which can be easily machined, and includes a small number of parts.

According to the fourteenth aspect of the present invention, there is provided an ozone generating apparatus in which the same or different types of materials are deposited on a surface of an electrode of an ozone generating unit to form a convex portion and a concave portion.

As stated above, in the ozone generating apparatus according to the fourteenth aspect of the present invention, the same or different types of materials are deposited on the surface of the electrode to form the concave portion and the convex portion. Consequently, it is possible to provide an inexpensive ozone generating apparatus which can be easily machined, and includes a small number of parts.

According to the fifteenth aspect of the present invention, there is provided an ozone generating apparatus in which a surface of a dielectric of an ozone generating unit is cut to form a convex portion and a concave portion.

As stated above, in the ozone generating apparatus according to the fifteenth aspect of the present invention, the surface of the dielectric is cut to form the convex portion and the concave portion. Consequently, it is possible to provide an inexpensive ozone generating apparatus which can be easily machined, and includes a small number of parts.

According to the sixteenth aspect of the present invention, there is provided an ozone generating apparatus in which the same or different types of materials are deposited on a surface of a dielectric of an ozone generating unit to form a convex portion and a concave portion.

As stated above, in the ozone generating apparatus according to the sixteenth aspect of the present invention, the same or different types of materials are deposited on the surface of the dielectric to form the concave portion and the convex portion. Consequently, it is possible to provide an inexpensive ozone generating apparatus which can be easily machined, and includes a small number of parts.

According to the seventeenth aspect of the present invention, there is provided an ozone generating apparatus in which at least one of electrodes, a non-discharge portion, and a dielectric of the ozone generating unit are integrally formed.

As stated above, in the ozone generating apparatus according to the seventeenth aspect of the present invention, the electrode, the non-discharge portion and the dielectric are integrally formed. Consequently, it is possible to provide an inexpensive ozone generating apparatus which includes a small number of parts, and can be easily made.

According to the eighteenth aspect of the present invention, there is provided an ozone generating apparatus in which at least one of electrodes of an ozone generating unit is fitted with a dielectric.

As stated above, in the ozone generating apparatus according to the eighteenth aspect of the present invention, the electrode is fitted with the dielectric. Consequently, in addition to the above effects, it is possible to enhance a position accuracy of the electrode.

According to the nineteenth aspect of the present invention, there is provided an ozone generating apparatus in which a gas passage is defined by a discharge portion and a non-discharge portion in an ozone generating unit.

As stated above, in the ozone generating apparatus according to the nineteenth aspect of the present invention, the discharge portion and the non-discharge portion are provided to define the gas passage. Consequently, it is possible to realize a discharge space having a very short air gap, cool a gas at high efficiency, and reduce thermal decomposition process of ozone.

According to the twentieth aspect of the present invention, there is provided an ozone generating apparatus in which a non-discharge portion is disposed to provide a radial gas passage.

As stated above, in the ozone generating apparatus according to the twentieth aspect of the present invention, the gas passage is provided in a radial form. Consequently, it is possible to realize a discharge space having a uniform and very short air gap, cool a gas at high efficiency, and reduce thermal decomposition process of ozone.

According to the twenty-first aspect of the present invention, there is provided an ozone generating apparatus in which a non-discharge portion is disposed to provide a spiral gas passage.

As stated above, in the ozone generating apparatus according to the twenty-first aspect of the present invention, the gas passage is provided in a spiral form. Consequently, in addition to the effects, it is possible to provide a uniform gas flow.

According to the twenty-second aspect of the present invention, there is provided an ozone generating apparatus in which non-discharge members are disposed in a stepping stone fashion between electrodes of an ozone generating unit to form a non-discharge portion.

As stated above, in the ozone generating apparatus according to the twenty-second aspect of the present invention, the non-discharge members are disposed in the stepping stone fashion. Consequently, it is possible to realize a discharge space having a uniform and very short air gap, cool a gas at high efficiency, and reduce thermal decomposition process of ozone.

According to the twenty-third aspect of the present invention, there is provided an ozone generating apparatus in which a gas supply mechanism supplies a gas between electrodes through a center portion of the electrode of an ozone generating unit, and exhausts the gas along a gas passage to an outer peripheral portion of the electrode.

As stated above, in the ozone generating apparatus according to the twenty-third aspect of the present invention, the gas is supplied through the center portion and is exhausted to the outer peripheral portion. Consequently, the gas passage can be provided to have a low pressure loss, and an amount of moisture in a discharge space is not increased even in case of water leakage, resulting in no reduction of an ozone generating efficiency.

According to the twenty-fourth aspect of the present invention, there is provided an ozone generating apparatus in which a gas supply mechanism supplies a gas between electrodes from an outer peripheral portion of the electrode of an ozone generating unit and exhausts to a center portion of the electrode along a gas passage.

As stated above, in the ozone generating apparatus according to the twenty-fourth aspect of the present invention, the gas is introduced from the outer peripheral portion to the center portion in the ozone generating unit. Consequently, in addition to the above effects, a relatively low pressure loss can be provided in a gas downstream area, and an amount of moisture in a discharge space is not increased. Therefore, the ozone generating apparatus can be preferably operated when water leakage may occur, or a pressure loss in the gas passage should be reduced.

According to the twenty-fifth aspect of the present invention, there is provided an ozone generating apparatus in which a spacer is inserted into a discharge space, and the spacer forms a non-discharge portion causing no discharge.

As stated above, in the ozone generating apparatus according to the twenty-fifth aspect of the present invention, the spacer forms the non-discharge portion. Consequently, it is possible to ensure a good air gap accuracy between electrodes of an ozone generating unit, and optionally define a discharge space so as to realize the discharge space having a uniform and very short air gap. Therefore, high concentration ozone can be generated in a compact shape.

According to the twenty-sixth aspect of the present invention, there is provided an ozone generating apparatus in which a spacer is made of metal.

As stated above, in the ozone generating apparatus according to the twenty-sixth aspect of the present invention, the spacer is made of metal. Consequently, it is possible to ensure sufficient rigidity, improve an air gap length accuracy, and easily form a discharge portion and a non-discharge portion by using electrical conductivity of the spacer.

According to the twenty-seventh aspect of the present invention, there is provided an ozone generating apparatus in which a spacer includes a dielectric.

As stated above, in the ozone generating apparatus according to the twenty-seventh aspect of the present invention, the spacer includes the dielectric. Consequently, it is possible to easily form a discharge portion and a non-discharge portion by using electrical conductivity of the spacer.

According to the twenty-eighth aspect of the present invention, there is provided an ozone generating apparatus in which a spacer is provided in a flat form.

As stated above, in the ozone generating apparatus according to the twenty-eighth aspect of the present invention, the spacer is provided in the flat form. Consequently, it is possible to easily form a highly accurate air gap length.

According to the twenty-ninth aspect of the present invention, there is provided an ozone generating apparatus in which a spacer is provided in a thread-like form.

As stated above, in the ozone generating apparatus according to the twenty-ninth aspect of the present invention, the spacer is provided in the thread-like form. Consequently, it is possible to provide an optional air gap length at low cost.

According to the thirtieth aspect of the present invention, there is provided an ozone generating apparatus in which spacers are dispersed and disposed to cover an entire surface of an electrode of an ozone generating unit.

As stated above, in the ozone generating apparatus according to the thirtieth aspect of the present invention, the spacers are dispersed and disposed to cover the entire area of the electrode. Consequently, it is possible to realize a discharge space having a uniform and very short air gap.

According to the thirty-first aspect of the present invention, there is provided an ozone generating apparatus in which an elastic body is mounted onto a back face of one of electrodes of an ozone generating unit to cover substantially the entire back face of the electrode.

As stated above, in the ozone generating apparatus according to the thirty-first aspect of the present invention, the elastic body is mounted onto the back face of one of the electrodes to cover substantially the entire back face of the electrode. Consequently, it is possible to previously avoid breakage of a dielectric and reduction of an air gap accuracy of a discharge space, and realize a stable ozone generating apparatus.

According to the thirty-second aspect of the present invention, there is provided an ozone generating apparatus in which a spring body is used as an elastic body.

As stated above, in the ozone generating apparatus according to the thirty-second aspect of the present invention, the elastic body include the spring body. Consequently, it is possible to provide an inexpensive elastic body which can be easily mounted and replaced.

According to the thirty-third aspect of the present invention, there is provided an ozone generating apparatus in which an annular spring body is used as an elastic body.

As stated above, in the ozone generating apparatus according to the thirty-third aspect of the present invention, the elastic body includes the annular spring body. Consequently, it is possible to completely avoid gas leakage.

According to the thirty-fourth aspect of the present invention, an annular portion of an elastic body is partially provided with a gap to discharge air from the elastic body.

As stated above, in the ozone generating apparatus according to the thirty-fourth aspect of the present invention, the annular elastic body is partially provided with the gap. Consequently, no stress is applied to an elastic body portion and a dielectric portion even when outside atmospheric pressure is varied.

According to the thirty-fifth aspect of the present invention, there is provided an ozone generating apparatus in which an elastic body includes an elastic body made of Kovar material.

As stated above, in the ozone generating apparatus according to the thirty-fifth aspect of the present invention, the elastic body is made of Kovar material. Consequently, it is possible to provide the elastic body at low cost.

According to the thirty-sixth aspect of the present invention, there is provided an ozone generating apparatus in which, when $q_d$ means load applied by an elastic body to a dielectric, the load $q_d$ can meet the following expression:

$$q_d \approx q_e \times (E_d/E_e) \times (t_d/t_e)^3$$

where $E_e$ means Young's modulus of the electrode, $t_e$ is a thickness of the electrode, $E_d$ is Young's modulus of the dielectric, $t_d$ is a thickness of the dielectric, and $q_e$ is a pressure difference applied to the electrode.

As stated above, in the ozone generating apparatus according to the thirty-sixth aspect of the present invention, the elastic body is provided so as to apply the load according a predetermined formula to the dielectric. Consequently, it is possible to ensure a discharge space having a constant air gap length without breakage of the dielectric.

According to the thirty-seventh aspect of the present invention, there is provided an ozone generating apparatus in which, when an elastic body includes n spring bodies having a spring constant k (kgf/mm) and the spring bodies are compressed by 1 mm, a relational expression $q_d \times S = nkl$ is held, provided that the load $q_d$ applied by the elastic body to a dielectric is a value meeting the following expression:

$$q_d = q_e \times (E_d/E_e) \times (t_d/t_e)^3$$

where S is a surface area of an electrode, $E_e$ is Young's modulus of the electrode, $t_e$ is a thickness of the electrode, $E_d$ is Young's modulus of the dielectric, $t_d$ is a thickness of the dielectric, and $q_e$ is a pressure difference applied to the electrode.

As stated above, in the ozone generating apparatus according to the thirty-seventh aspect of the present invention, the elastic body is contracted or expanded according to its spring constant by a length found according to a predetermined formula so as to apply load according to a predetermined formula to the dielectric. Consequently, it is possible to ensure a discharge space having a constant air gap length without breakage of the dielectric.

According to the thirty-eighth aspect of the present invention, there is provided an ozone generating apparatus in which an elastic body is made of material having ozone resistance.

As stated above, in the ozone generating apparatus according to the thirty-eighth aspect of the present invention, the elastic body is made of the material having the ozone resistance. Consequently, it is possible to provide an ozone generating apparatus having high durability.

According to the thirty-ninth aspect of the present invention, there is provided an ozone generating apparatus in which fluoroplastic is applied to a partial or entire surface of an elastic body.

As stated above, in the ozone generating apparatus according to the thirty-ninth aspect of the present invention, the fluoroplastic is applied to the partial or entire surface of the elastic body. Consequently, it is possible to provide an ozone generating apparatus having high ozone resistance and high durability.

According to the fortieth aspect of the present invention, there is provided an ozone generating apparatus in which an elastic body is entirely made of fluoroplastic.

As stated above, in the ozone generating apparatus according to the fortieth aspect of the present invention, the elastic body is entirely made of fluoroplastic. Consequently, it is possible to provide an ozone generating apparatus having high ozone resistance and high durability.

According to the forty-first aspect of the present invention, there is provided an ozone generating apparatus in which an elastic body is made of ethylene propylene rubber.

As stated above, in the ozone generating apparatus according to the forty-first aspect of the present invention, the elastic body is entirely made of ethylene propylene rubber. Consequently, it is possible to provide an ozone generating apparatus having high ozone resistance and high durability.

According to the forty-second aspect of the present invention, there is provided an ozone generating apparatus in which an electrode and an elastic body are formed by molding process.

As stated above, in the ozone generating apparatus according to the forty-second aspect of the present invention, the electrode and the elastic body are formed by molding process. Consequently, in addition to the effects, it is possible to avoid gas leakage at an elastic body portion.

According to the forty-third aspect of the present invention, there is provided an ozone generating apparatus in which an area of an elastic body is kept smaller than that of an electrode, and the elastic body is surrounded by the electrodes at the same potential.

As stated above, in the ozone generating apparatus according to the forty-third aspect of the present invention, the elastic body is surrounded by the conductive electrodes. Consequently, no electric field is not generated in the elastic body, and material is not degraded due to generation of void discharge.

According to the forty-fourth aspect of the present invention, there is provided an ozone generating apparatus in which, at a rate of one elastic body to a plurality of stacked surfaces of stacked ozone generating units, the elastic body is interposed between the stacked surfaces.

As stated above, in the ozone generating apparatus according to the forty-fourth aspect of the present invention, at the rate of one elastic body to the plurality of ozone generating units, the elastic body is interposed between the ozone generating units. Consequently, it is possible to previously avoid breakage of a dielectric and reduction of an air gap accuracy of a discharge space, and reduce the number of parts so as to realize cost reduction.

According to the forty-fifth aspect of the present invention, there is provided an ozone generating apparatus in which supporting poles are provided to set positions of stacked ozone generating units.

As stated above, in the ozone generating apparatus according to the forty-fifth aspect of the present invention, the ozone generating units are respectively positioned by the supporting poles. Consequently, it is possible to easily position electrodes during installation of the electrodes in the ozone generating units, and carry out maintenance in a short time.

According to the forty-sixth aspect of the present invention, there is provided an ozone generating apparatus in which supporting poles are provided to have a cage-shaped form.

As stated above, in the ozone generating apparatus according to the forty-sixth aspect of the present invention, the supporting poles are provided to have the cage-shaped form. Consequently, it is possible to more easily position component parts in the ozone generating units at lower cost According to the forty-seventh aspect of the present invention, there is provided an ozone generating apparatus in which an elastic body is inserted into at least one gap between ozone generating units such that the elastic body can press the ozone generating units.

As stated above, in the ozone generating apparatus according to the forty-seventh aspect of the present invention, the elastic body is provided to press the ozone generating units. Consequently, it is possible to stably support a discharge space, and previously avoid breakage of a dielectric and reduction of an air gap accuracy of the discharge space.

According to the forty-eighth aspect of the present invention, there is provided an ozone generating apparatus in which a refrigerant passing mechanism for passing refrigerant to cool electrodes of an ozone generating unit is disposed adjacent to at least one of the electrodes.

As stated above, in the ozone generating apparatus according to the forty-eighth aspect of the present invention, the refrigerant passing mechanism for passing the refrigerant is disposed adjacent to at least one of the electrodes of the ozone generating unit. Consequently, the ozone generating unit can be assembled with the ozone generating unit taken out of the ozone generating apparatus main body, and assembly operation is facilitated and water leakage hardly occurs in the main body.

According to the forty-ninth aspect of the present invention, there is provided an ozone generating apparatus in which at least one of electrodes of an ozone generating unit, and an electrode of an ozone generating unit stacked adjacent to the ozone generating unit can define a sealed space to pass a gas only between the electrodes of the ozone generating units and through the adjacently stacked ozone generating units.

As stated above, in the ozone generating apparatus according to the forty-ninth aspect of the present invention, when the ozone generating units are stacked, the mutual electrodes of the ozone generating units can define the sealed space to pass the gas. Consequently, it is advantageously possible to provide an ozone generating apparatus having a multi-stage structure by simply stacking the ozone generating units.

According to the fiftieth aspect of the present invention, there is provided an ozone generating apparatus in which a vessel is provided to accommodate ozone generating units, and the vessel includes sliding means for sliding the vessel.

As stated above, in the ozone generating apparatus according to the fiftieth aspect of the present invention, the vessel is provided to accommodate the ozone generating units, and the vessel is provided with the sliding means for sliding the vessel. Consequently, it is possible to facilitate operation such as assembly operation, check operation, replacement operation for the ozone generating unit.

According to the fifty-first aspect of the present invention, there is provided an ozone generating apparatus in which non-discharge portions causing no discharge are provided in such a way that a pair of combs are alternately combined.

As stated above, in the ozone generating apparatus according to the fifty-first aspect of the present invention, the non-discharge portions are provided in such a way that the pair of combs are alternately combined. Consequently, a gas can uniformly flow along the non-discharge portion, thereby efficiently generating ozone.

According to the fifty-second aspect of the present invention, there is provided an ozone generating apparatus in which a water channel for passing cooling water is provided in at least one of electrode.

As stated above, in the ozone generating apparatus according to the fifty-second aspect of the present invention, the water channel for passing the cooling water is provided in the electrode. Consequently, it is possible to efficiently avoid a rise of temperature of the electrode, and efficiently generate ozone. Further, an inexpensive and light metallic electrode can be employed.

According to the fifty-third aspect of the present invention, there is provided an ozone generating apparatus in which a water channel is partially provided with a smaller sectional area than another sectional area.

As stated above, in the ozone generating apparatus according to the fifty-third aspect of the present invention, the water channel is partially provided with the smaller sectional area. Consequently, when cooling water is applied to a plurality of electrodes in parallel, there is no risk that a great amount of cooling water is applied to only partial electrodes. Therefore, a uniform amount of cooling water flows between the electrodes, and no variation is generated in a cooling performance, thereby providing a stable ozone generating apparatus.

According to the fifty-fourth aspect of the present invention, there is provided an ozone generating apparatus in which a water channel is partially provided with a by-pass for removing bubbles.

As stated above, in the ozone generating apparatus according to the fifty-fourth aspect of the present invention, the water channel is partially provided with the by-pass for removing bubbles. Consequently, the bubbles can be removed immediately after generation thereof, and a cooling performance is not degraded due to the bubbles.

According to the fifty-fifth aspect of the present invention, there is provided an ozone generating apparatus in which at least one of electrodes is provided with moving means for moving the electrode.

As stated above, in the ozone generating apparatus according to the fifty-fifth aspect of the present invention, the moving means is provided for the electrode. Consequently, when a dielectric is inserted in or removed from between the electrodes, it is possible to easily carry out inserting operation or removing operation, and avoid breakage of the dielectric during the operations.

According to the fifty-sixth aspect of the present invention, there is provided an ozone generating apparatus in which at least one of electrodes is provided with positioning means for setting a position of a dielectric.

As stated above, in the ozone generating apparatus according to the fifty-sixth aspect of the present invention, the positioning means for positioning the dielectric is attached to the electrode. Consequently, it is possible to easily provide a high position accuracy by simply interposing the dielectric between the electrodes.

According to the fifty-seventh aspect of the present invention, there is provided an ozone generating apparatus in which a concave portion to anchor a spacer is provided in at least one of electrodes, and the spacer is partially provided with a fitting portion for fitting with the concave portion in the electrode.

As stated above, in the ozone generating apparatus according to the fifty-seventh aspect of the present invention, the concave portion is provided in the electrode, and the spacer is partially provided with the fitting portion for fitting with the concave portion. Consequently, it is possible to easily interpose the spacer between the electrodes even when a plurality of ozone generating units are stacked in a horizontal direction.

According to the fifty-eighth aspect of the present invention, there is provided an ozone generating apparatus in which at least one of electrodes is formed by holding metal having high coefficient of heat transfer between two metallic plates having low coefficient of heat transfer.

As stated above, in the ozone generating apparatus according to the fifty-eighth aspect of the present invention, the electrode is formed by holding the metal having the high coefficient of heat transfer between the metallic plates having the low coefficient of heat transfer. Consequently, it is possible to provide a light capacity water channel of cooling water so as to use a thin metallic plate having low coefficient of heat transfer, resulting in enhancement of a heat removing efficiency. Further, it is also possible to improve an air gap length accuracy of a discharge space.

According to the fifty-ninth aspect of the present invention, there is provided an ozone generating apparatus in which a space is provided in one of the electrodes to accommodate the other electrode and a dielectric therein, and a power supply terminal is mounted to supply high voltage to the accommodated electrode.

As stated above, in the ozone generating apparatus according to the fifty-ninth aspect of the present invention, the space is provided in one of the electrodes to accommodate the other electrode, and the power is supplied to the accommodated electrode through the power supply terminal. Consequently, it is possible to provide the ozone generating apparatus having a compact shape.

According to the sixtieth aspect of the present invention, there is provided an ozone generating apparatus in which an elastic body is mounted to a back face of one of electrodes of an ozone generating unit at a position corresponding to a mounting position of the spacer.

As stated above, in the ozone generating apparatus according to the sixtieth aspect of the present invention, the elastic body is mounted to the back face of the electrode at the position corresponding to the mounting position of the spacer. Consequently, a dielectric is never broken due to pressure of the elastic body.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 7 is a sectional view showing a first embodiment of the present invention;

FIG. 39 is a sectional view showing a state of a reversed gas flow in a twenty-fourth embodiment of the present invention;

FIGS. 40A and 40B are a sectional view and a front view respectively showing a large-capacity ozone generating apparatus of a laterally piled type;

FIG. 43A is a plan, upper half cut-away view of a grounded electrode in a twenty-eighth embodiment of the present invention, and FIG. 43B is a side view thereof;

FIGS. 44A and 44B are a plan view and a side view showing a state in which a spacer is suspended by a grounded electrode in a twenty-ninth embodiment of the present invention;

FIGS. 50A and 50B are a partially omitted front and perspective view and a sectional view showing an ozone generating apparatus in a thirty-fifth embodiment of the present invention;

FIG. 52 is a sectional view showing an ozone generating apparatus in a thirty-seventh embodiment of the present invention.

DETAILED DESCRIPTION OF THE PREFERRED EMBODIMENTS

Embodiment 1

Figure 1A:
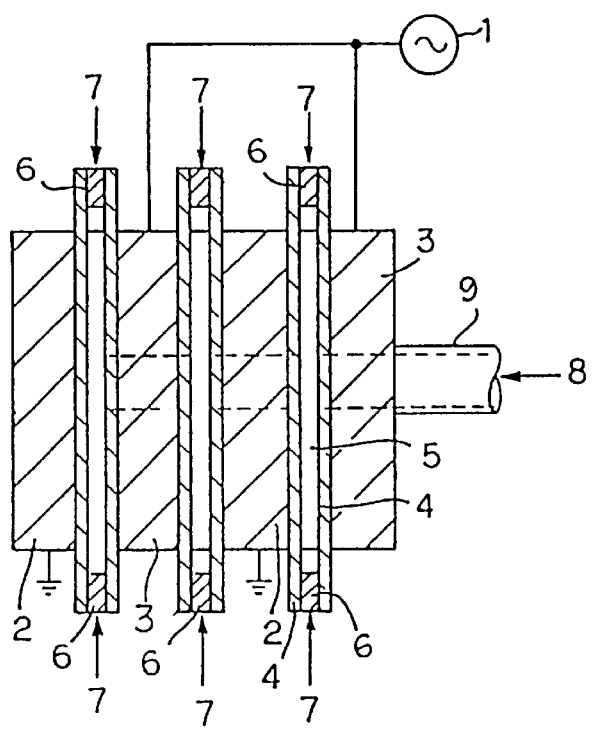
FIGS. 1A and 1B are a sectional view and a front view showing a conventional ozone generating apparatus.
Figure 1B:
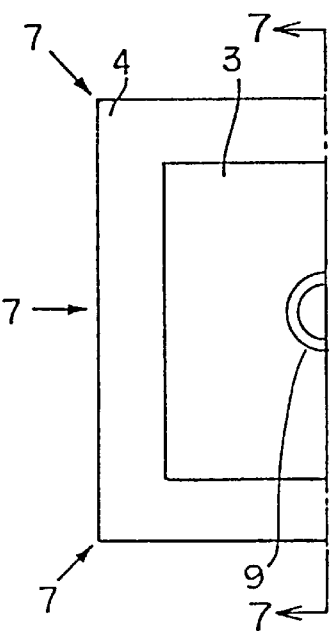
Figure 8:
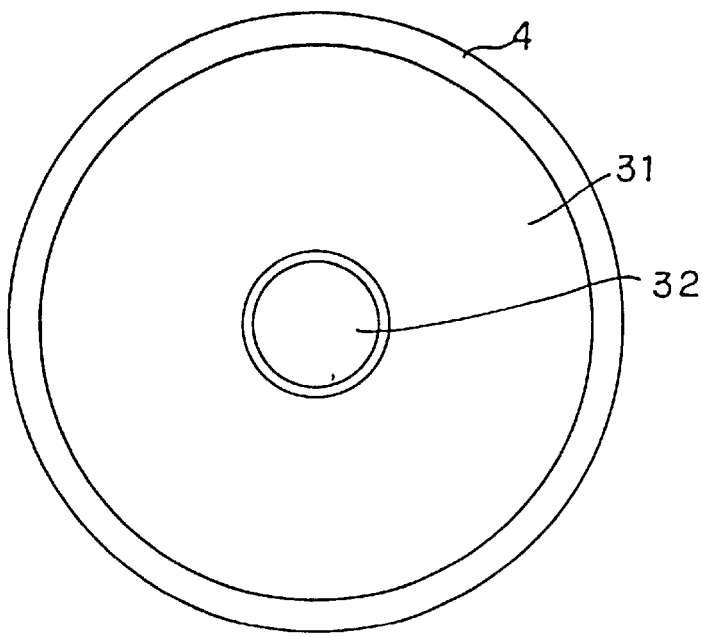
FIG. 8 is a plan view showing a dielectric electrode in the first embodiment of the present invention.

One preferred embodiment of the invention will now be described referring to the accompanying drawings. FIG. 7 is a sectional view showing a first embodiment of the present invention, in which the same reference numerals are used for component parts identical with those in the prior art shown in FIGS. 1A and 1B, and descriptions thereof are omitted. In FIG. 7, reference numeral 11 means power supply plates connected to a power source 1 through a fuse 12, and 31 is conduction layers (electrodes) in electrical contact with the power supply plates 11. The conduction layer 31 corresponds to a high-voltage electrode 3 in the prior art shown in FIGS. 1A and 1B. Reference numeral 4 means a dielectric including an alumina ceramics plate. FIG. 8 shows a relationship between a size of the ceramics plate 4 and a size of the conduction layer 31. In FIG. 8, reference numeral 32 means a hole (a gas supply mechanism) provided in the ceramics plate 4 at its intermediate portion to serve as a gas passage. The conduction layer 31 includes a silver metallized layer mounted on a single side of the ceramics plate 4 to have a thickness of 40 microns. The power supply plate 11 and the conduction layer 31 become at the same potential if the power supply plate 11 is even partially in contact with the conduction layer 31. Therefore, even when any gap is made between the power supply plate 11 and the ceramics plate 4, both of them are kept at the same potential. Accordingly, no electric field is applied to the gap so that no void discharge is caused. In addition, the conduction layer 31 is formed so as not to cover an entire surface of the ceramics plate 4, and an outer periphery and an inner periphery of the ceramics plate 4 have areas on which no conduction layer 31 is formed. It is thereby possible to prevent creeping discharge toward the grounded electrode 2 through the outer periphery or the inner periphery of the ceramics plate 4 (see FIG. 7). Though a distance required to prevent creeping discharge between the conduction layer 31 and the grounded electrode 2 depends upon applied voltage, it is typically sufficient to set the distance to 2 mm or more.

Reference numeral 61 means a metallic spacer interposed between the grounded electrode 2 and the ceramics plate 4. The ceramics plate 4 and the grounded electrode 2 are provided to define, through the spacer 61, a discharge space 5 in which discharge is generated. An oxygen-containing gas is supplied through a gas supply port (a gas supply mechanism) 7 into the discharge space 5. Consequently, in the discharge space 5, the oxygen-containing gas is partially ozonized by the discharge caused between the conduction layer 31 and the grounded electrode 2. An employed gas may include only oxygen, a mixed gas of nitrogen and oxygen, or air. In this case, a gas which has the least amount of moisture possible and has the highest oxygen concentration possible, is preferred, as a higher efficiency can be obtained from such a gas. The ceramics plate 4 and the grounded electrode 2 are in surface contact with each other through the metallic spacer 61. Heat generated in the ceramics plate 4 passes through the spacer 61, and can be effectively absorbed by the cooled grounded electrode 2.

In the first embodiment shown in FIG. 7, two ozone generating units are opposed to each other. A stress buffer plate (an elastic body) 100 made of ethylene propylene rubber (hereinafter abbreviated EP rubber) having ozone resistance is inserted between the two ozone generating units. Further, an unillustrated pressure mechanism is used to press the upper grounded electrode 2 from a direction of the arrow A, thereby assembling an apparatus. That is, the spacer 61 is interposed between the grounded electrode 2 and the ceramics plate 4, and a back of the ceramics plate 4 is pressed by drag of the stress buffer plate 100 serving as the elastic body, thereby keeping a constant air gap length of the discharge gap 5. In other words, the stress buffer plate 100 absorbs force generated in, for example, the ceramics plate 4 due to mechanical stress or thermal stress. Therefore, the stress buffer plate 100 can prevent degradation of an air gap length accuracy and breakage of the ceramics plate 4, both of which are mainly caused due to distortion of the ceramics plate 4.

Figure 2A:
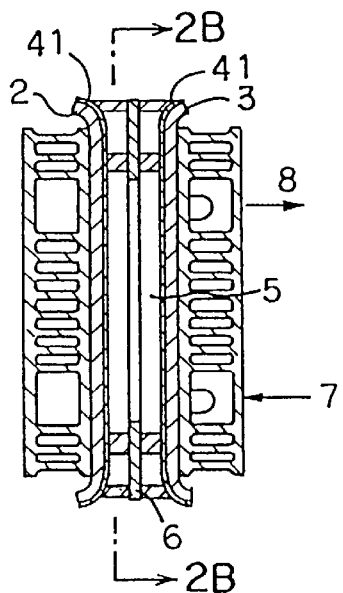
FIGS. 2A and 2B are a sectional view and a front view showing another conventional ozone generating apparatus.
Figure 2B:
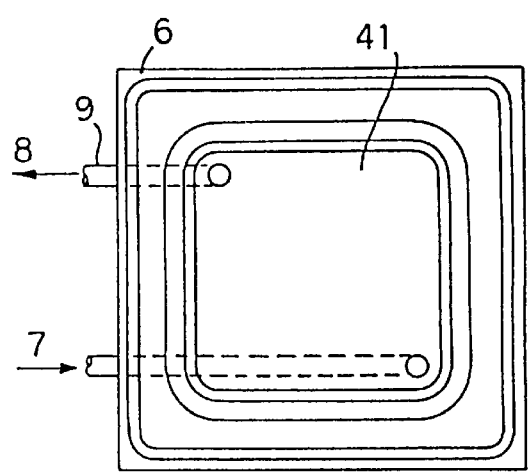
Figure 3:
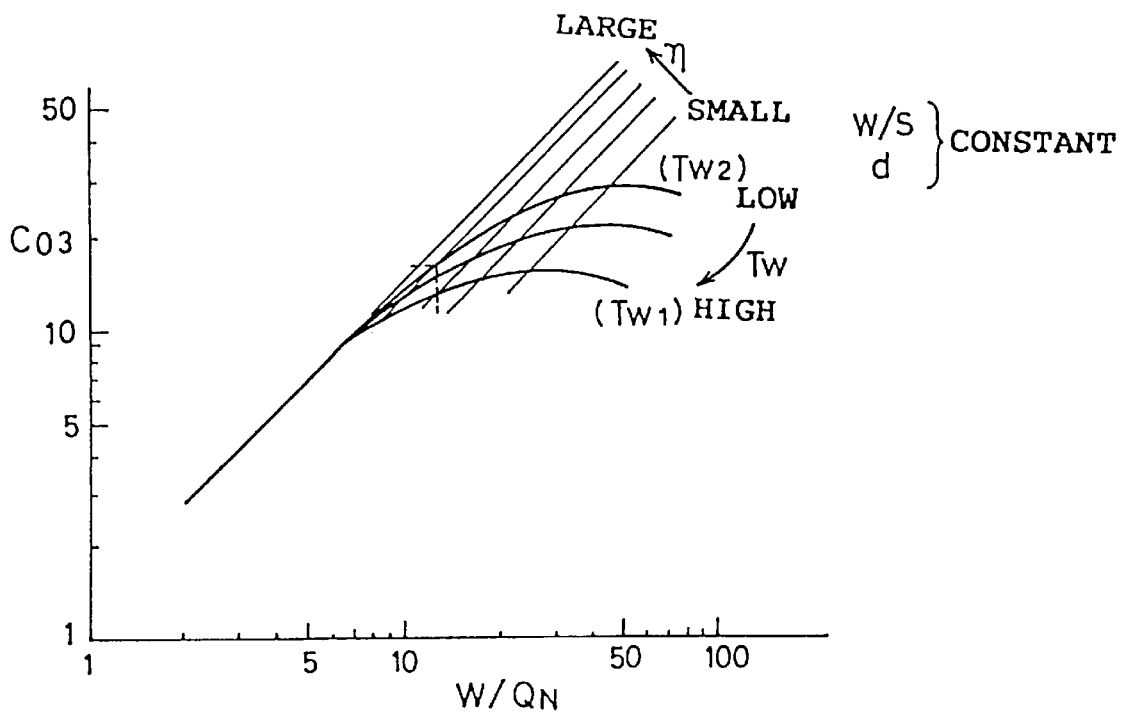
FIG. 3 is a graph diagram showing one example of an ozone generation characteristic in the conventional ozone generating apparatus.
Figure 4:
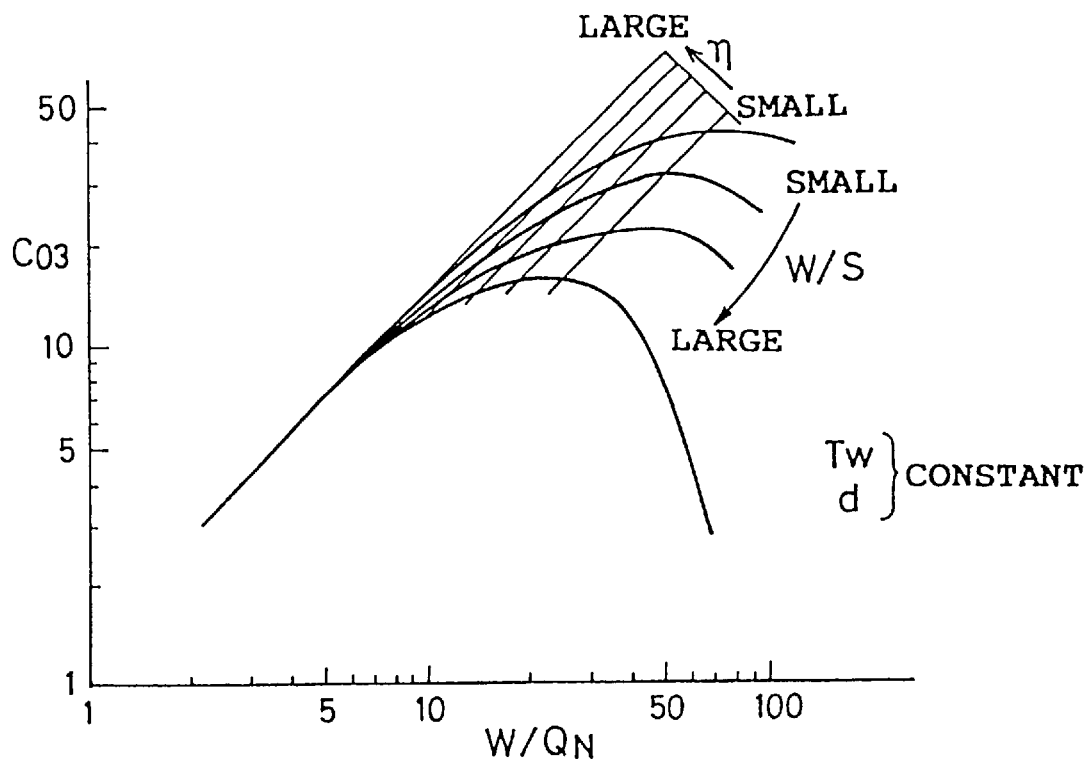
FIG. 4 is a graph diagram showing another example of the ozone generation characteristic in the conventional ozone generating apparatus.
Figure 5:
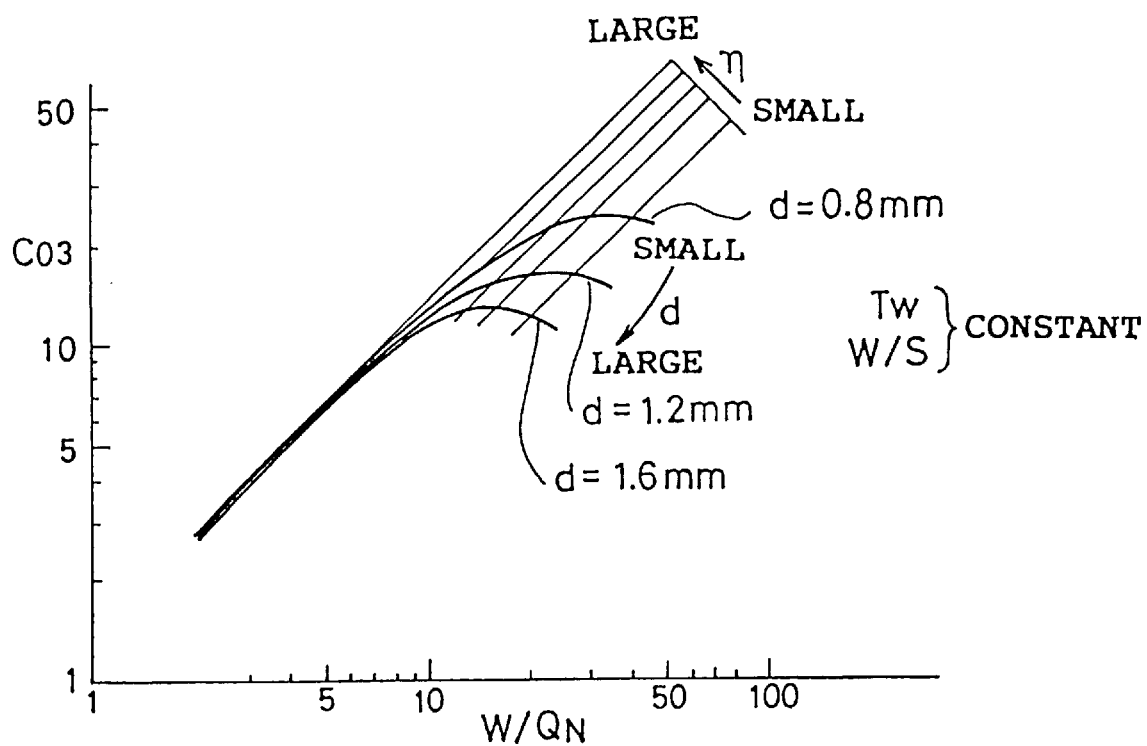
FIG. 5 is a graph diagram showing still another example of the ozone generation characteristic in the conventional ozone generating apparatus.
Figure 9:
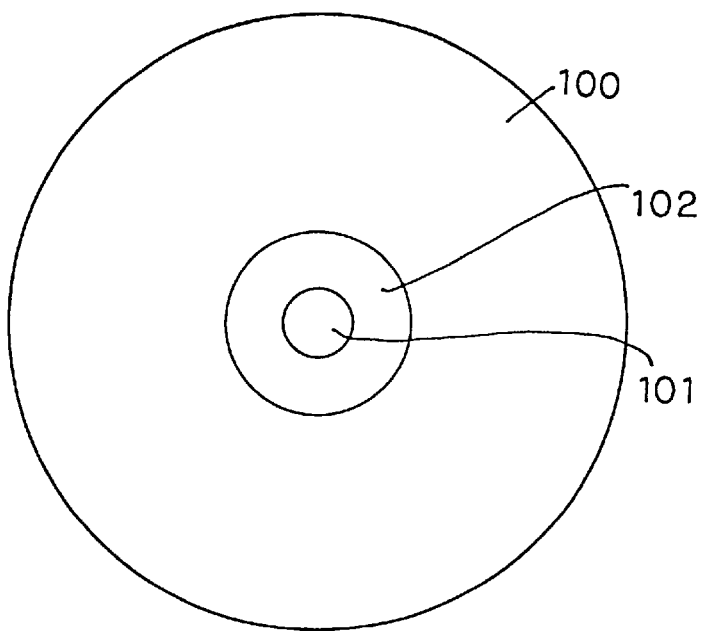
FIG. 9 is a plan view showing a stress buffer plate in the first embodiment of the present invention.

In a method in the prior art shown in FIGS. 2A and 2B, a spacer 6 made of silicone is inserted into a gap defined by electrodes 2 and 3 or ceramics layers (dielectrics) 41 at an outer peripheral portion causing no discharge. In the method, however, the air gap length may be varied due to thermal distortion of the electrodes 2 and 3. In the embodiment, the stress buffer plate 100 as shown in FIG. 9 is employed in order to avoid the problem. In FIG. 9, reference numeral 100 means the stress buffer plate made of EP rubber, 101 is an opening (a gas supply mechanism) serving as a gas passage, and 102 is a partial surface of the EP rubber, which is coated with fluoroplastic to avoid corrosion of the EP rubber due to ozone.

The stress buffer plate 100 has substantially the same size as that of the discharge space 5, and is mounted on a back face of the conduction layer 31 as shown in FIG. 7. It is thereby possible to uniformly dispose the stress buffer plates 100 so as to cover an entire surface of the discharge space 5 from the outside thereof. Further, it is possible to ensure the air gap length of the spacer 61, and keep a high air gap length accuracy of the discharge space 5. That is, in the structure in the embodiment, the air gap length can be left constant even when a thickness of the ceramics plate 4 is varied due to, for example, thermal expansion, and a thickness of the stress buffer plate 100 is varied to buffer the variation.

Accordingly, the structure in the embodiment is effective particularly when a very short air gap of about several hundred microns is required. Further, as shown in FIG. 7, the stress buffer plate is held between the high-voltage conduction layers 31 and at the same potential as the conduction layers 31. As a result, no electric field is applied to the stress buffer plate 100, and no creeping discharge is caused. For the purposes of, for example, avoiding degradation of the stress buffer plate 100 due to the creeping discharge, as shown in FIG. 7, the stress buffer plate 100 preferably has an area equal to or less than that of the conduction layer 31 applied onto the surface of the ceramics plate 4, and the stress buffer plate 100 is preferably surrounded by the conduction layers 31 at the same potential. Alternatively, the stress buffer plate 100 may be entirely made of fluoroplastic.

Figure 10:
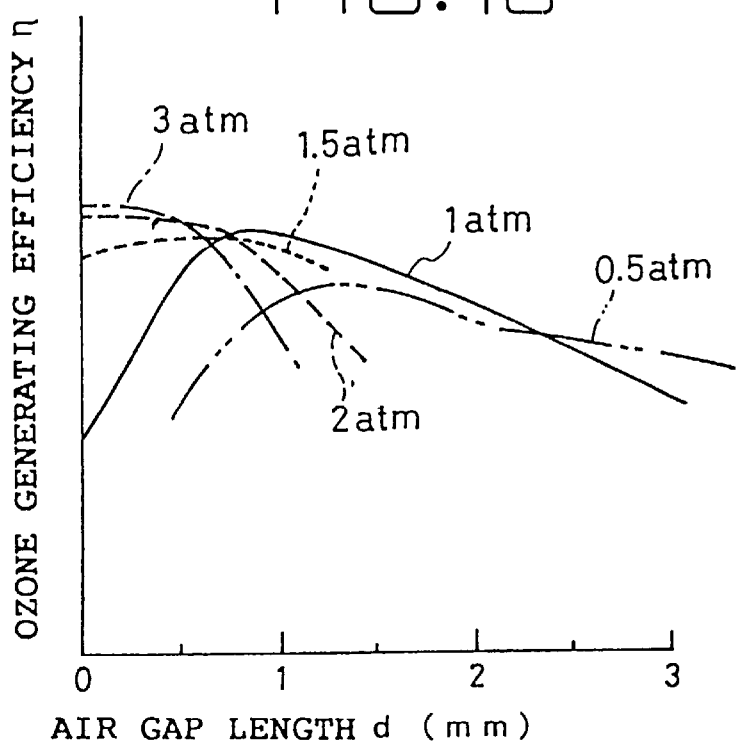
FIG. 10 is a graph diagram showing a relationship between the air gap length and the ozone generating efficiency.

A description will now be given of the operation. In FIG. 7, the gas is sucked in a direction of the arrow 7 from a peripheral portion of the grounded electrode 2 to pass through the discharge space 5, thereafter flowing in a direction of the arrow 81 and passing through a gas exhaust pipe (a gas supply mechanism) 9 to be exhausted in the direction of the arrow 8. Operating gas pressure is set to two atmospheres (atm). FIG. 10 shows the result of experiment about a relationship between the air gap length d and the ozone generating efficiency η when the operating gas pressure is varied in the range of 0.5 to 3 atm. The result is obtained by using oxygen as a raw gas. In can be seen that the optimal air gap length d is varied according to an increase in the gas pressure. That is, as the gas pressure is increased, an exciting efficiency in a shorter gap is increased, and an exciting efficiency in a longer gap is decreased. The inventor can experimentally explain the reason of the phenomenon as follows:

1) There is a sheath area including a great amount of positive ions in the vicinity of the grounded electrode 2 and the conduction layer 31. The ion has an extremely smaller capability of generating the ozone than that of the electron. Then, as the air gap length d becomes shorter, an effect of ion sheath becomes greater, thereby decreasing the ozone generating efficiency η. Since increasing the gas pressure reduces a length of the sheath portion including the positive ions, the exciting efficiency in the short air gap can be improved. A typical sheath length is about 0.003 mm at one atmosphere, and the exciting efficiency is rapidly decreased when a ratio of the sheath length to the air gap length d is about 50%. Consequently, as the pressure is increased, the ozone generating efficiency η is increased rapidly in the short air gap.

2) The product (a pd value) of the air gap length d and the gas pressure p is known as one parameter indicating stability of discharge. In a silent discharge type ozonizer, it became clear that the discharge was spatially pinched to provide another discharge form when the pd value exceeded 0.3 atm·cm. When the discharge is pinched, a gas temperature in the space is increased locally, and thermal decomposition process of ozone is promoted, thereby reducing the ozone generating efficiency η. This is the reason why the ozone generating efficiency is reduced according to the increase in the gas pressure in the long air gap area.

Figure 6:
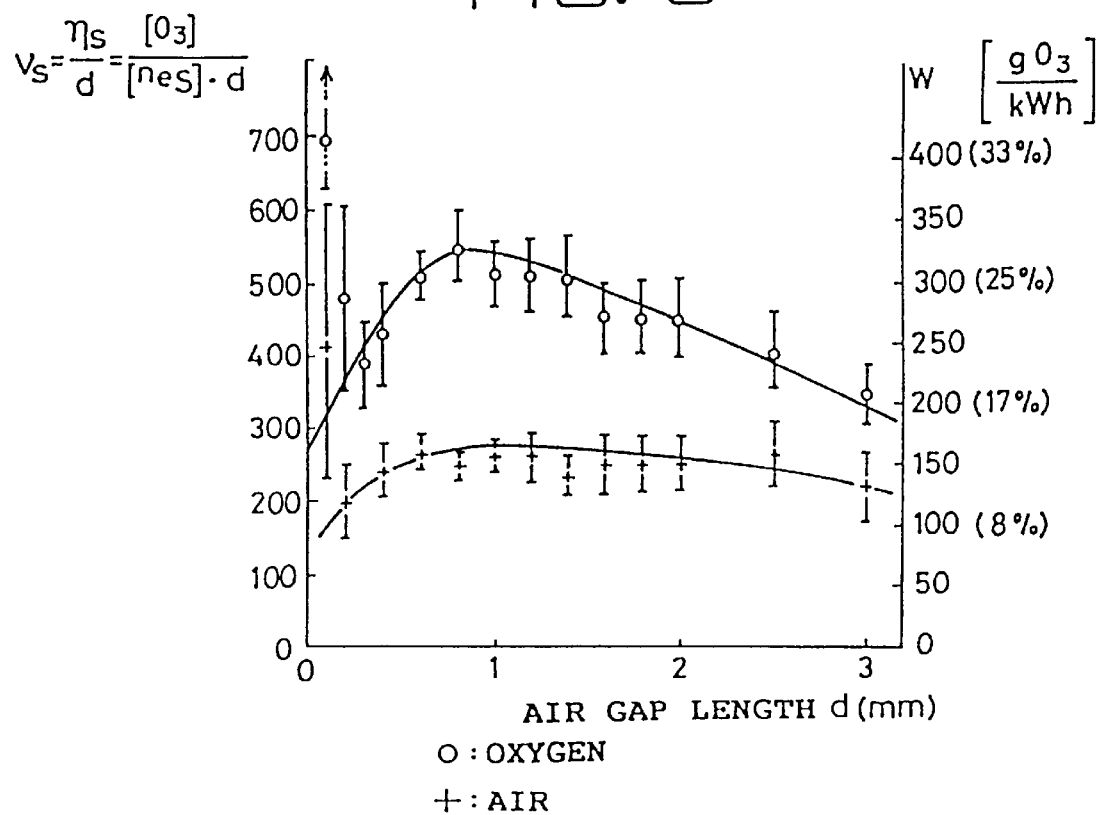
FIG. 6 is a graph diagram showing one example of an ozone generating efficiency with respect to a discharge gap length.

On the other hand, except data shown in FIG. 6, almost no report has been made of an ozone generating characteristic in a short air gap of 0.5 mm or less. Apparently, the reasons can be explained as in the following description. That is, in the conventional ozone generating apparatus shown in FIGS. 2A and 2B, experiment could not be carried out due to ozone leakage during high-pressure operation. Further, since an experimental apparatus having a good air gap accuracy could not be manufactured, it was decided that the ozone generating apparatus having the very short gap was not practical. In any event, referring to FIG. 6 showing the result at one atmosphere, it can be considered that the exciting efficiency in the short air gap length was low. That is, in the ozone generating apparatus manufactured by the inventor, the gap of 0.6 mm or less could be accurately provided in the above structure, and a high-pressure gas of about 1.5 atm or more could be employed so as to realize a highly efficient and compact ozone generating apparatus.

Figure 11:
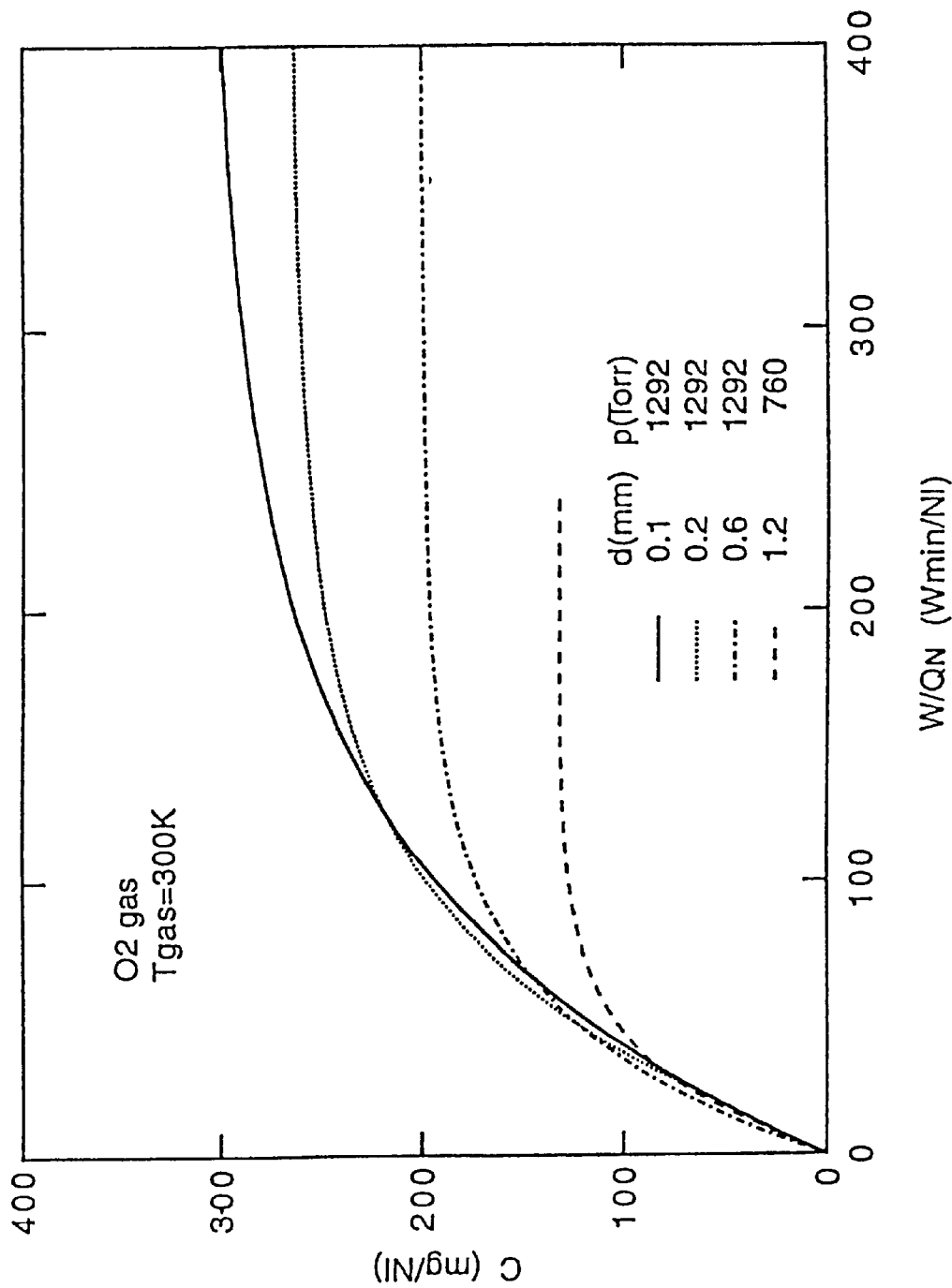
FIG. 11 is a graph diagram showing a relationship between feeding energy and an ozone concentration.

The above discussion is related to the result when small power is fed, and an ozone concentration is low. In case of the low ozone concentration, as shown in FIG. 10, it can be seen that a large variation was not caused in the ozone generating efficiency by using the optimal pressure in each of the discharge gap lengths, and a short discharge gap length was more advantageous in view of a compact size of the apparatus. FIG. 11 shows a variation in the ozone generating characteristic when more power is fed to more increase the ozone concentration. In FIG. 11, the transverse axis defines energy consumption per gas molecule ($W/Q_N$), and the ordinate axis defines an ozone concentration C. Here, the result is shown, provided that the gas temperature in the discharge space was set to 300°K in order to avoid a rise of the gas temperature due to a difference between the discharge gap lengths. That is, each electrode having a discharge area proportional to the discharge gap length was employed such that the rise of the gas temperature due to the discharge was not affected by the discharge gap length.

Figure 12:
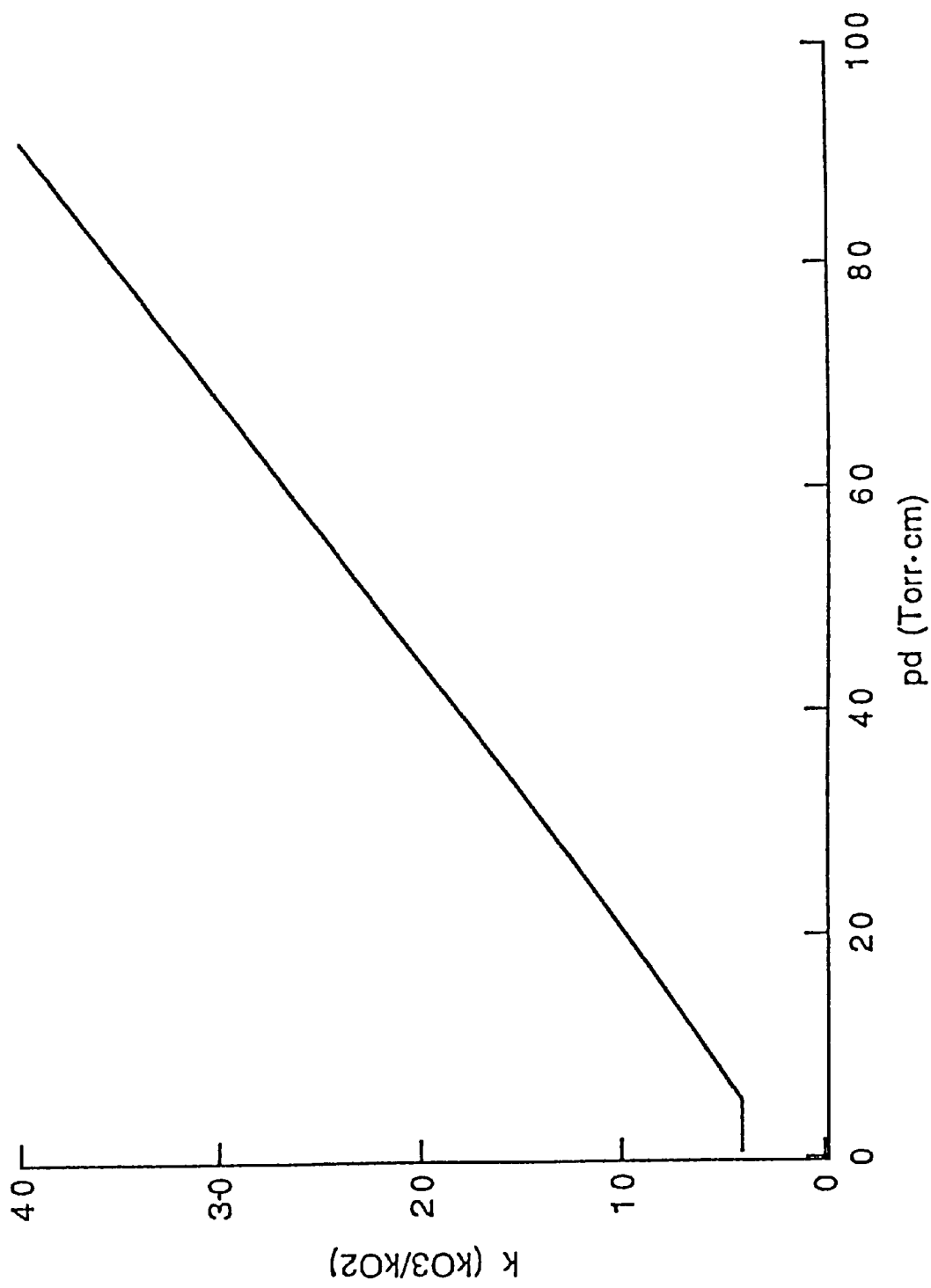
FIG. 12 is a graph diagram showing a relationship between a ratio k of an ozone generating speed and an ozone dissociation speed, and the product pd of gas pressure p and the discharge gap length d.

As set forth above, in an area having the low ozone concentration, the ozone generating efficiency hardly depends upon experimental conditions. However, as shown in FIG. 11, as the ozone concentration was increased, differences were observed between characteristics. After having studied the experimental data, it became clear that the variations in. the characteristics depended upon the product pd of the gas pressure p and the discharge gap length d. FIG. 12 shows a relationship between a ratio k of an ozone generating (oxygen dissociation) speed $kO_2$ and an ozone dissociation speed $kO_3$ due to electron collision, and the product pd. As can be understood from the drawing, as the product pd becomes larger, the ratio k becomes larger. The increase in the ratio k results in an increase in the ozone dissociation due to the electron, thereby meaning that the ozone generating efficiency is reduced in a higher ozone-concentration area. In case of the low ozone concentration, the ozone generating efficiency depends upon not the ratio k but only the ozone generating speed $kO_2$. FIG. 12 teaches that the ratio k should be limited to a small value in order to generate higher concentration ozone. For this purpose, from the drawing, the product pd may be set to a value of 30

Torr·cm or less. The ozone is generated by three-body collision of an oxygen atom, an oxygen molecule, and a third body so that an extremely low gas pressure p results in reduction of the ozone generating efficiency. That is, it is necessary to set the gas pressure p to a value of about one atmosphere (i.e., 760 Torr) or more. In consideration of the condition, it can be concluded that the discharge gap length d should be set to a value of 0.4 mm or less.

Figure 13:
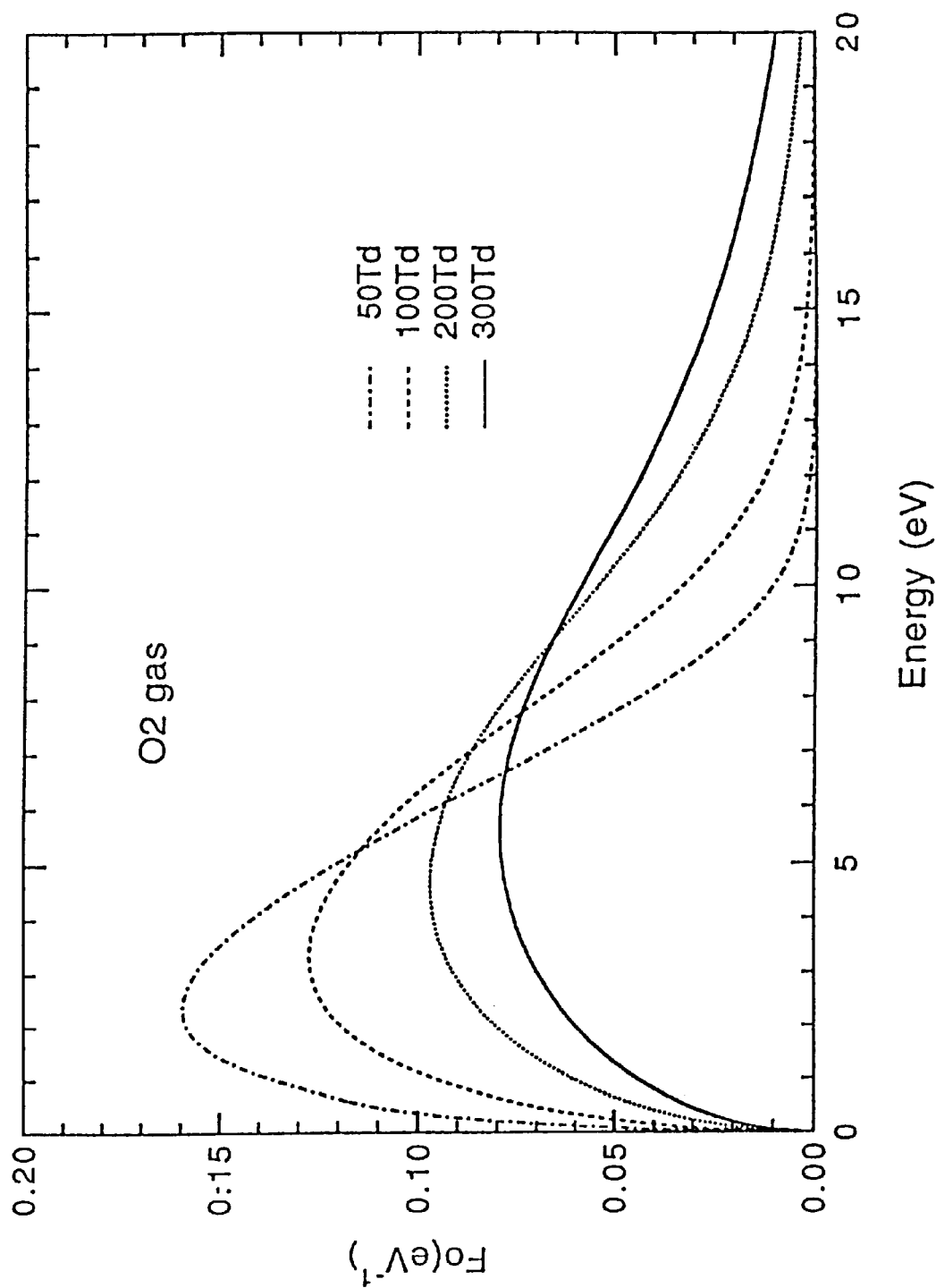
FIG. 13 is a graph diagram showing an electronic energy distribution as a function of a converted electric field.

The result in FIG. 12 can also be explained as in the following discussion. FIG. 13 shows an electronic energy distribution as a function of a converted electric field E/N (where N is the number of particles in the gas molecule). From an experiment carried out by the inventor of the present invention, it came clear that the converted electric fields 100 Td (Td=$10^{-17}$ Vcm$^2$), 200 Td, and 300 Td shown in the drawing respectively correspond to the products pd of 76 Torr·cm, 25.8 Torr·cm, and 13 Torr·cm. In FIG. 13, dissociation energy of the oxygen is in the range of 6 to 8 eV, and dissociation energy of the ozone is in the vicinity of 2 eV or 4 eV. In the drawing, a probability of presence of electron in the vicinity of 8 eV hardly depends upon the converted electric field E/N (or the product pd). Therefore, the ozone generating efficiency in a lower ozone-concentration area does not depend upon the converted electric field E/N (or the product pd). On the other hand, as the converted electric field E/N becomes higher (that is, the product pd becomes smaller), a probability of presence of electronic energy in an approximate range of 2 to 4 eV becomes smaller. The fact implies that, as the converted electric field E/N becomes higher, the ozone dissociation due to the electron becomes smaller, and the ozone generating efficiency becomes higher in the higher ozone-concentration area. Consequently, a qualitative description can be given of the experimental result in FIG. 12, that is, of the fact that higher concentration ozone can be obtained as the product pd becomes smaller. When the ozone concentration is increased, the electronic energy distribution itself is varied. Thus, it is difficult to provide a quantitative estimation without an electron collision sectional area of the ozone.

When the oxygen concentration in the raw gas is lower, the converted electric field has a smaller effect on the electronic energy distribution. Accordingly, the optimal value is effective particularly when an oxygen-rich gas is used as the raw gas.

Figure 14:
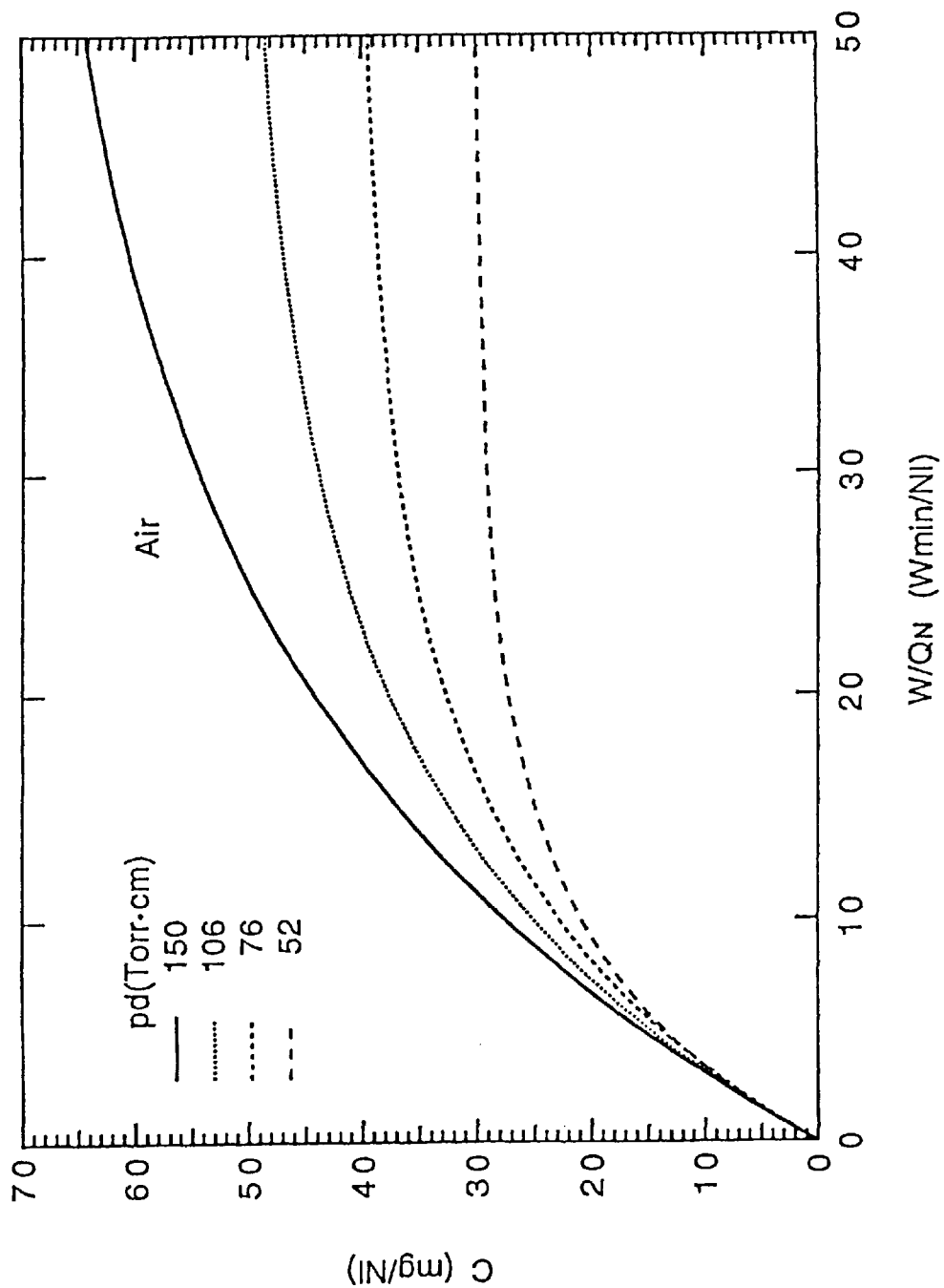
FIG. 14 is a graph diagram showing ozone generating characteristics in case air having an oxygen to nitrogen ratio of 1:4 is used as a raw gas.

Further, it came clear that, when the raw gas contained nitrogen, it was possible to obtain an ozone generating characteristic entirely different from the above characteristic. In FIG. 14, air having an oxygen-nitrogen ratio of 1:4 was employed as the raw gas, and the ozone generating characteristic was observed while varying the discharge gap length d and the gas pressure p. Though it was also confirmed that an increase in the power consumption W/$Q_N$ reduced the ozone concentration in a high power consumption W/$Q_N$ area, the area is not shown in the drawing. From the drawing, it can be seen that, as the discharge gap length d became larger, or as the gas pressure p became higher, higher concentration ozone could be obtained.

Figure 15:
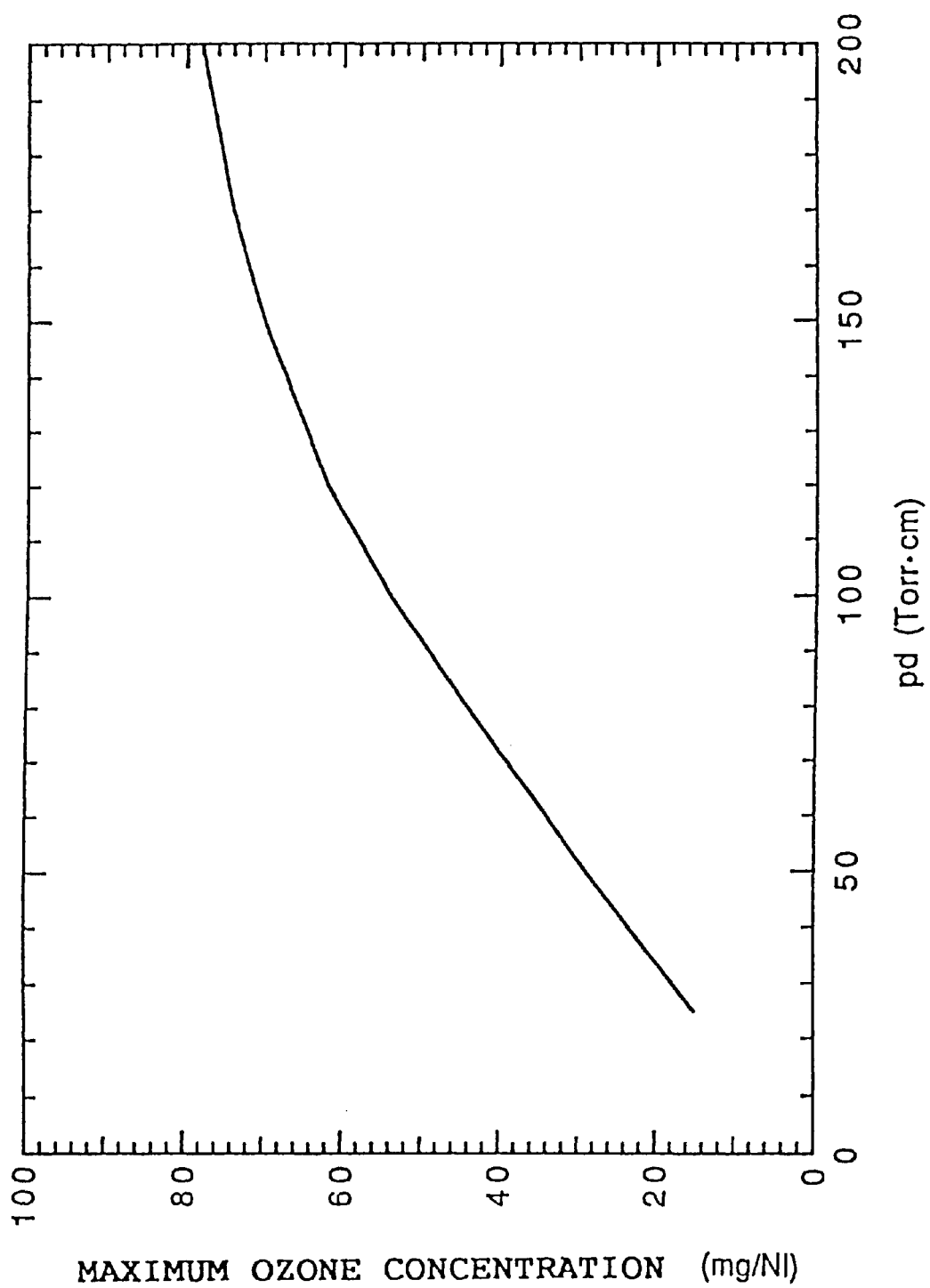
FIG. 15 is a graph diagram showing the result of FIG. 14 as the product pd of the discharge gap length d and the gas pressure p.

FIG. 15 shows the result of FIG. 14 as the product pd of the discharge gap length d and the gas pressure p. From the drawing, it can be understood that, as the product pd is increased, higher concentration ozone can be obtained. It is necessary to set the product pd to 120 Torr·cm or more in order to obtain a predetermined high concentration ozone. The result has a tendency opposite to that of the experimental result (see FIG. 11) using the oxygen as the raw gas.

Further, it came clear that a characteristic identical with that in FIG. 15 could be obtained even when a nitrogen rate was substantially equal to an oxygen rate. When the nitrogen rate was increased, that is, a nitrogen-rich gas was used as the raw gas, the ozone was destroyed by nitrogen oxide ($NO_x$) generated by the discharge, resulting in a phenomenon in which high concentration ozone could not be obtained. Further, as the electronic energy becomes higher, that is, the product pd becomes smaller, the nitrogen oxide ($NO_x$) can be more easily produced. Thus, the high concentration ozone can not be obtained in an area of the small product pd. Such a physical model is well known in an area having the discharge gap length d of 0.8 mm or more. However, in the above experiment, it could initially be confirmed that the same phenomenon occurred even in case of the discharge gap length of 0.6 mm or less.

A detailed description will now be given of the grounded electrode 2 and the metallic spacer 61 with reference to FIGS. 7 and 15. The grounded electrode 2 is cooled by water, not shown in the drawing. In the structure in the embodiment, since all portions cooled by water are at a ground potential, typical water can be employed so that insulating oil or pure water is not required. Needless to say, it is possible to provide the same effect by air-cooling by a cooling fin mounted to the ground electrode, heat pipe cooling, or direct cooling using chiller water. Stable discharge can be easily obtained by coating a surface of the grounded electrode 2 corresponding to a discharge portion with a dielectric layer, or by mounting a dielectric plate onto the grounded electrode 2. The radial metallic spacer 61 is mounted on the grounded electrode 2 as shown in the drawing, and the ceramics plate 4 is mounted on the spacer 61, thereby forming the discharge space 5. Accordingly, one space above the grounded electrode 2 on which the spacer 61 is not mounted can serve as the discharge space 5, and the other space above the grounded electrode 2 on which the spacer 61 is mounted can serve as a non-discharge space. In the structure, the discharge portion and the gas passage can share entirely the same space, thereby eliminating the need for discretely preparing the gas passage. In addition, it is possible to realize an optional air gap length d depending upon a thickness of material used for the spacer 61. The area of the spacer (non-discharge portion) 61 occupying a discharge electrode area is large, and the spacer 61 extends from the center of the discharge area to its perimeter. Thus, it came clear that the spacer could provide effects in that the air gap accuracy could be uniformly given over the entire space, and the ceramics plate 4 could be indirectly cooled through the spacer 61.

Figure 17:
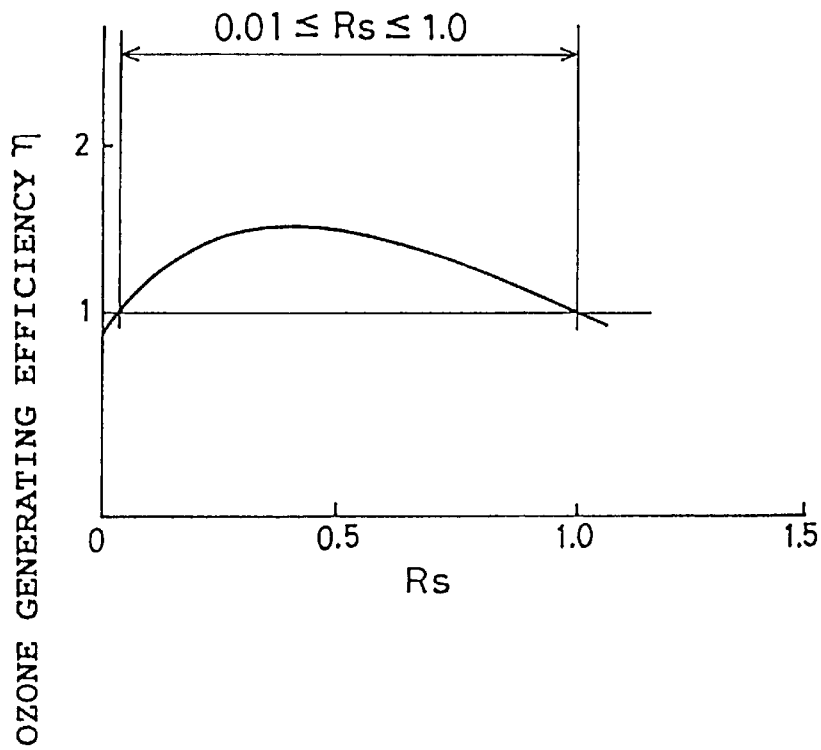
FIG. 17 is a graph diagram showing a variation in the ozone generating efficiency when a ratio of an area of a non-discharge portion and an area of a discharge portion is varied.
Figure 18:
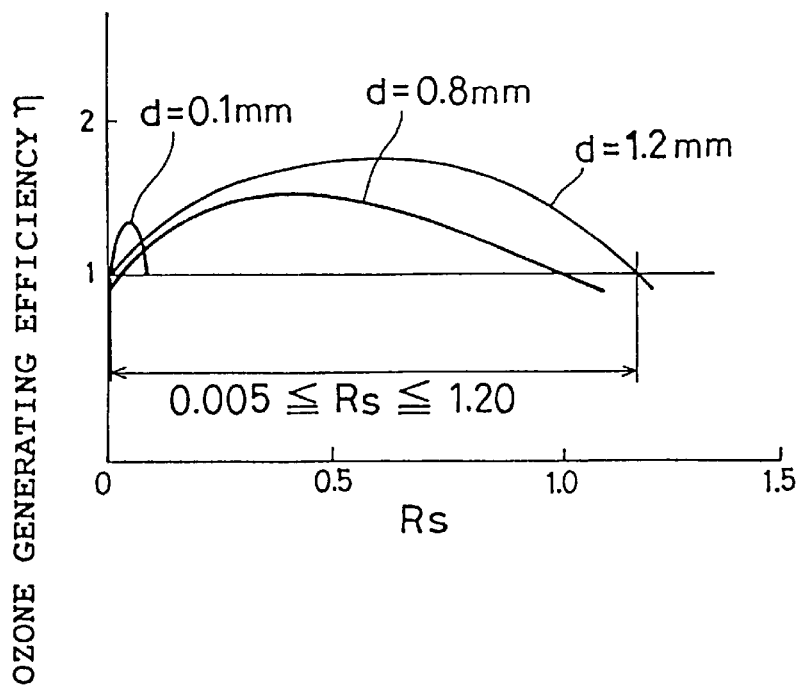
FIG. 18 is a graph diagram showing, for each air gap length in a discharge space, the variation in the ozone generating efficiency when the ratio of the area of the non-discharge portion and the area of the discharge portion is varied.

As an area of the non-discharge portion is increased, a gas cooling effect is increased. However, when the area of the non-discharge is extremely increased, an effective discharge portion area is reduced, resulting in degradation of the ozone generating characteristic. As shown in FIG. 17, the ozone generating characteristic was observed while varying a ratio $S_n$ of a discharge portion area $S_d$ to non-discharge portion area ($R_s=S_n/S_d$) In the vicinity of $R_s=0$, the ozone generating efficiency is rapidly increased according to an increase in the ratio $R_s$. When the ratio $R_s$ is increased, the ozone generating efficiency reaches the maximum value, thereafter decreasing. For $5 \leq R_s \leq 100\%$, a 10% or more rise of the ozone generating efficiency can be obtained than would be without the conventional spacer. However, the range of $R_s$ may be varied depending upon conditions such as material of the spacer, power density, or the ozone concentration. FIG. 17 shows the result in case of the gap length of 0.8 mm, and a heat removing effect through the spacer largely depends upon the discharge gap length. FIG. 18 shows a relationship between the ratio $R_s$ and the ozone generating efficiency by using different gap lengths. As is clear from FIG. 18, as the gap length becomes larger, the heat removing effect through the spacer becomes higher. Accordingly, a higher occupying rate of the non-discharge portion can provide a higher heat removing effect. Inversely, when the gap length is smaller, heat efficiently passes through the gas so that the heat removing effect through the spacer is lowered. Therefore, a smaller occupying rate of the non-discharge portion can provide higher heat removing efficiency. In the gap length in the range of 0.1 to 1.2 mm, for $0.5 \leq R_s \leq 120\%$ as shown in FIG. 18, it was possible to improve the ozone generating characteristic to some extent as compared with a case without the spacer. Needless to say, a cooling effect can be enhanced and the maximum amount of ozone generation can be increased by employing, as the metallic spacer, material having high coefficient of heat transfer such as aluminium, or copper. Alternatively, when a particular weight is given to corrosion resistance, it is effective to plate or coat the material having high coefficient of heat transfer with ozone-proof material, or to employ stainless.

Embodiment 2

Figure 19:
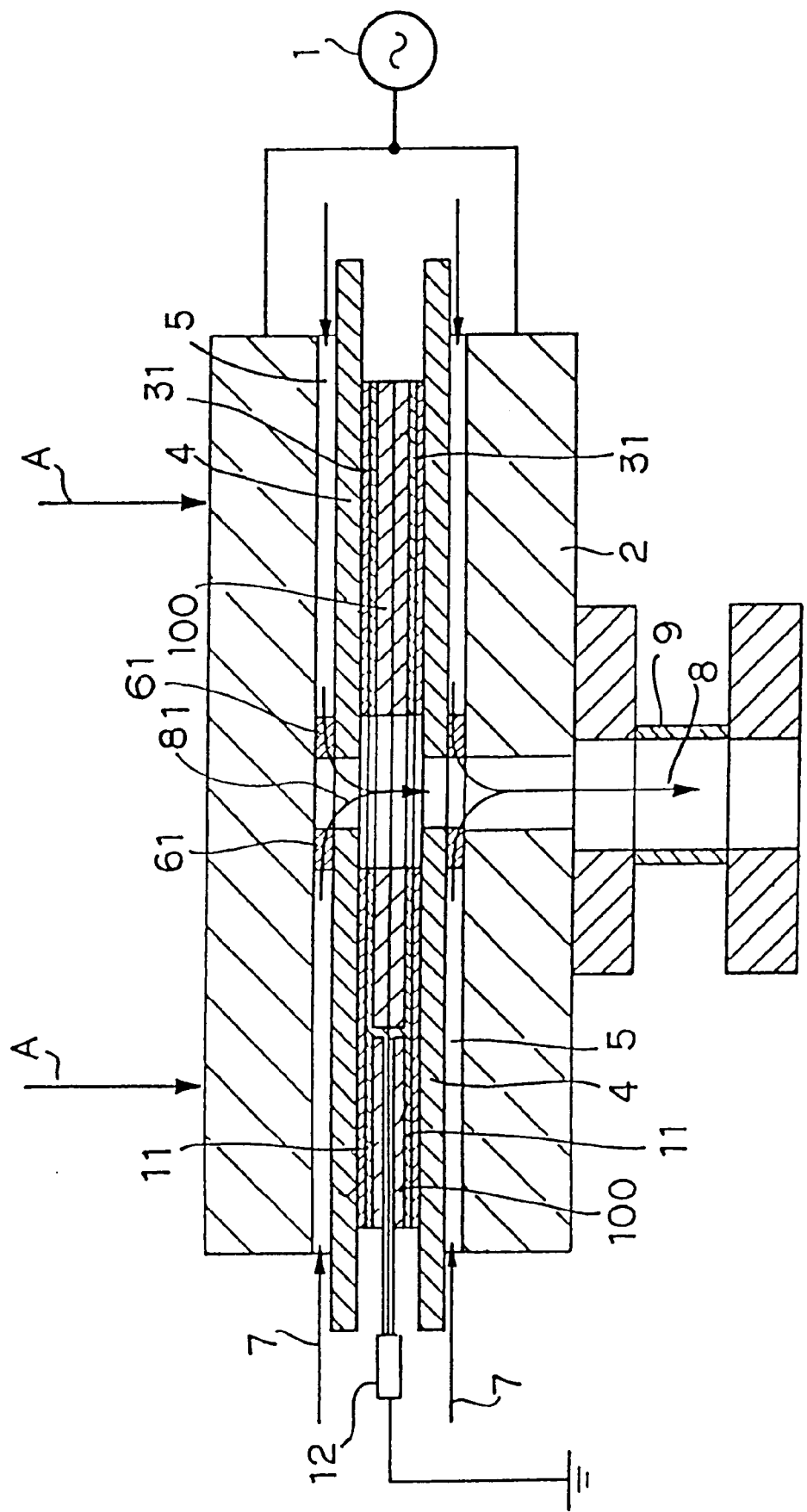
FIG. 19 is a sectional view showing a second embodiment of the present invention.

In the embodiment 1, the electrode is grounded to form the grounded electrode 2, and high voltage is applied to the conduction layer 31 from the power source 1 to establish a high-voltage electric field between the grounded electrode 2 and the conduction layer 31. However, as shown in FIG. 19, high voltage may be applied to grounded electrodes 2 from the power source 1, and conduction layers 31 may be grounded through a fuse 12 to serve as grounded electrodes, thereby establishing the high-voltage electric field between both the electrodes.

Embodiment 3

Figure 20:
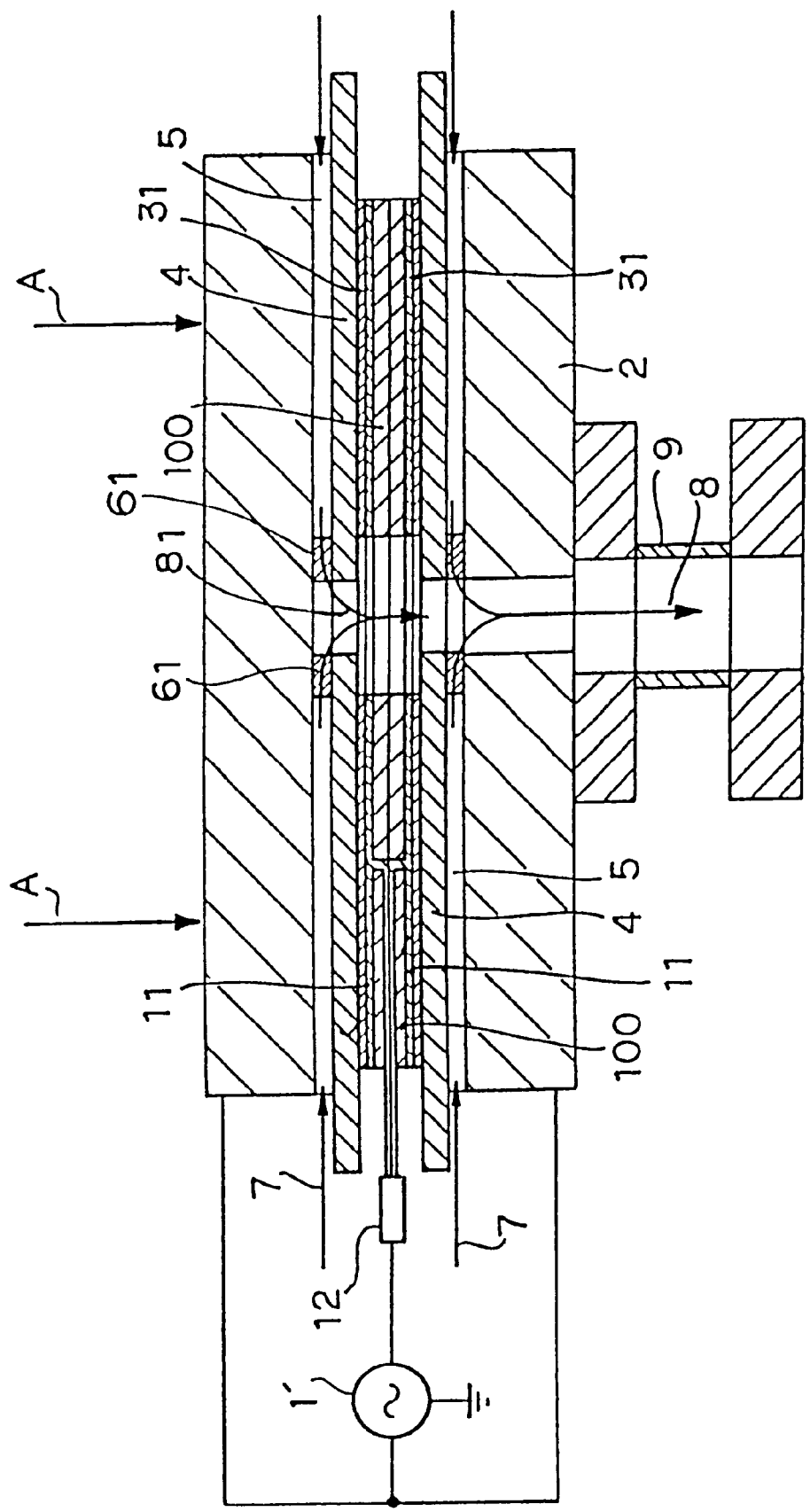
FIG. 20 is a sectional view showing a third embodiment of the present invention.
Figure 21A:
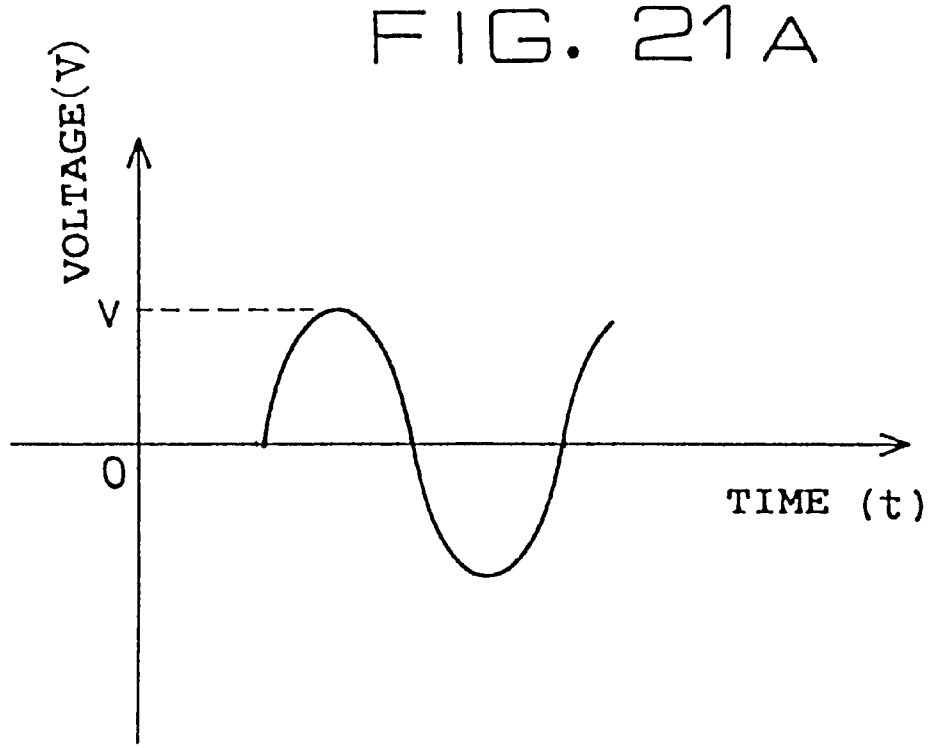
FIGS. 21A and 21B are waveform diagrams showing waveforms of voltage applied to electrodes in the third embodiment in FIG. 15.
Figure 21B:
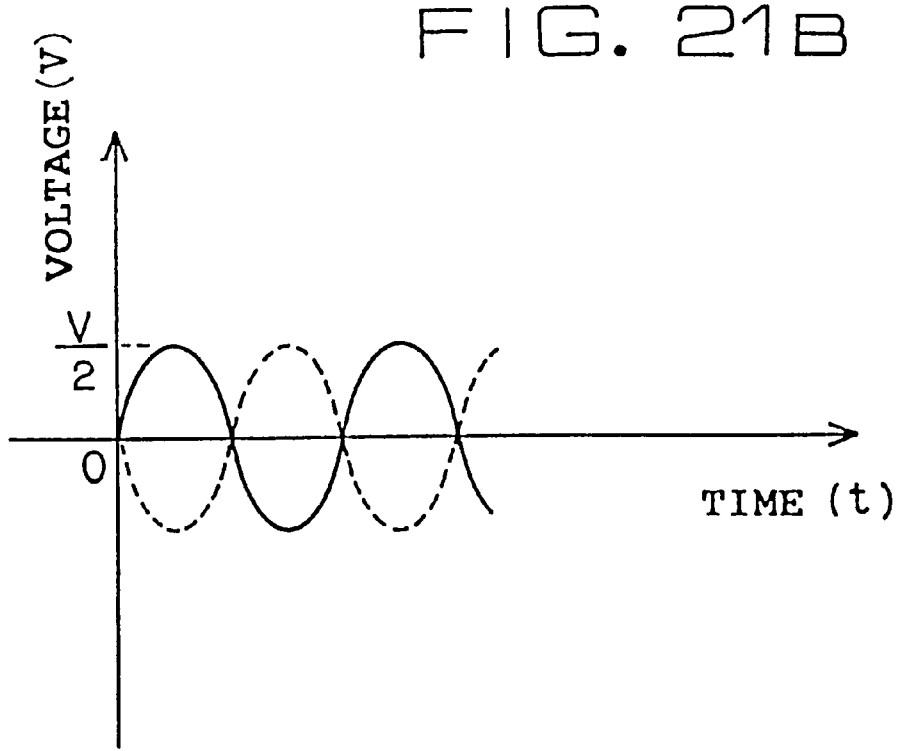

Alternatively, as shown in FIG. 20, a middle point grounded power source 1' may be used, and high voltage having anti-phases may be respectively applied to electrodes 2 and conduction layers 31 from the middle point grounded power source 1' so as to establish a high-voltage electric field. It is thereby possible to reduce a potential difference between ground potentials of both the electrodes to a value half a potential difference obtained when one electrode is grounded like the electrode 2 in the embodiment 1. That is, when the one electrode is grounded, and a peak value of an electrode potential on the high voltage side is defined as v, a peak value of the potential of both the electrodes with the middle point grounded power source 1' can be expressed as v/2 as shown in FIGS. 21A and 21B. It is thereby possible to halve an insulating distance required between the electrode and a ground of the ozone generating apparatus. Further, it is possible to provide an ozone generating apparatus having a compact form.

Embodiment 4

Figure 22:
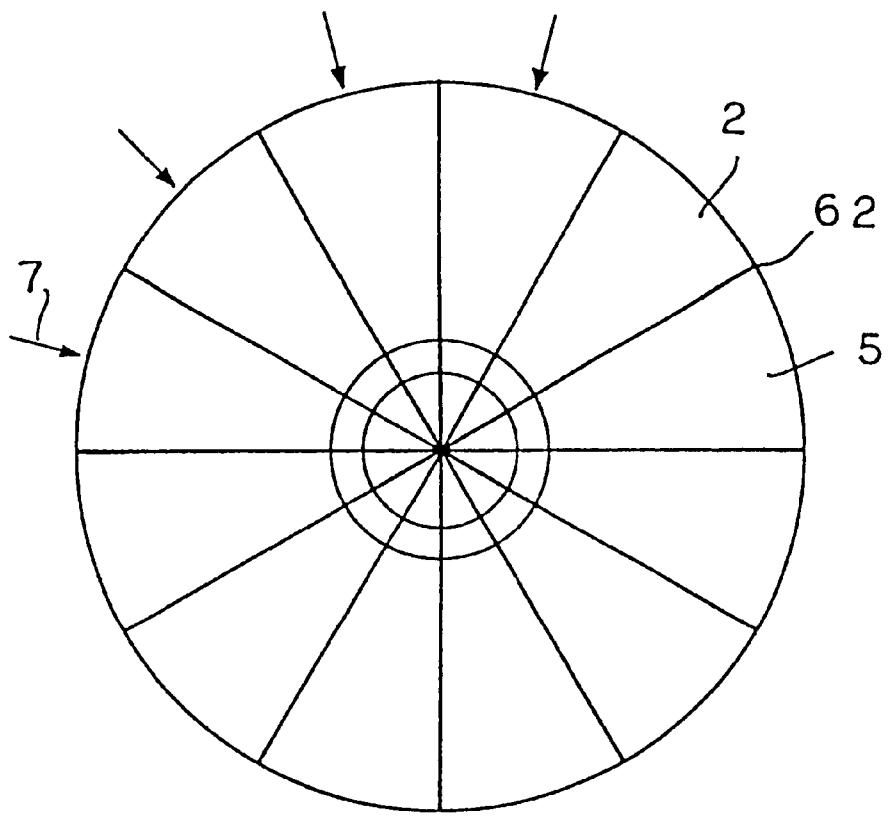
FIG. 22 is a plan view showing a thread-like spacer in a fourth embodiment of the present invention.

Though descriptions have been given of a case where the flat spacer 61 is inserted into the discharge space 5 in the embodiments 1 to 3, as shown in FIG. 22, a thread-like spacer 62 may be employed to provide the same effect. In this case, since a diameter of the thread-like material is equivalent to a discharge gap length, the spacer can be fabricated at lower cost, and an air gap length d can be optionally set.

Embodiment 5

Figure 23:
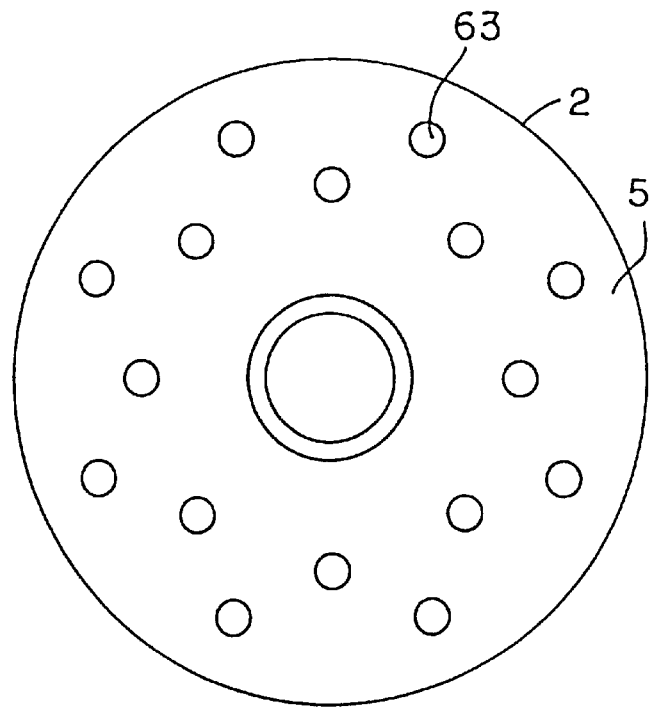
FIG. 23 is a plan view showing metallic spacers disposed in a stepping stone fashion, in a fifth embodiment of the present invention.

Though descriptions have been given of the spacers 61 and 62 forming the radial gas passage in the embodiments 1 to 4, the gas passage and the spacer may be provided in optional forms. As shown in FIG. 23, spacers 63 forming a non-discharge portion may be distributed in a stepping stone fashion to cover substantially an entire discharge area. It is thereby possible to provide the same effect until the above condition is met by a ratio of a discharge portion area to a non-discharge portion area.

Embodiment 6

Figure 24:
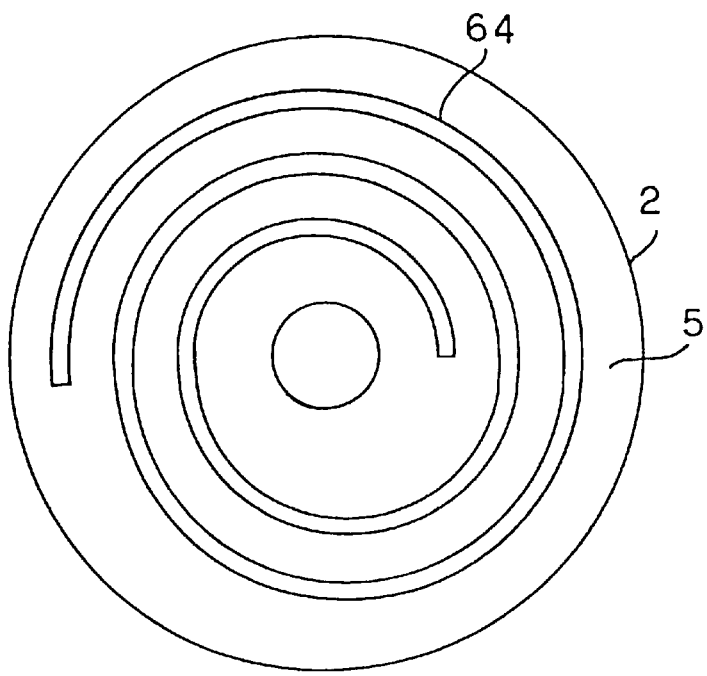
FIG. 24 is a plan view showing a spiral metallic spacer in a sixth embodiment of the present invention.

FIG. 24 shows modification of the embodiment 5. A spacer 64 is helically provided to form a non-discharge portion. It is thereby possible to provide a uniform gas flow in a discharge portion.

Embodiment 7

Though descriptions have been given of the embodiments of the metallic spacer, the spacer may be made of insulating material. It is thereby possible to reduce a reactive induced current flowing in a non-discharge portion, and provide higher power factor in power supply. In this case, it is effective to employ a low dielectric constant, high withstand voltage, a small dielectric loss tangent (tan δ), and a material having high coefficient of heat transfer. A general standard can be given as follows:

Dielectric constant of 20 or less;

Withstand voltage of 5 kV/mm or more;

Tan δ of 0.1% or less; and

Coefficient of heat transfer of 0.1 W/(cm·deg)

However, it must be noted that, except the withstand voltage and the dielectric loss tangent, the above conditions should not be always met. A typical material includes alumina ceramics, beryllia, glass, diamond, and so forth.

Embodiment 8

Figure 16:
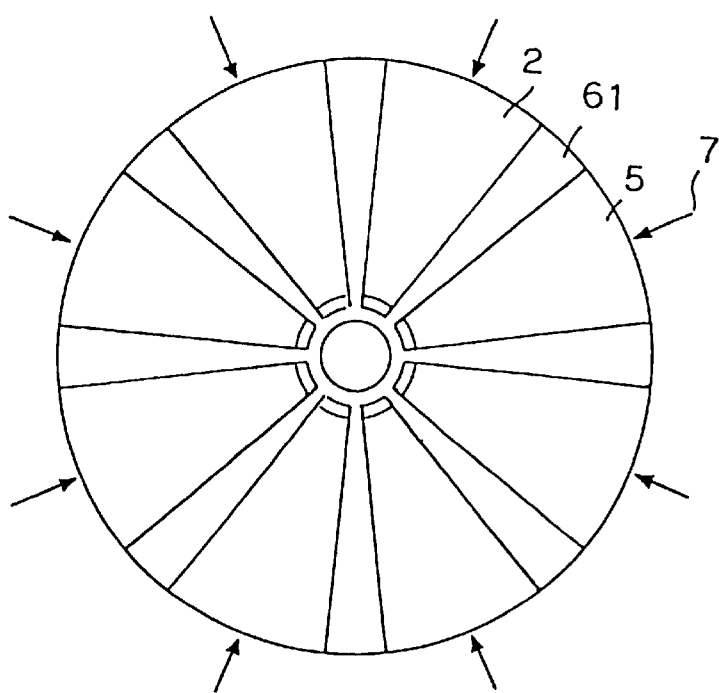
FIG. 16 is a plan view showing a radial metallic spacer in the first embodiment of the present invention.
Figure 25:
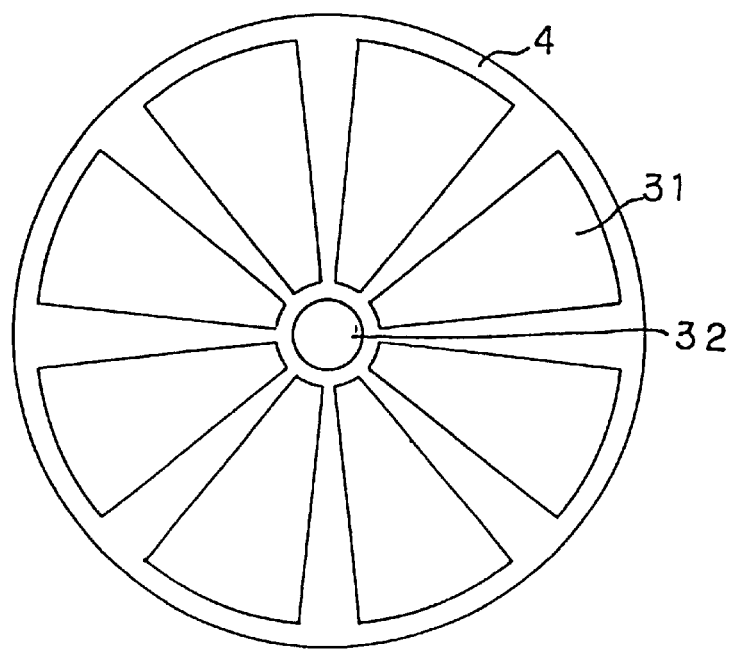
FIG. 25 is a plan view showing a position to mount a conduction layer in a seventh embodiment of the present invention.

In view of prevention of the reactive induced current, it is important to mount a conduction layer 31 on a ceramic plate 4 only at its surface portion corresponding to a discharge portion. FIG. 25 shows the surface of the ceramic plate 4 corresponding to a radial discharge space shown in FIG. 16. Since the surface portions not covered by the spacer 61 can serve as the discharge portions in FIG. 16, the conduction layers 31 are mounted to positions corresponding to the discharge portions of FIG. 16 as shown in FIG. 25 in the embodiment 8. In the drawing, reference numeral 32 means a hole provided in the ceramic plate 4 at its intermediate position to serve as a gas passage. In the embodiment 8, voltage is applied to only the discharge portion, and no voltage is fed to non-discharge portion (covered by the spacer) so that no induced current flows in the non-discharge portion. It is thereby possible to efficiently supply power to the discharge portion.

Embodiment 9

Figure 26:
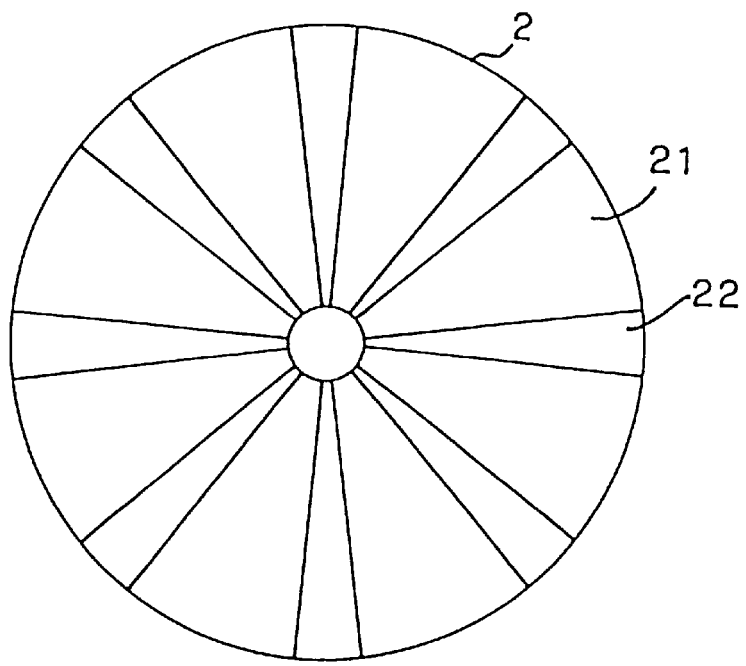
FIG. 26 is a plan view showing a grounded electrode which is partially recessed in an eighth embodiment of the present invention.

It is possible to reduce the number of parts by integrally forming a grounded electrode 2 and a non-discharge portion. In FIG. 26, the grounded electrode 2 is recessed to provide groove portions corresponding to discharge portions so that the grounded electrode 2 can also serve as a spacer. In the drawing, reference numeral 21 means a recessed groove portion (a concave portion), and 22 is a surface of a base material (a convex portion). Hence, when a dielectric electrode is mounted on the grounded electrode 2, the groove portion 21 serves as the discharge portion, and the surface 22 serves as the non-discharge portion. An effective method of grooving may include an etching method as well as typical mechanical machining.

Embodiment 10

Though a description has been given of a case where the grooves are provided in the grounded electrode 2 in the embodiment 9, there is another effective method in which a layer corresponding to a non-discharge portion is formed by using material identical with or different from an electrode material. In this case, in FIG. 26, reference numeral 21 means base material surfaces corresponding to discharge portions, and 22 is deposition portions corresponding to the non-discharge portions. An effective method of forming the layer may include a spray method, CVD (Chemical Vapor Deposition), plasma CVD, and so forth. Spraying material includes metallic material represented by aluminium, and dielectric material represented by ceramics or glass.

Embodiment 11

Figure 27:
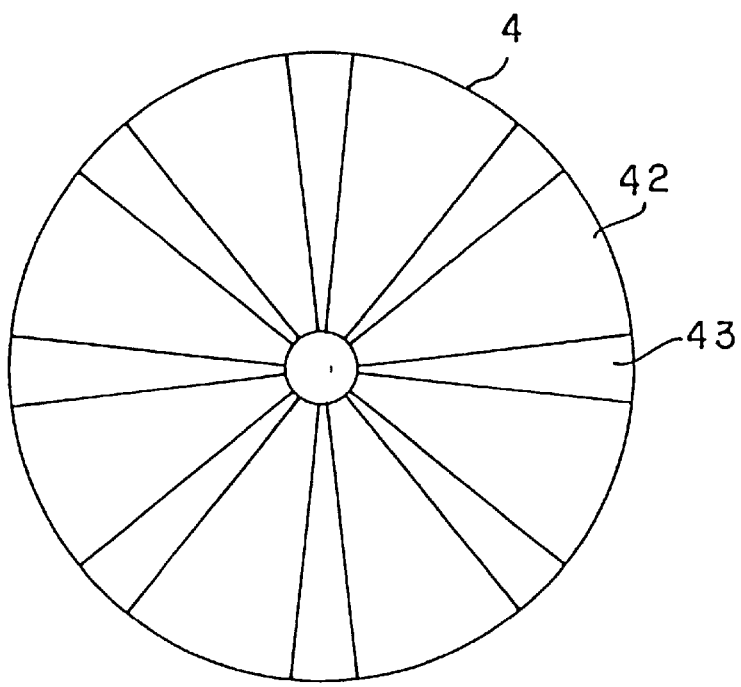
FIG. 27 is a plan view showing a deposition-type dielectric electrode in an eleventh embodiment of the present invention.

It is also effective to integrally form a dielectric and a non-discharge member. In FIG. 27, a dielectric plate is provided in an irregular form so as to concurrently serve as a spacer. In the drawing, reference numeral 4 means a ceramics plate, 42 is a surface of the ceramic plate 4, and 43 is a layer formed by spraying the same material, i.e., ceramics. When the ceramics plate 4 is combined with a grounded electrode 2 having a flat surface, reference numeral 42 means a discharge portion, and 43 is a non-discharge portion. Though convex portions are provided for a ceramics surface in FIG. 27, the convex portions may be mounted according to a spraying method and so forth as in the embodiments 9 and 10, or concave portions may be provided according to an etching method and so forth. The convex portion may be made of metallic material or dielectric material.

Embodiment 12

Figure 28:
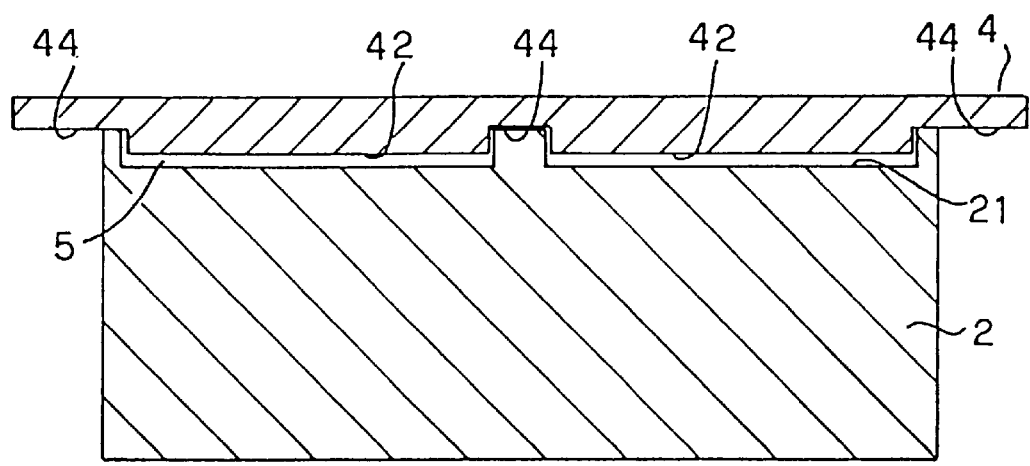
FIG. 28 is a sectional view showing a fitted-type electrode structure in a twelfth embodiment of the present invention.

Alternatively, as shown in FIG. 28, irregularity may be provided for a grounded electrode 2 and the ceramics plate 4 which are fitted with each other to define discharge spaces 5. It is thereby possible to enhance an electrode position accuracy. In the drawing, reference numeral 21 means a cut portion in the grounded electrode 2, 42 is surface (dielectrics) of the ceramics plate 4, and 44 is an etched portion (concave portions) of ceramic plate 4. A discharge gap length can be obtained by a difference between a length of the recessed portion (the discharge space 5) in the grounded electrode 2 and a length of the etched portion 44 in the ceramics plate 4. Needless to say, in a similar manner, an air gap may be defined by a convex portion of the metallic electrode and a concave portion in the dielectric, resulting in the same effect.

Embodiment 13

Figure 29:
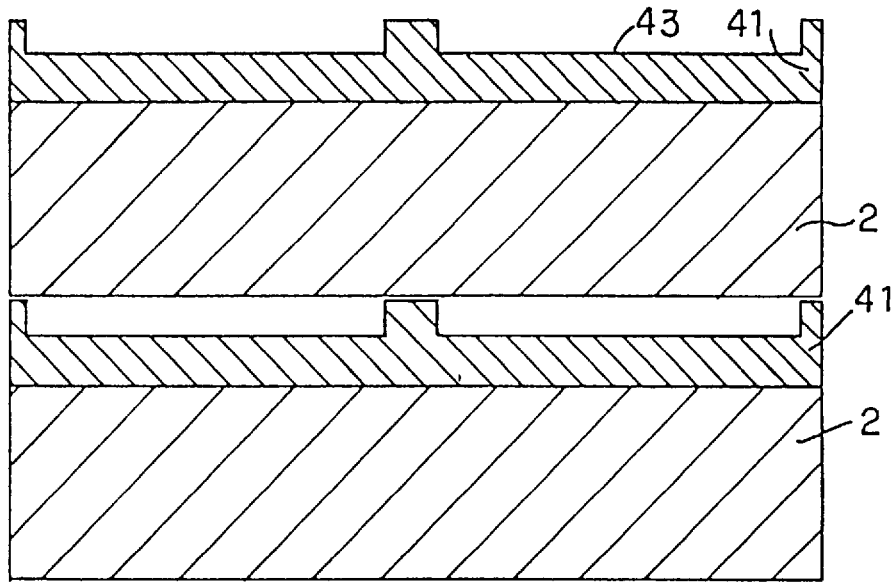
FIG. 29 is a sectional view showing an integral electrode structure in a thirteenth embodiment of the present invention.
Figure 30:
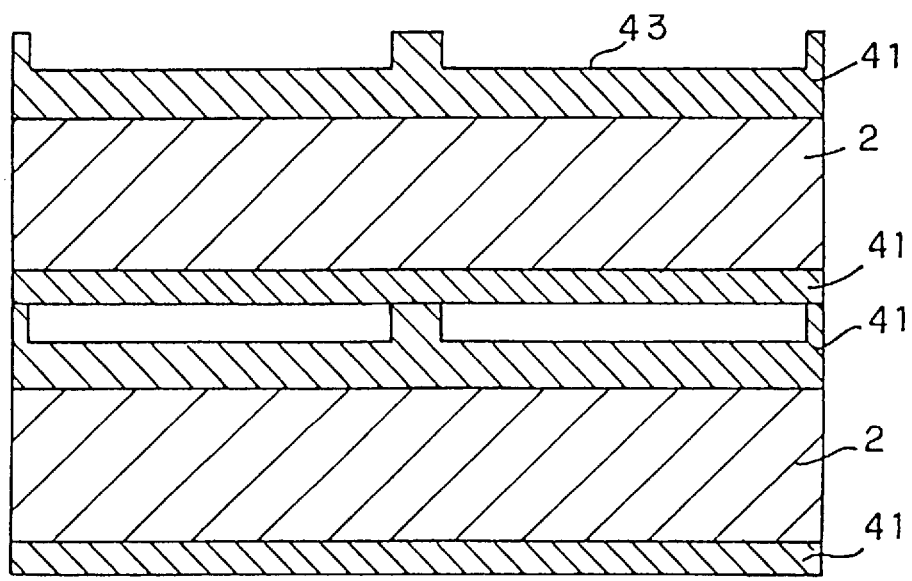
FIG. 30 is a sectional view showing a modified integral electrode in the thirteenth embodiment of the present invention.

Alternatively, as shown in FIG. 29, an electrode may have an integral structure so as to provide all functions of a grounded electrode, a dielectric electrode, and a spacer. In FIG. 29, reference numeral 2 means metallic grounded electrodes, reference numeral 41 is dielectric layers applied onto the grounded electrodes 2 and made of ceramics, glass, and so forth, and reference numeral 43 is a portion which is cut according to an etching method or mechanical machining. When the integral electrodes fabricated in such a way are stacked as in the drawing, the cut portions 43 can very simply form discharge spaces, and portions without cutting can very simply form non-discharge spaces. Further, as shown in FIG. 30, if an additional dielectric 41 is applied to a surface opposed to a surface coated with the dielectric in FIG. 29, more stable discharge can be obtained.

Embodiment 14

Figure 31:
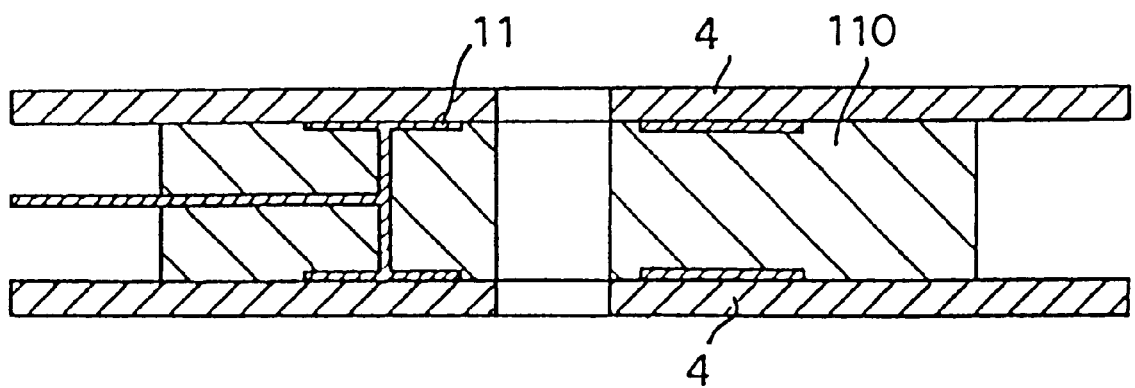
FIG. 31 is a sectional view showing a mold-type buffer plate in a fourteenth embodiment of the present invention.

Though the stress buffer plate 100 made of EP rubber is shown in FIG. 7, a gas may leak from between the stress buffer plates 100, or between the stress buffer plate 100 and the ceramics plate 4. In order to avoid the problem, as shown in FIG. 31, a gap between ceramics plates 4 may be integrally molded by an elastic material 110 such as filler material made of silicone rubber, thereby eliminating the problem of the gas leakage. Since the integral molding is not required for the ceramics plates 4, only the stress buffer plate 100 and a power supply plate 11 may be molded, thereby avoiding the gas leakage from a gap between stress buffer plates 100. In FIG. 31, a conduction layer 31 interposed between a power supply plate 11 and the ceramics plate 4 is not shown.

Embodiment 15

Figure 32:
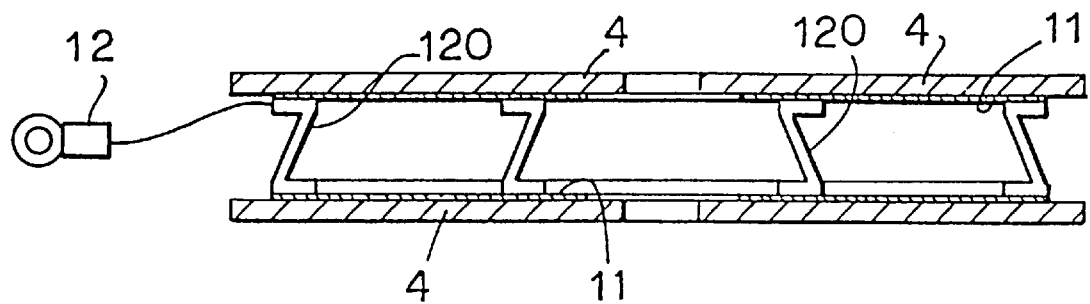
FIG. 32 is a sectional view showing a stress buffer member in a fifteenth embodiment of the present invention.

Alternatively, as shown in FIG. 32A, spring-like metallic rings (elastic bodies) 120 such as bellows may be inserted into a gap between two ceramics plates 4, and power supply plates 11 mounted on surfaces of unillustrated conduction layers 31 may be jointed to circumferential portions of the metallic rings 120. FIG. 32B is a top view of the embodiment of FIG. 32A. In FIG. 32B, the top ceramic plate 4 is not shown so that the configuration and location of metallic rings 120 can be seen. It is thereby possible to completely avoid gas leakage, and sufficiently provide a stress buffer effect. In the embodiment, the metallic ring 120 includes two kinds of Kovar materials having a thickness of 0.5 mm and each different diameter, and upper and lower circumferential portions thereof are jointed to the conduction layers 31 formed on the dielectric plates 4.

Embodiment 16

In the structure described in the embodiment 15, though the gas leakage from the gap between dielectric plates 4 can be avoided, an inner space surrounded by both ring portions of the metallic ring 120 is sealed completely. Hence, stress may be generated with respect to both the ring portions and the dielectric plates 4 according to a variation in outside atmospheric pressure. In order to avoid the problem, an outer ring portion of the metallic ring 120 may be jointed to dielectric layers 31 so as not to establish complete sealing, and spot joint may be made to provide an air escape hole (a gap). The spot joint at the outer ring portion is required because an active ozone gas is present at an intermediate portion of the dielectric plate 4.

Embodiment 17

Figure 33:
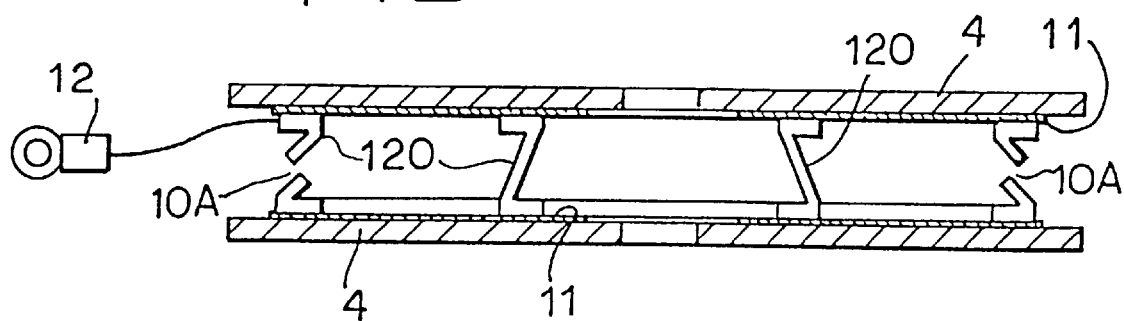
FIG. 33 is a sectional view showing a stress buffer member in a seventeenth embodiment of the present invention.

Alternatively, as shown in FIG. 33A, a side wall of a metallic ring 120 may be partially provided with an air escape hole 10A (a gap). FIG. 33B is a top view of the embodiment of FIG. 33A. In FIG. 33B, the top ceramic plate 4 is not shown so that the configuration and location of metallic rings 120 can be seen. As in the embodiment 16, an outer ring portion is preferably partially provided with the air escape hole 10A.

Embodiment 18

Figure 34:
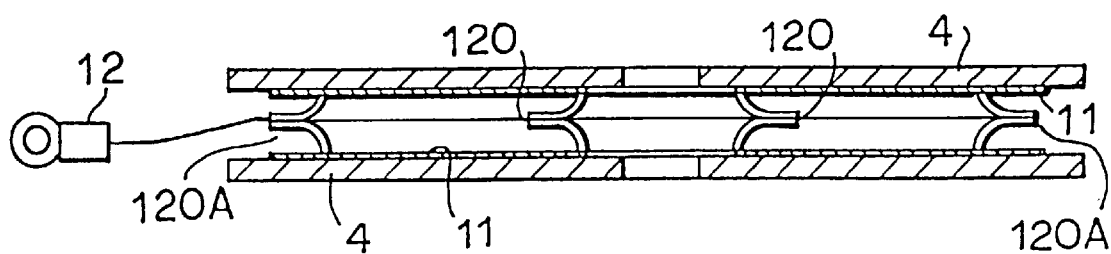
FIG. 34 is a sectional view showing a stress buffer member in an eighteenth embodiment of the present invention.

Alternatively, as shown in FIG. 34A, a side wall of a metallic ring 120 may be provided in a form having an intermediate folded portion 120A. FIG. 34B is a top view of the embodiment of FIG. 34A. In FIG. 34B, the top ceramic plate 4 is not shown so that the configuration and location of metallic rings 120 can be seen. It is thereby possible to adjust an elastic constant of the metallic ring 120 to the optimal value.

Embodiment 19

Figure 35:
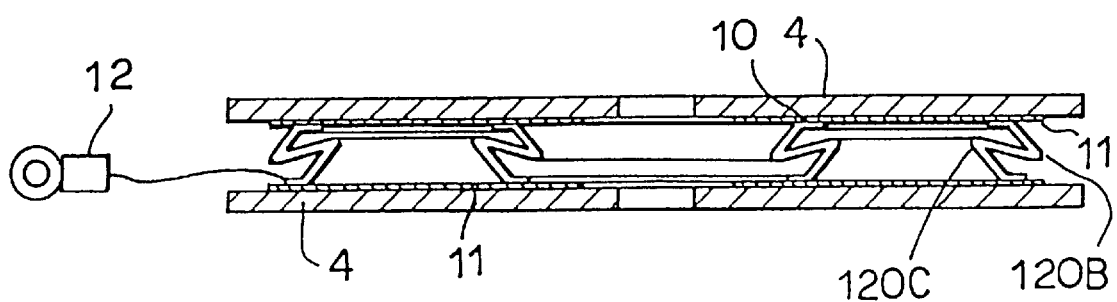
FIG. 35 is a sectional view showing a stress buffer member in a nineteenth embodiment of the present invention.

Alternatively, as shown in FIG. 35A, a side wall of a metallic ring 120 may be provided to have a plurality of folded portions 120B and 120C as viewed in a sectional form. FIG. 35B is a top view of the embodiment of FIG. 35A. In FIG. 35B, the top ceramic plate 4 is not shown so that the configuration and location of metallic rings 120 can be seen. It is also possible to adjust an elastic constant of the metallic ring 120 to the optimal value.

Embodiment 20

In the above embodiments, an annular member is employed as the metallic ring 120 according to disk-like shapes of electrode portions such as the conduction layer 31 including the ceramics plate 4, or the power supply plate 11. Needless to say, the electrode portions such as the ceramics plate 4, the conduction layer 31, and the power supply plate 11 may include plate members having a polygonal form such as a triangle form, or a quadrangular form. In such a case, it must be noted that the metallic ring 120 should be provided in a hollow polygonal form such as a hollow triangle pole or a hollow square pole according to the form of the electrode.

Embodiment 21

Figure 36:
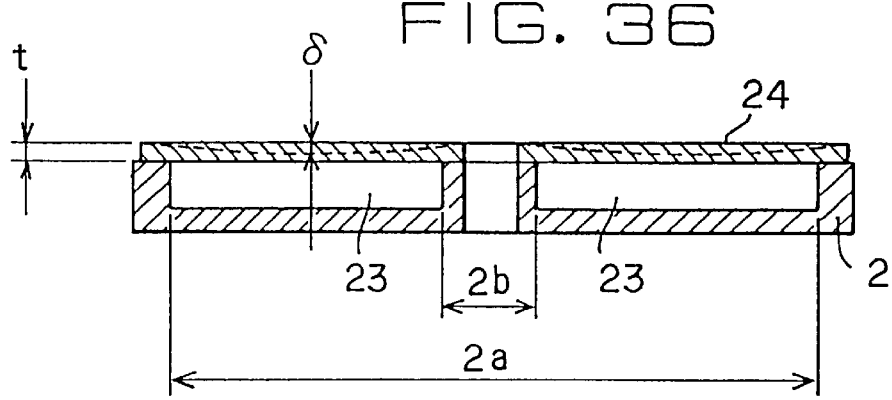
FIG. 36 is a sectional view showing a grounded electrode in a twenty-first embodiment of the present invention.

As shown in FIG. 36, a cavity 23 (a water channel) is provided in a grounded electrode 2 to pass cooling water, but not shown in the drawings as described above. An upper plate (an electrode) 24 is mounted on an upper surface of the cavity 23 to provide a constant air gap length of a discharge space in an ozone generating apparatus. Here, there are not shown component parts including a spacer 61, a ceramics plate 4, a conduction layer 31, a power supply plate 11, a stress buffer plate 100, and so forth.

The ozone generating apparatus is generally operated while passing a high-pressure gas at a pressure of 1.5 atm or more. Hence, a pressure difference may be caused between a gas passage above the upper plate 24 and the cooling water channel under the upper plate 24, and the upper plate 24 may be deflected toward the side of the cavity 23 as shown in FIG. 36. Here, when an amount of deflection is defined as δ, the amount of deflection δ can be expressed by using a radius a of the water channel and a thickness t of the upper plate 24 as follows:

$$\delta = K_1 \times q a^4 / D$$

$$D = Et^3 / \{12(1-v^2)\}$$

where q is load (kg/cm$^2$) of the upper plate 24, E is Young's modulus (kg/cm$^2$), v is Poisson's ratio of the upper plate 24, b is a radius (cm) of an inner circle of the upper plate 24 and a is a radius (cm) of an outer circle of the upper plate 24, and $K_1$ is a constant determined by b/a. When b/a=0.1, $K_1$ is equal to 0.006 (see Raymond J. Roark and W. C. Young, Formulas for Stress and Strain, 5th ed., International Editions, McGraw-Hill, [1986], p.339).

As is clear from the expressions, the amount of deflection δ can be reduced by increasing the thickness t of the upper plate 24. However, since the grounded electrode 2 is typically made of stainless having low coefficient of heat transfer, an increase in the thickness t results in a hot upper plate 24. Thus, it is impossible to employ the design of an increased thickness t. For example, when the air gap length of the discharge space is 0.2 mm, it is necessary to set the thickness of the grounded electrode 2 to a value of about 4 mm or less. Therefore, the design should be made in consideration of some deflection of the upper plate 24 of the grounded electrode 2. When the upper plate 24 is deflected, the discharge gap length may be varied, and ozone generating characteristics such as ozone generating efficiency η may be degraded (see FIGS. 10 and 18).

In the embodiment, in view of the facts as set forth above, even when the upper plate 24 of the grounded electrode 2 is deflected, the air gap length of the discharge space is not varied. That is, the deflection of the upper plate 24 can be offset by providing deflection for the ceramics plate 4 (see FIG. 7) opposed to the upper plate 24 according to the deflection of the upper plate 24. Specifically, for example, as in the embodiments 15 to 19 shown in FIGS. 32 to 35, an urging member having repulsion, such as a metallic ring 120, may be mounted on a back face of the ceramics plate 4, thereby applying load to the ceramics plate 4. When qd means the load applied to the ceramics plate 4, $E_e$ is Young's modulus of the upper plate 24 of the grounded electrode 2, $t_e$ is the thickness of the upper plate 24, $E_d$ is Young's modulus of the ceramics plate 4, $t_d$ is a thickness of the ceramics plate 4, $q_e$ is a pressure difference applied to the upper plate 24 between a high-pressure gas and cooling water, the load $q_d$ may meet the following expression with respect to the pressure difference $q_e$:

$$q_d \approx q_e \times (E_d/E_e) \times (t_d/t_e)^3$$

When the load $q_d$ becomes an extremely larger value than a value meeting the above expression, the ceramics plate 4 is broken. When the load $q_d$ becomes an extremely smaller value, it is impossible to keep a constant air gap length of the discharge space. In a typical structure, the load $q_d$ may be a value in an approximate range of 0.1 to 0.5 kg/cm$^2$. For application of the load, the design may be made such that, when n urging members having a spring constant k (kgf/mm) are compressed by 1 mm, the following expression can be held: $q_d \times S = nkl$ where S is an area of the upper plate 24.

Embodiment 22

Figure 37:
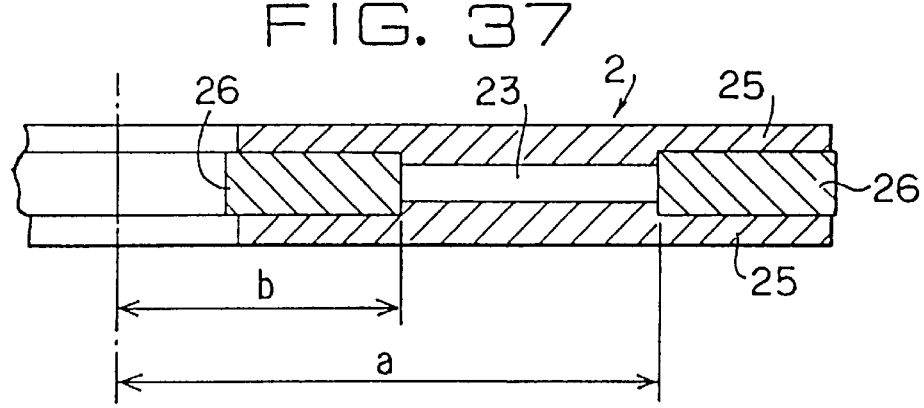
FIG. 37 is a sectional view showing a grounded electrode in a twenty-second embodiment of the present invention.

Alternatively, as shown in FIG. 37, two (metallic) ring members 26, 26 having each different diameter may be made of metal having high coefficient of heat transfer such as copper, and a grounded electrode 2 may be structured by interposing the two ring members 26, 26 between two stainless plates (metallic plates) 25, 25. It is thereby possible to efficiently cool the stainless plates 25 through the ring members 26, 26 having high coefficient of heat transfer. Therefore, in the design, a radius a of an outer circle of a cavity 23 can be made smaller, and a radius b of an inner circle thereof can be made larger, that is, the volume of the cavity 23 can be made smaller. It is thereby possible to maintain high mechanical strength of the grounded electrode 2 even when a thickness of the stainless plate 25 is reduced. In such a structure, a heat removing efficiency can be improved by brazed joint between the stainless plate 25 and the ring member 26, that is, by pouring brazing material to a contact surface between the stainless plate 25 and the ring member 26.

Embodiment 23

Figure 38:
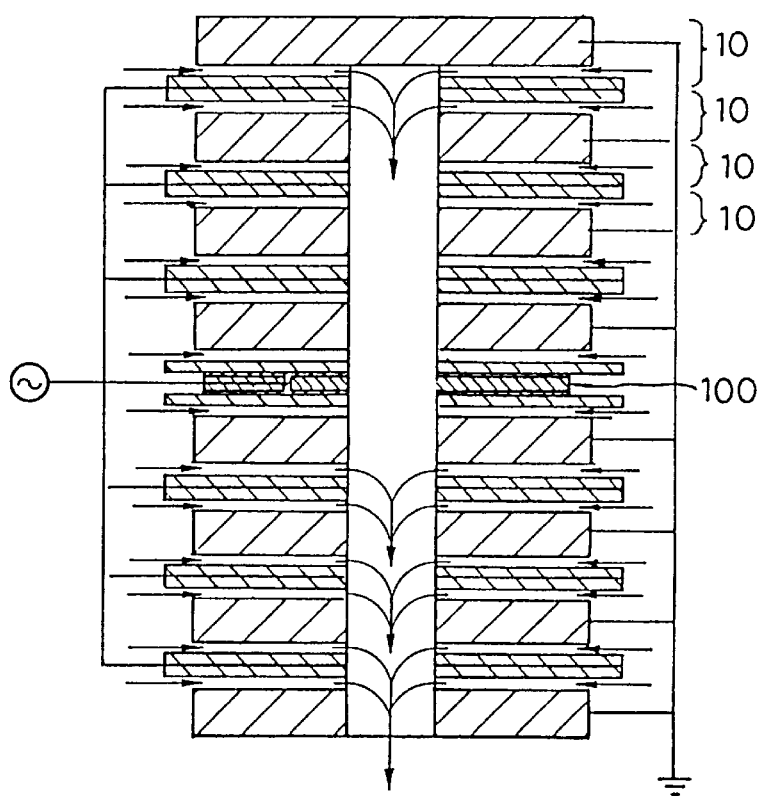
FIG. 38 is a sectional view showing a state in which one stress buffer plate is mounted in a group of ozone generating units in a twenty-third embodiment of the present invention.

In the above embodiments, descriptions have been given of a case where the one stress buffer plate 100 is inserted into the two ozone generating units including the two discharge spaces. However, the stress buffer plate 100 may be used for a small-capacity ozone generating apparatus including a single discharge space, resulting in the same effect. That is, one stress buffer plate 100 is used for an ozone generating apparatus including one ozone generating unit having a structure identical with a lower half of a structure shown in FIG. 7. It is thereby possible to provide the above effects such as maintenance of an air gap length of the discharge space, or prevention of breakage of a dielectric in the ozone generating apparatus. A stress buffer plate is not always required for a ozone generating unit. Further, as shown in FIG. 38, some effects can be obtained by simply providing only one stress buffer plate 100 for a plurality of ozone generating units 10. This provides the effects in that, for example, the number of parts can be reduced and gas leakage from the stress buffer plate 100 can be avoided.

Embodiment 24

In the embodiment 1 shown in FIG. 7, the oxygen-containing gas is sucked from the outer peripheral portion of the discharge space 5 to pass through the gas passage including the non-discharge portion and the discharge portion, and is exhausted as an ozonized gas through an exhaust vent mounted at an intermediate portion. Such a gas flow is used because of the following major advantages.

1) Since a highly active gas containing ozone never leaks to the outer peripheral portion of the discharge space 5, ozone resistance is not required for material used on the outside of the discharge space 5 so that alternative materials can be employed.

2) In a gas downstream area of the discharge portion in which discharge becomes unstable due to a high ozone concentration, a gas flow rate is accelerated so that stable discharge can be easily obtained even in case of the high ozone concentration.

Therefore, this method is effective when an ozone generating apparatus should be used with the high ozone concentration causing the unstable discharge, or the apparatus should be made of inexpensive materials.

However, as shown in FIG. 39, a gas may be introduced into the intermediate portion of the ozone generating apparatus, and the gas may be exhausted to the outer peripheral portion of the discharge space 5. In this case, it is possible to provide the following advantages.

1) A sectional area of the gas passage becomes larger in a direction closer to a gas downstream of the discharge space. In general, a gas temperature is increased and a flow rate is accelerated in the gas downstream, resulting in a rapid increase in pressure loss in the gas passage. However, in the embodiment employing the structure, the passage can be provided to have a relatively low pressure loss.

2) It is known that an increase in an amount of moisture in the discharge space decreases an ozone generating efficiency. However, in the structure, the amount of moisture in the discharge space is not increased even when electrode cooling water leaks to some extent, and the ozone generating efficiency is not reduced due to the water.

Accordingly, this method is effective when water leakage may occur or the pressure loss in a gas flow system should be reduced.

Embodiment 25

FIGS. 40A and 40B show a large-capacity ozone generating apparatus including forty ozone generating units, one of which is shown in FIG. 7. The structure enables 5 kg ozone generation per hour. In the drawings, reference numeral 200 means a pressure vessel (a vessel), 250 is a group of ozone generating units in which the ozone generating units shown in FIG. 7 are laterally stacked, 210 is a cooling water supply port, 211 is a cooling water exhaust port, 220 is high voltage supply ports, and 230 is ground ports. Reference numeral 240 means supporting poles, and the group of ozone generating units 250 are respectively positioned by the two supporting poles 240. An oxygen-containing gas (not shown) is introduced from the outside of the pressure vessel 200 to be sucked from a peripheral portion of the group of ozone generating units 250, and is finally exhausted as an ozonized gas through an exhaust portion in a direction of the arrow 8. In the ozone generating apparatus, the two supporting poles 240 are disposed to laterally stack the group of ozone generating units 250. It is thereby possible to easily position the group of ozone generating units during installation, and carry out maintenance in a short time.

Embodiment 26

Figure 41A:
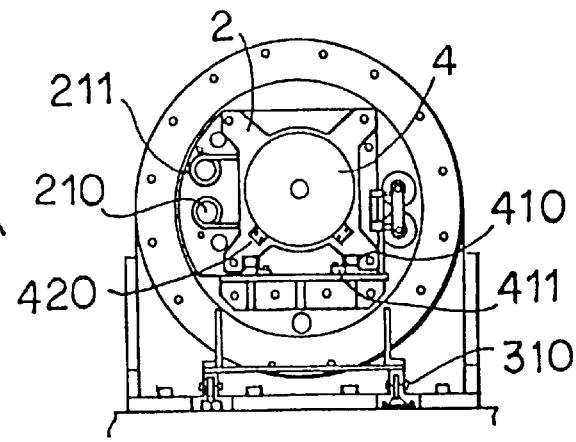
FIGS. 41A, 41B, and 41C are a side, partially cut-away view, a perspective view as viewed from the left side, and a right side front view showing a large-capacity ozone generating apparatus in a twenty-sixth embodiment of the present invention.
Figure 41B:
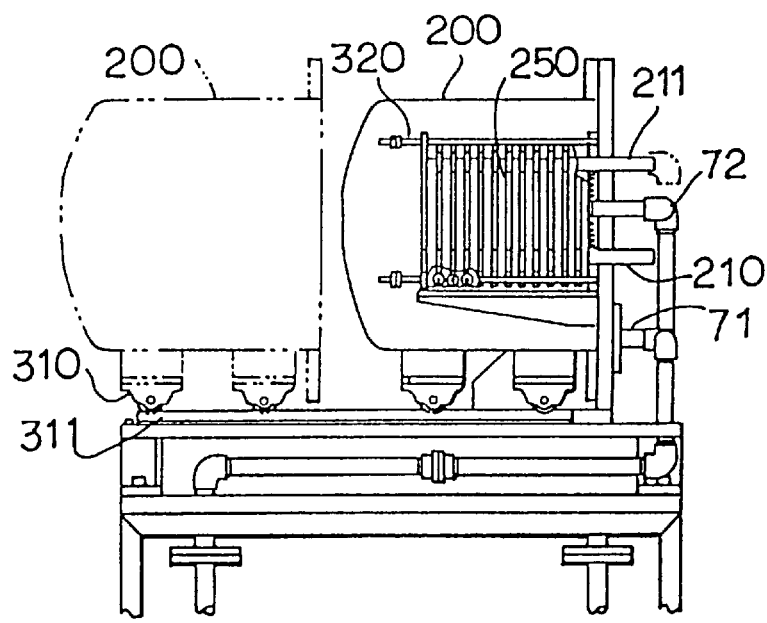
Figure 41C:
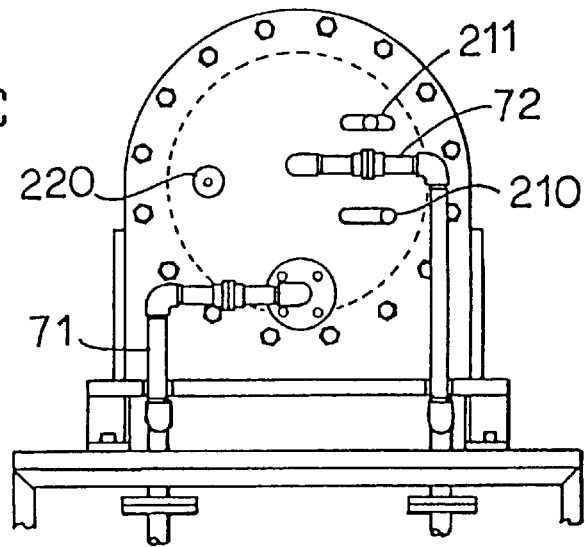

FIG. 41B is a side, partially cut-away view showing another embodiment of a large-capacity ozone generating apparatus, FIG. 41C is a perspective view thereof as viewed from the left side, and FIG. 41A is a right side front view thereof.

In the embodiment, twelve ozone generating units, one of which is shown in FIG. 7, are stacked to form a group of ozone generating units 250 which are fixed with pressure by electrode unit pressing springs (elastic bodies) 320 through the stress buffer plate 100. The pressing spring 320 is set so as to apply the load g meeting the expression described in the embodiment 21 to the group of ozone generating units 250. For a spring constant of 5 kg/mm, the pressing spring 320 is compressed by 3 mm, thereby applying pressure of 15 kgw to the group of ozone generating units 250. Reference numeral 420 mean a positioning plate (positioning means) to keep a position accuracy of a ceramics plate 4 of each ozone generating unit, and the positioning plate 420 is mounted to a grounded electrode 2 of each ozone generating unit.

The group of ozone generating units 250 are mounted in a pressure vessel 200, and high voltage is applied to the ozone generating units through a high voltage supply port 220. A raw gas for generating ozone is introduced through a gas supply port 71 into the pressure vessel 200, and is sucked into a discharge space from an outer peripheral portion of each ozone generating unit. Subsequently, the raw gas is partially ozonized in the discharge space to be exhausted through a gas exhaust port 72.

Since each generating unit in the ozone generating apparatus requires periodic check, guide rollers (sliding means) 310 are provided for the pressure vessel 200, and the pressure vessel 200 is mounted on rails 311 so as to move to the left in FIG. 41B. Check is made by moving the pressure vessel 200 to the left, and exposing the group of ozone generating units 250. When an electrode of the ozone generating unit is exchanged during the check, the electrode can be replaced by loosening the pressing spring 320 and drawing the ceramics plate 4 having a conduction layer 31, interposed between the grounded electrodes 2. For this purpose, bearings (moving means) 410 for sliding the grounded electrodes 2 are attached to the grounded electrodes 2, and the grounded electrodes 2 can be slid from side to side by the bearings 410 rotating on rails 411. As shown in FIGS. 41A, 41B, and 41C, a cooling water supply port 210 and a cooling water exhaust port 211 are connected to the grounded electrode 2 so as to be moved in a horizontal direction.

Embodiment 27

A description will now be given of one embodiment of a grounded electrode 2 which can suitably be used in a stacked form as shown in FIGS. 41A, 41B, and 41C.

Figure 42A:
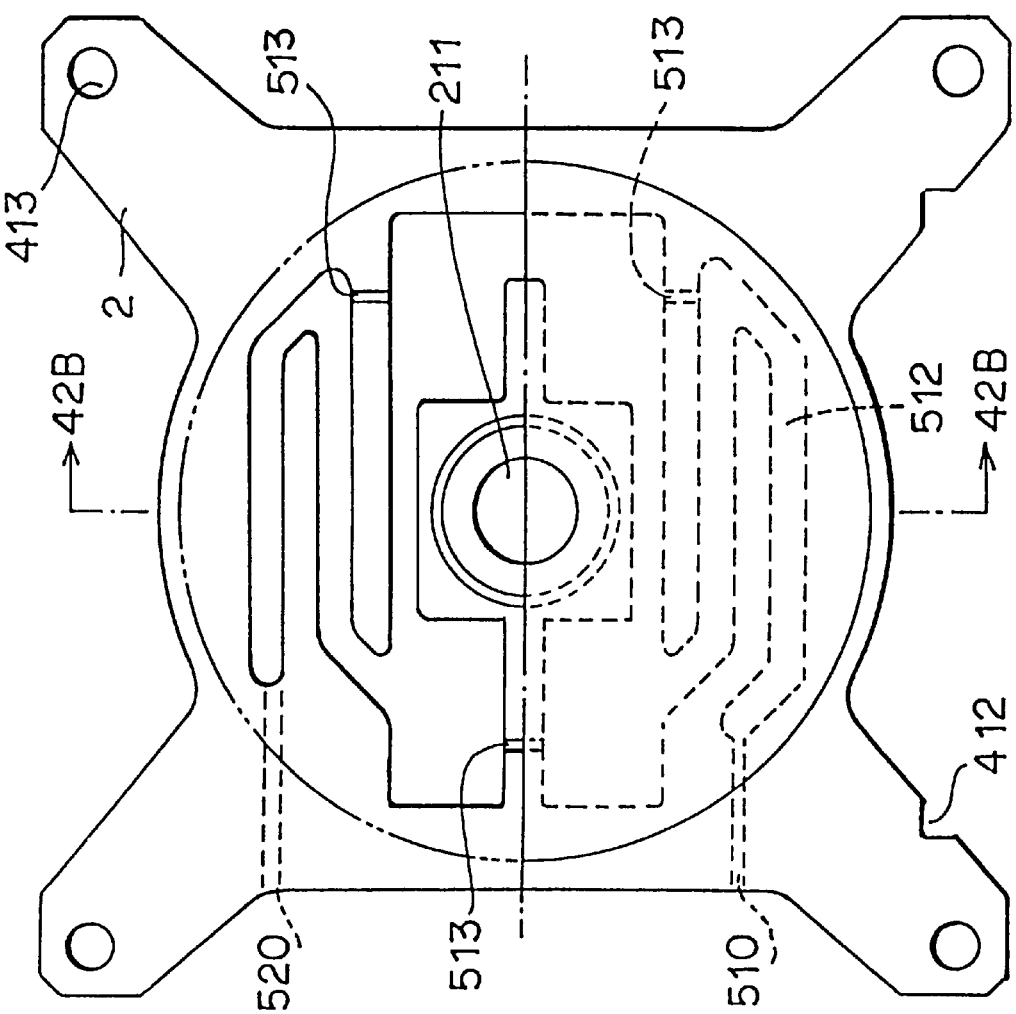
FIG. 42A is a plan, upper half cut-away view of a grounded electrode in a twenty-seventh embodiment of the present invention.
Figure 42B:
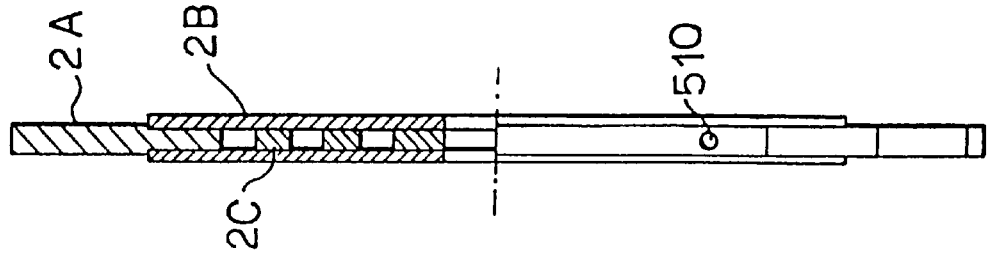
FIG. 42B is a side view thereof.

FIG. 42A is a plan, upper half cut-away view of one embodiment of the grounded electrode 2, and FIG. 42B is a part sectional, part side view thereof, the sectional part being taken along line 42B—42B of FIG. 42A. An upper half of the side view is a sectional view taken along center line B—B of the plan view.

Flat plates 2B and 2C are welded to both sides of a base plate 2A to form the grounded electrode 2, and the flat plates 2B and 2C serve as discharge surfaces. A cooling water channel 512 is provided in the base plate 2A by stamping press. In the drawing, reference numeral 412 means a notched portion to which a bearing 410 for sliding the grounded electrode 2 is attached, and the grounded electrode 2 can be positioned by the notched portion. Reference numeral 413 means a mounting hole for stack of the grounded electrodes 2, and the grounded electrodes 2 are stacked by fitting supporting poles into the mounting holes 413. Reference numeral 510 means a cooling water supply port, and 520 is a cooling water exhaust port. Cooling water is introduced into the grounded electrodes 2 through the supply port 510 to pass through the channel 512, and is exhausted through the exhaust port 520. The supply port 510 has a hole diameter sufficiently smaller than a sectional area of the channel 512, thereby providing a large pressure loss of the cooling water. Such a structure enables uniform flows of the cooling water through the plurality of grounded electrodes 2. Without portions having the large pressure loss, there is a disadvantage in that a large amount of cooling water flows in the grounded electrode 2 disposed closer to the cooling water supply port 210 shown in FIGS. 41A, 41B, and 41C, and a little amount of cooling water flows in the grounded electrode 2 disposed apart from the cooling water supply port 210.

The cooling water channel 512 is provided in a winding and elongated groove form so as to uniformly cool an entire surface of the grounded electrode 2. The groove-like channel 512 has a sectional area which is designed so as to pass the cooling water through the groove portion at a flow rate of 1 m/s or more. Further, the channel 512 is partially provided with pores (by-passes) 513 so as to effectively exhaust bubbles generated in the channel 512. As shown in FIG. 42, the pores 513 are provided at curved portions of the channel 512, at which the bubbles can easily be generated in view of fluid mechanics.

Embodiment 28

FIG. 43A is a plan, upper half cut-away view of another embodiment of the grounded electrode 2, and FIG. 43B is a part sectional, part side view thereof, the sectional part taken along line 43B—43B of FIG. 43A. An upper half of the side view is a sectional view taken along center line B—B of the plan view.

In the embodiment, a groove in a base plate 2A used as a channel 512 serves as a stopping groove 512a, and a back surface of the base plate 2A can be used as a discharge surface. Therefore, it is possible to form a grounded electrode 2 by welding a flat plate 2B to the one base plate 2A, thereby reducing the number of parts, and realizing cost reduction.

Embodiment 29

In the above embodiments, if the spacers 61 to 64 are fixed to the grounded electrode 2 or the ceramics plate 4 through adhesion or welding, thicknesses of the spacers 61 to 64 may be varied due to a thickness of adhesive or a welded portion, resulting in a lower accuracy. Hence, in a method of fixing the spacers 61 to 64, the spacers 61 to 64 having a sufficient thickness accuracy are interposed between the grounded electrode 2 and the ceramics plate 4 and are thereafter clamped. It is thereby possible to ensure a highly accurate air gap length at lower cost.

According to the method, the spacers 61 to 64 can be easily fixed when an ozone generating apparatus is formed by vertical stack of ozone generating units as shown in FIG. 38. On the other hand, as shown in FIGS. 40A, 40B, 41A, 41B, and 41C, the ozone generating apparatus may be formed by horizontal stack of the ozone generating units. In this case, if the spacers 61 to 64 are not temporarily fixed, it is difficult to stack the ozone generating units.

The embodiment is made to overcome the problem, and FIGS. 44A and 44B show a structure of the embodiment.

FIG. 44A is a plan view showing a state in which a spacer 65 is suspended by the grounded electrode 2 in the embodiment, and 44B is a sectional view showing a section taken along line 44B—44B of FIG. 44A.

As shown in FIGS. 44A and 44B, upper ends of the spacer 65 are folded at right angle to form claw portions (fitting portions) 422, and the claw portions 422 are fitted with spacer position fixing grooves (concave portions) 421 provided in an upper end of the grounded electrode 2. In such a structure, when the ozone generating units are horizontally stacked as shown in FIGS. 40 and 41, the claw portions 420 of the spacer 65 can be fitted with the grooves 421 in the grounded electrode 2 of each ozone generating unit. It is thereby possible to suspend and support the spacer 65 by the grounded electrode 2. In such a way, while the spacer 65 is held between the grounded electrode 2 and the ceramics plate 4 of each ozone generating unit, the ozone generating units can be entirely clamped in a stacked direction, thereby easily providing the ozone generating apparatus. That is, since the spacer 65 is held by the claw portions 420 onto the grounded electrode 2, a position of the spacer 65 is never deviated, and the spacer 65 is never dropped off during assembly of the ozone generating apparatus. Even when the ceramics plate 4 is curved to some extent, the ozone generating units can be entirely attached with pressure to each other in the stacked direction, thereby a stress buffer plate 100 pressing the ceramics plate 4 to correct the curved ceramics plate 4. Consequently, an air gap length accuracy of a discharge space of each generating unit is equivalent to an accuracy of the spacer 65. It is thereby possible to realize a highly accurate air gap length at extremely low cost, and facilitate operations such as assembly operation for the ozone generating apparatus, replacement operation for the ozone generating unit.

Embodiment 30

Figure 45A:
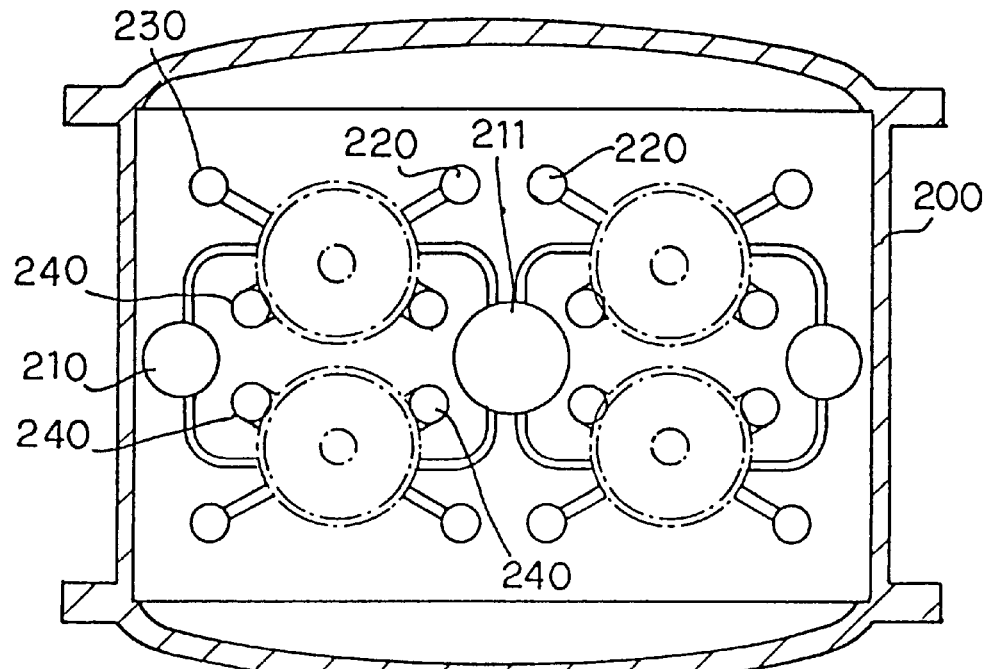
FIGS. 45A and 45B are a front view and a sectional view of a large-capacity ozone generating apparatus of a vertically stacked type in a thirtieth embodiment of the present invention.
Figure 45B:
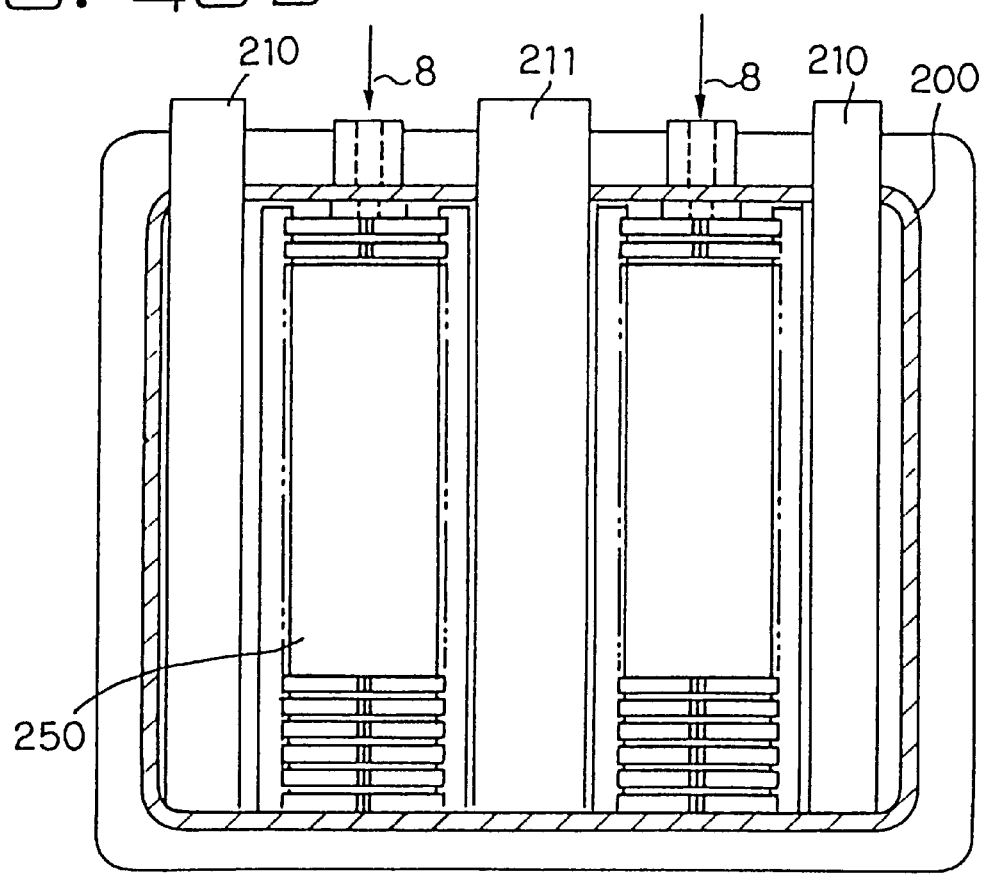

Alternatively, as shown FIGS. 45A and 45B, a group of ozone generating units 250 may be positioned by supporting poles 240, and the group of ozone generating units 250 may be stacked in a vertical direction.

Embodiment 31

Figure 46:
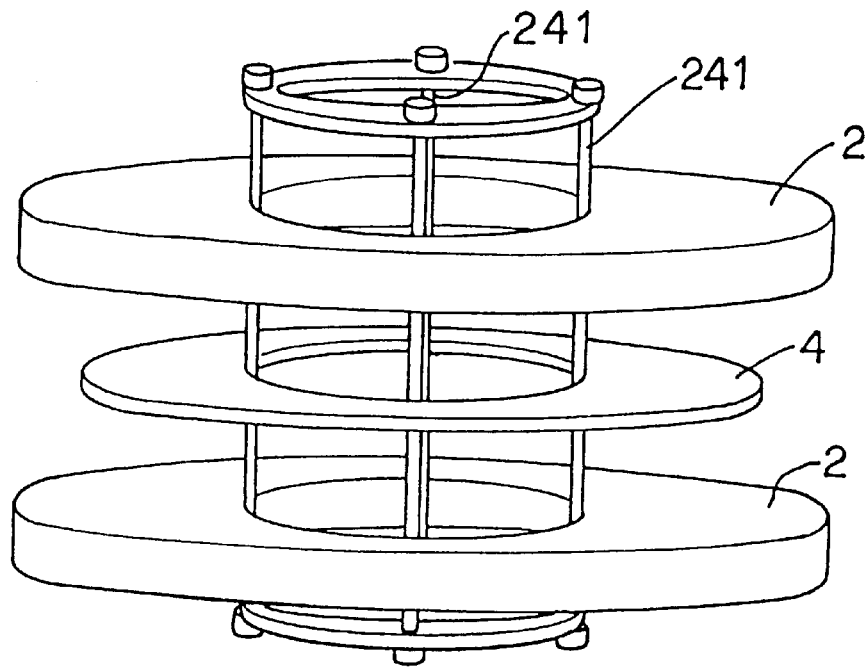
FIG. 46 is a perspective view showing supporting poles mounted in a cage-shaped form in a thirty-first embodiment of the present invention.

Alternatively, as shown in FIG. 46, cage-shaped poles 241 may sequentially be fitted into a grounded electrode 2, and a ceramics plate 4 to assemble an ozone generating apparatus. It is thereby possible to more easily position component parts of the ozone generating unit at low cost.

Embodiment 32

Figure 47A:
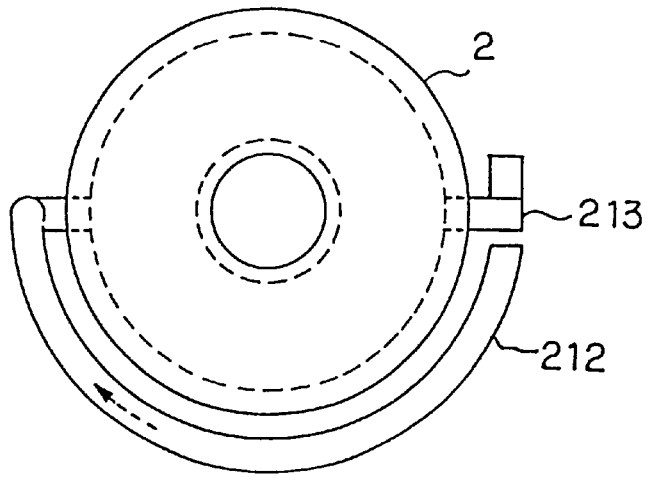
FIGS. 47A and 47B are a front view and a side view of a cooling water pipe in a large-capacity ozone generating apparatus of a stacked type in a thirty-second embodiment of the present invention.
Figure 47B:
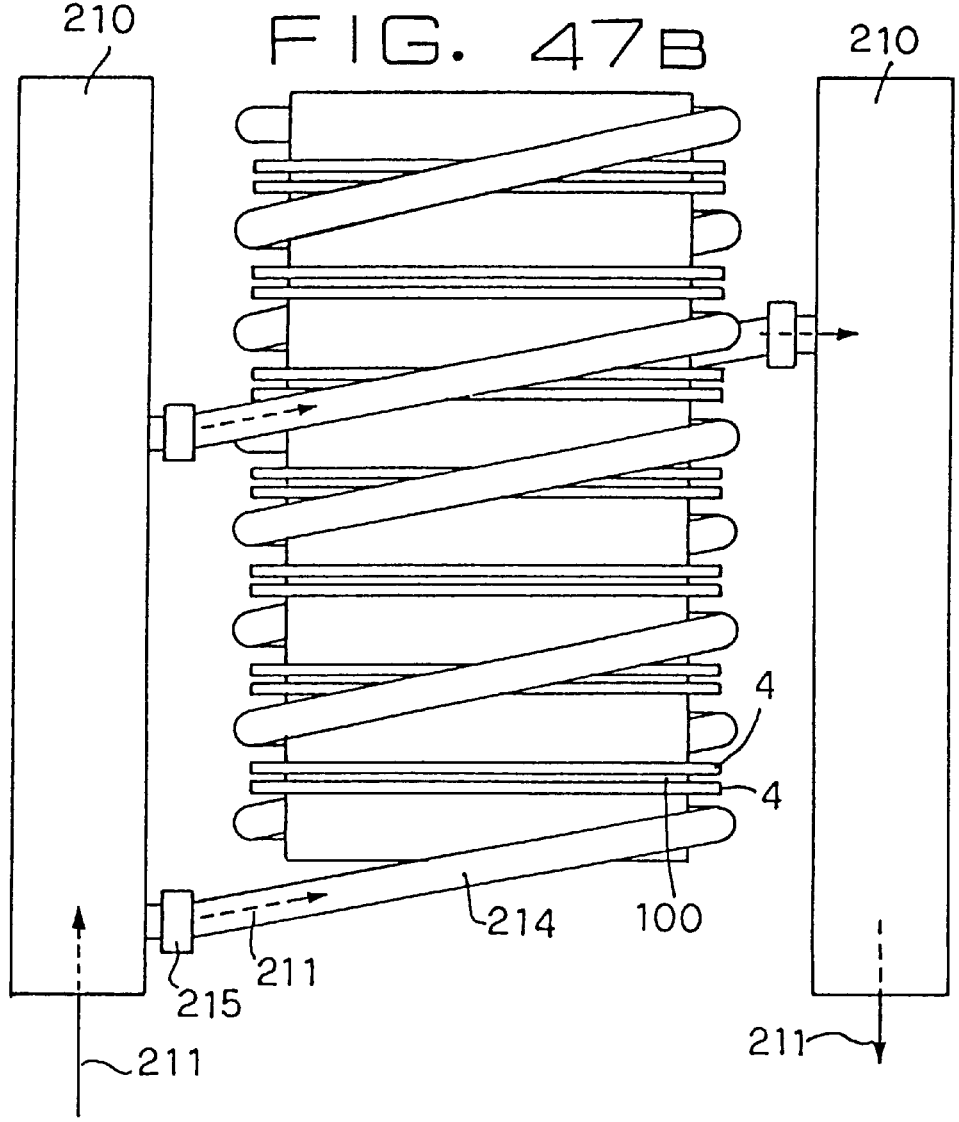

When ozone generating units are stacked in a lateral or vertical direction to provide a multi-stage structure, a complicated method is required to cool each metallic electrode. In case of a small-capacity ozone generating apparatus, a method of mounting a fin to the metallic electrode for cooling is effective as set forth above. However, for the purpose of design of a compact ozone generating apparatus, it is necessary to directly cool the electrode by using refrigerant such as water. In this case, each electrode requires two pipes connected to take in or exhaust water. In the multi-stage structure, all the pipes respectively connected to a water supply port results in complicated operation and lower reliability of the apparatus. The embodiment 32 is made to overcome the problems, and FIGS. 47A and 47B show a piping arrangement. In the ozone generating apparatus in the embodiment 32, grounded electrodes 2 and ceramics plates 4 are stacked in a multi-stage form through stress buffer plates 100, and a metallic pipe (refrigerant passing mechanism) 212 semicircularly surrounds the electrodes and is previously welded to the grounded electrodes 2 as shown in the drawing. The other water port is connected to a piping joint (refrigerant passing mechanism) 213. The ozone generating units including the grounded electrode 2 in the above state, the ceramics plate 4, and stress buffer plate 100 are stacked to provide, for example, a five-stage structure, and the pipe 212 is connected to the joint 213. The resultant one module is mounted in a main body to be connected to joints 215 of water supply ports 210 though the pipe (refrigerant passing mechanism) 214. In such a structure, the ozone generating module can be assembled outside the ozone generating apparatus main body, and only connecting operation to the water supply ports 210 is required in the main body. Thus, an operating efficiency can be improved, and there is an extremely little risk of water leakage in the main body.

Embodiment 33

Figure 48:
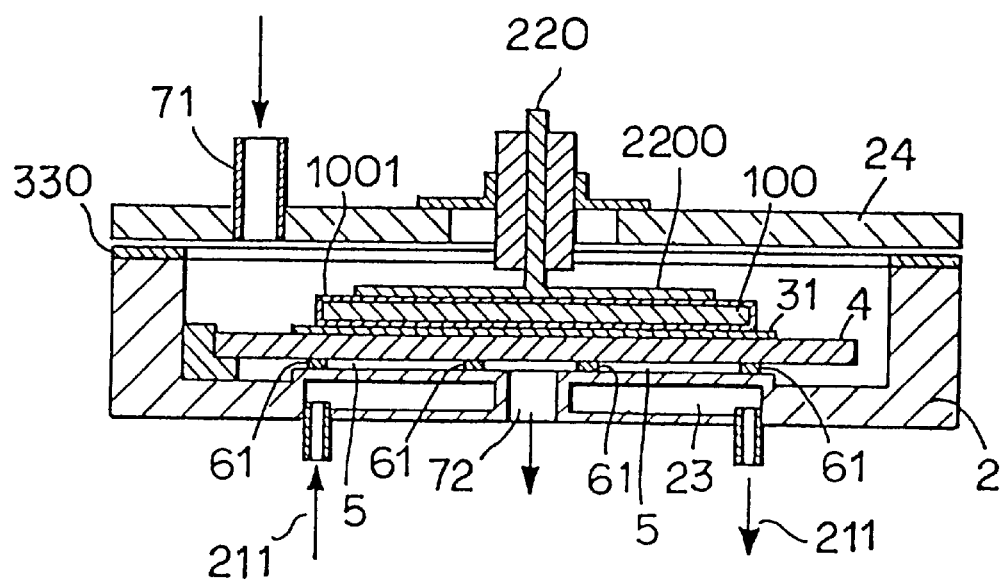
FIG. 48 is a sectional view showing an ozone generating apparatus in a thirty-third embodiment of the present invention.

FIG. 48 is a sectional view showing the embodiment 33 of the present invention. In the embodiment, there is provided a small-capacity ozone generating apparatus including one discharge space 5. A cavity 23 is provided in a grounded electrode 2 at its bottom portion to circulate cooling water 211, and an upper plate 24 is mounted on an upper surface of a peripheral side surface through a gas sealing rubber plate 330. Thus, the grounded electrode 2 is completely sealed except a gas supply port 71 and a gas exhaust port 72. A ceramics plate 4 is mounted through a spacer 61 onto an inside bottom surface of the grounded electrode 2 to define the discharge space 5.

Reference numeral 220 means a power supply terminal to feed high voltage, and a power supply plate 2200 is connected to a distal end of the power supply terminal 220. The power supply plate 2200 presses a stress buffer plate 100, and the stress buffer plate 100 presses the ceramics plate 4 through a conduction layer 31, thereby keeping an appropriate air gap length of the discharge space 5. Further, a surface of the stress buffer plate 100 is coated with a conductive thin film 1001, and the power supply plate 2200 is electrically connected to the conduction layer 31 through the thin film 1001. In such a structure, the stress buffer plate 100 may be made of a wide variety of insulating materials. Since the surface of the stress buffer plate 100 is coated with the conductive thin film 1001, no electric field is established in the stress buffer plate 100. Accordingly, a plate material is not degraded due to generation of void discharge.

A raw gas for generating ozone is introduced through the gas supply port 71 into a space defined by the grounded electrode 2 and the upper plate 24. A high-voltage electric field is applied to the discharge space 5 between the conduction layer 31 and the grounded electrode 2. Thus, the raw gas is partially ozonized in the discharge space 5 and is exhausted as an ozonized gas containing ozone through the gas exhaust port 72.

Embodiment 34

Figure 49A:
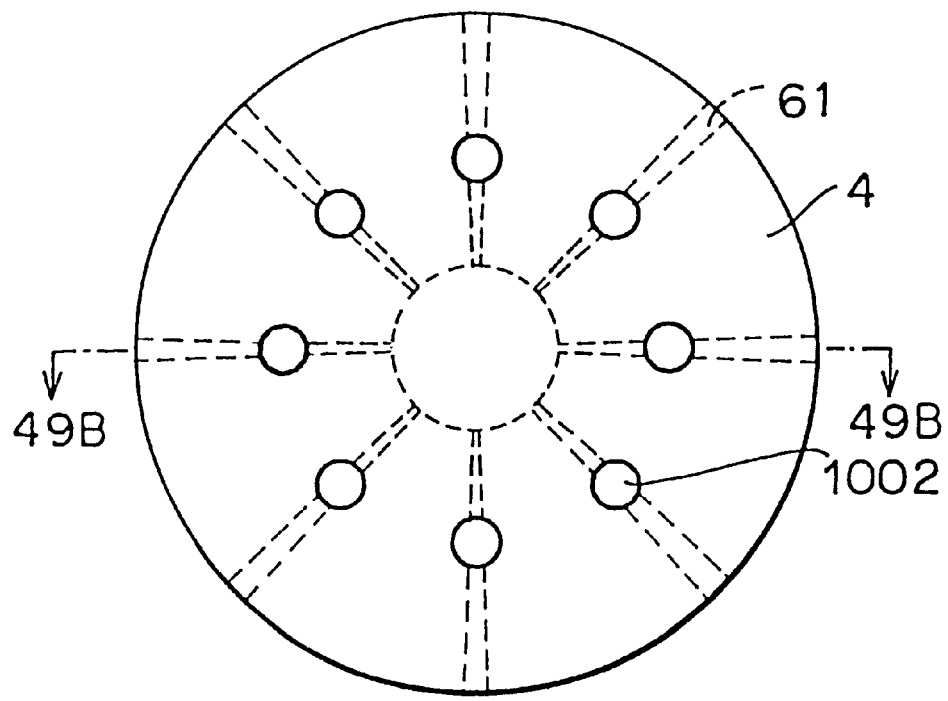
FIGS. 49A and 49B are a partially omitted front and perspective view and a sectional view showing an ozone generating apparatus in a thirty-fourth embodiment of the present invention.
Figure 49B:
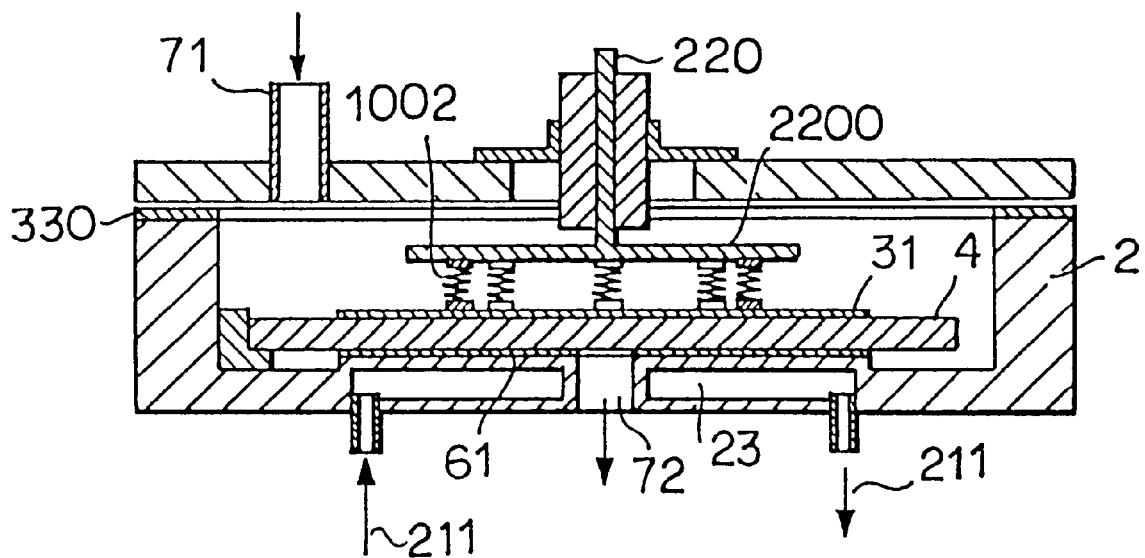

FIGS. 49A and 49B are views showing the embodiment 34 of the present invention. FIG. 49A is a partially omitted front and perspective view showing a position relationship between spacers 61 and stress buffer members (elastic bodies) 1002, and FIG. 49B is a sectional view taken along line 49B—49B of FIG. 49A.

In the embodiment, the stress buffer member 1002 includes a spring-like member, and a plurality of stress buffer members 1002 are respectively disposed on the spacers 61. It is possible to facilitate adjustment of load applied to a ceramics plate 4 by using the spring-like members as the stress buffer members 1002. Further, it is possible to avoid damage to the ceramics plate 4 by mounting the stress buffer members 1002 on the spacers 61. In addition, the stress buffer members 1002 are disposed at a position where the grounded electrode 2 is deflected to the maximum extent, that is, above a center position of a cavity 23. Thus, the ceramics plate 4 is deformed according to deflection of the grounded electrode 2, thereby keeping a constant air gap length of a discharge space 5.

Embodiment 35

FIGS. 50A and 50B are views showing the embodiment 35 of the present invention. FIG. 50A is a partially omitted front and perspective view showing a position relationship between spacers 61 and stress buffer members 1002, and FIG. 50B is a sectional view taken along line 50B—50B of FIG. 50A.

In the embodiment, a member 2210 made of insulating material is interposed between a rubber plate 330 and a power supply plate 2200. Thus, load applied to a ceramics plate 4 can be absorbed by the member 2200 so that no load is applied to a power supply terminal 220. As a result, the power supply terminal 220 is never broken due to repulsion from the stress buffer members 1002.

Embodiment 36

Figure 51A:
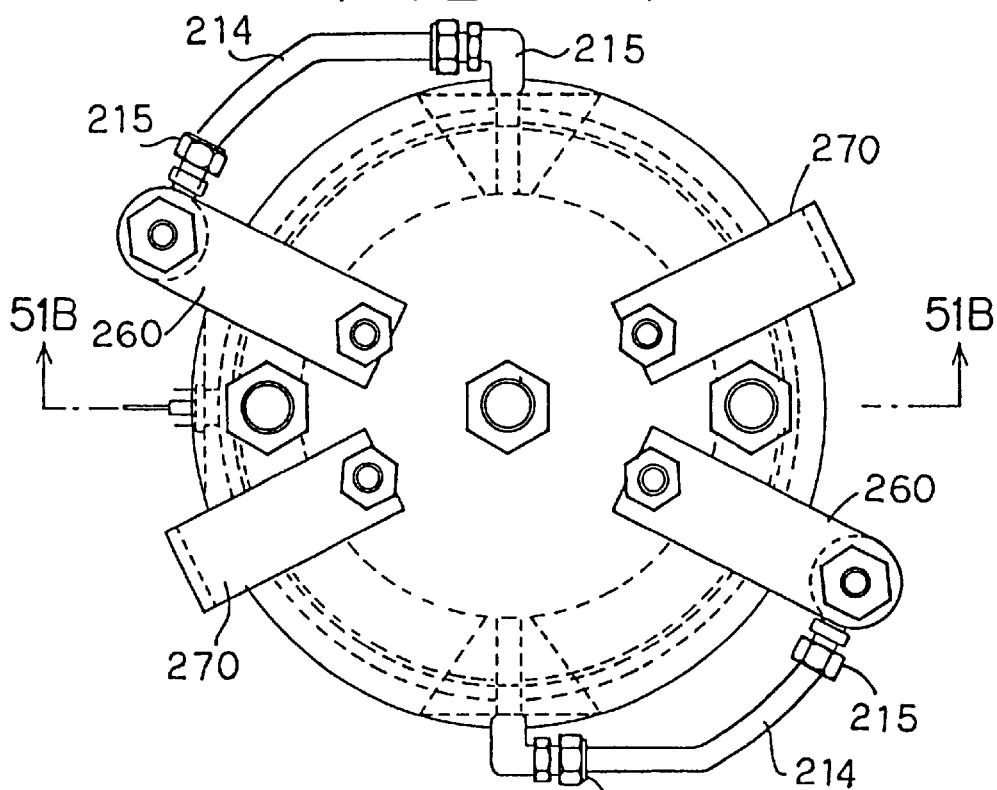
FIGS. 51A and 51B are a plan view and a sectional view showing a thirty-sixth embodiment of the present invention.
Figure 51B:
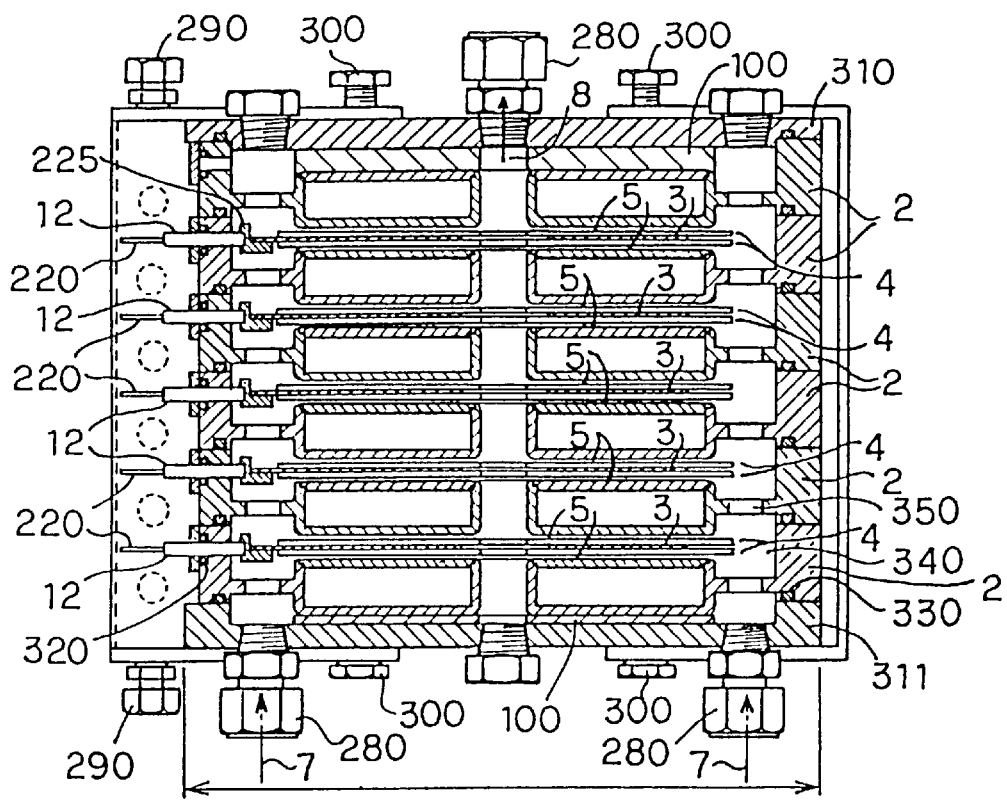

FIGS. 51A and 51B are a plan view and a sectional view showing the embodiment 36 of the present invention. In the embodiment, as shown in FIG. 51B which is a sectional view taken along line 51B—51B of FIG. 51A, when ozone generating units are stacked, ends of grounded electrodes 2 of the ozone generating units define a sealed space except gas coupling holes 350 to pass a gas and discharge spaces 5. In the drawing, reference numeral 225 means a high voltage supply joint to feed high voltage to electrodes 3, 260 is pressing cooling water joints to press the stacked ozone generating units, 270 is pressing plates to press the ozone generating units, 280 is gas joints for the ozone generating unit, and 290 is cooling joints for the ozone generating unit. Further, reference numeral 300 means ozone generating unit pressing bolts, 310 is ozone generating unit upper plates, 311 is an ozone generating unit bottom plate, 320 is a fuse stopping O-ring, 330 is a gas sealing O-ring, 340 is a gas supply chamber to supply a gas into the discharge spaces 5, and 350 is a gas coupling hole to feed the gas for ozone generation into the gas supply chambers.

An O-ring groove is circumferentially provided in a peripheral portion of a single side of the grounded electrode 2 in the embodiment. When the ozone generating units are stacked, the O-ring 330 is fitted into the O-ring groove, thereby preventing gas leakage from the gas supply chamber 340. The gas is supplied into an ozone generating apparatus in the embodiment from a direction of the arrow 7 to pass through the gas joints 280, the gas coupling hole 350, the gas supply chamber 340, and is supplied into the discharge spaces 5 of the ozone generating units. Further, the gas contains an ozone gas generated by discharge between electrodes 2 and 3 in the discharge space 5, and is finally exhausted through the gas supply joint 280 in a direction of the arrow 8.

In the embodiment, as set forth above, the gas supply chamber 340 can be defined by the grounded electrodes 2 by simply stacking the ozone generating units. It is thereby possible to eliminate the need for a vessel to contain the stacked ozone generating units so as to form a gas passage.

Embodiment 37

In the above embodiments, the gas exhaust port (or the gas supply port) is provided at the intermediate portion of the electrode, and the gas flows from the outer peripheral portion to the intermediate portion, or from the intermediate portion to the outer peripheral portion. However, there may be employed a structure as shown in FIG. 52, in which a gas supply port 71 and a gas exhaust port 72 are provided for each ozone generating unit including one discharge space, and spacers 61 are provided in such a way that one pair of combs are alternately combined to form a non-discharge portion causing no discharge. It is thereby possible to alternately pass the gas in the discharge space from side to side in the drawing. In the drawing, reference numeral 2 means a grounded electrode, and 71 and 72 are the gas supply port and the gas exhaust port. Reference numeral 61 means a spacer to form a non-discharge portion, and the gas introduced through the supply port 71 is converted into ozone at a discharge portion, flows in a direction of the arrow 81 in the drawing, and is exhausted through the exhaust port 72. In a conventional ozonizer shown in FIGS. 2A and 2B, a uniform air gap length of the discharge space can not be ensured, a gas flow in a discharge space can not be specified, and a gas does not flow in the partial ozonizer even in case the discharge is caused. However, it is possible to overcome the above problems and obtain efficient ozone generation by passing the gas as in the embodiment. Needless to say, it is also possible to avoid the gas leakage from the discharge space by using, as in the prior art, a sealing member made of silicone rubber or the like at the outer peripheral portion of the electrode shown in FIG. 52.

As set forth above, in the ozone generating apparatus according to the present invention, the gas pressure in the discharge space is set to one atmosphere or more, and the discharge gap length of the discharge space is set to 0.4 mm or less. Consequently, highly efficient ozone generation can be realized in the high ozone concentration area. As a result, it is possible to provide a highly efficient and high concentration ozone generating apparatus.

In the ozone generating apparatus, when the nitrogen rate is higher than the oxygen rate, and the discharge gap length set to 0.6 mm or less, the product pd of the gas pressure p and the discharge gap length d is set to a value of 120 Torr·cm or more. In this case, even when the nitrogen-rich raw gas is employed, it is possible to reduce production of the nitrogen oxide, and generate high concentration ozone at high efficiency. As a result, it is possible to provide a highly efficient and high concentration ozone generating apparatus.

In the ozone generating apparatus, when the non-discharge portions are dispersed and disposed to cover the entire area of the discharge space, it is possible to realize the discharge space having the uniform and very short air gap, thereby cooling the gas at high efficiency and reducing the thermal decomposition process of the ozone. When the plurality of ozone generating units are used to form the large-capacity ozone generating apparatus, some effects can be obtained. For example, the good air gap accuracy causes no variation in the gas flow rate in the discharge spaces and no variation in the discharge power supplied into the discharge spaces. Further, it is possible to provide a highly efficient large-capacity ozone generating apparatus.

In the ozone generating apparatus, the electrode of the ozone generating unit may be provided in the flat form. As a result, there is an effect in that the discharge space having the uniform and very short air gap can be extremely easily formed.

In the ozone generating apparatus, the adjacent ozone generating units may be opposed and stacked such that the adjacent electrodes are held at the same potential. As a result, there is an effect in that a compact ozone generating apparatus can be provided to have a simple structure.

In the ozone generating apparatus, the high voltage having anti-phases may be respectively applied to the two electrodes so that the insulating distance can be reduced. In addition to the above effects, there are other effects in that, for example, a more compact ozone generating apparatus can be realized.

In the ozone generating apparatus, when voltage is applied to only the discharge space, and no power is supplied to the non-discharge portion, no induced current flows in the non-discharge portion. As a result, in addition to the above effects of the invention, there is other effects in that, for example, power can be efficiently poured into the discharge portion.

In the ozone generating apparatus, the area of the non-discharge portion may be set in the approximate range of 0.5 to 120% of the area of the discharge portion. As a result, there are effects in that, for example, a 10% or more rise of the ozone generating efficiency can be realized.

In the ozone generating apparatus, the electrode and the non-discharge portion may be integrally formed. As a result, there is an effect that it is possible to provide an inexpensive ozone generating apparatus which includes a small number of parts and can be easily fabricated.

In the ozone generating apparatus, the convex portion and the concave portion may be provided in the surface of the metallic electrode to form the discharge portion and the non-discharge portion. As a result, there is an effect that it is possible to provide an inexpensive ozone generating apparatus which includes a small number of parts and can be easily fabricated.

In the ozone generating apparatus, the dielectric and the non-discharge portion may be integrally formed. As a result, there is an effect that it is possible to provide an inexpensive ozone generating apparatus which includes a small number of parts, and can be easily fabricated.

In the ozone generating apparatus, the convex portion and the concave portion may be provided for the surface of the dielectric to form the discharge portion and the non-discharge portion. As a result, there is an effect that it is possible to provide an inexpensive ozone generating apparatus which includes a small number of parts, and can be easily fabricated.

In the ozone generating apparatus, the surface of the electrode may be cut to form the convex portion and the concave portion. As a result, there is an effect in that it is possible to provide an inexpensive ozone generating apparatus which can be easily machined and includes a small number of parts.

In the ozone generating apparatus, the same or different types of materials may be deposited on the surface of the electrode to form the concave portion and the convex portion. As a result, there is an effect that it is possible to provide an inexpensive ozone generating apparatus which can be easily machined and includes a small number of parts.

In the ozone generating apparatus, the surface of the dielectric may be cut to form the convex portion and the concave portion. As a result, there is an effect that it is possible to provide an inexpensive ozone generating apparatus which can be easily machined and includes a small number of parts.

In the ozone generating apparatus, the same or different types of materials may be deposited on the surface of the dielectric to form the concave portion and the convex portion. As a result, there is an effect that it is possible to provide an inexpensive ozone generating apparatus which can be easily fabricated and includes a small number of parts.

In the ozone generating apparatus, the electrode, the non-discharge portion and the dielectric may be integrally formed. As a result, there is an effect that it is possible to provide an inexpensive ozone generating apparatus which can be easily fabricated and includes a small number of parts.

In the ozone generating apparatus, the electrode may be fitted with the dielectric. As a result, in addition to the effects of the invention, there is an effect in that the position accuracy of the electrode can be enhanced.

In the ozone generating apparatus, the discharge portion and the non-discharge portion may be provided to define the gas passage. As a result, there are effects in that, for example, the discharge space having the very short air gap can be realized, the gas can be cooled at high efficiency, and the thermal decomposition process of the ozone can be reduced.

In the ozone generating apparatus, the gas passage may be provided in the radial form. As a result, there are effects in that, for example, the discharge space having the uniform and very short air gap can be realized, the gas can be cooled at high efficiency, and the thermal decomposition process of the ozone can be reduced.

In the ozone generating apparatus, the gas passage may be provided in the spiral form. As a result, in addition to the effects of the invention, there are effects in that, for example, the uniform gas flow can be provided.

In the ozone generating apparatus, the non-discharge members may be disposed in the stepping stone fashion. As a result, there are effects in that the discharge space having the uniform and very short air gap can be realized, the gas can be cooled at high efficiency, and the thermal decomposition process of the ozone can be reduced.

In the ozone generating apparatus, the gas may be supplied through the center portion, and may be exhausted to the outer peripheral portion. As a result, there are effects in that the gas passage can be provided to have low pressure loss, the amount of moisture in the discharge space is not increased even in case of the water leakage, and the ozone generating efficiency is not reduced.

In the ozone generating apparatus, the gas may be introduced from the outer peripheral portion of the ozone generating unit to the center portion. As a result, in addition to the effects of the invention, there are effects in that, for example, a relatively low pressure loss can be provided in the gas downstream area, and the amount of moisture in the discharge space is not increased.

In the ozone generating apparatus, the spacer may be provided to form the non-discharge portion. As a result, there are effects in that, for example, a good air gap accuracy can be ensured between the electrodes of the ozone generating unit, the discharge space can be optionally defined so as to realize the discharge space having the uniform and very short air gap, and high concentration ozone can be generated in a compact shape.

In the ozone generating apparatus, the spacer may be made of metal. As a result, there are effects in that sufficient rigidity can be ensured, the air gap length accuracy can be made higher, and the discharge portion and the non-discharge portion can be easily provided by using electrical conductivity of the spacer.

In the ozone generating apparatus, the spacer may include the dielectric. As a result, there is an effect in that the discharge portion and the non-discharge portion can be easily provided by using non-conductive of the spacer.

In the ozone generating apparatus, the spacer may be provided in the flat form. As a result, there is an effect in that a highly accurate air gap length can be easily provided.

In the ozone generating apparatus, the spacer may be provided in the thread-like form. As a result, there is an effect in that an optional air gap length can be provided at low cost.

In the ozone generating apparatus, the spacers may be dispersed and disposed to cover the entire area of the electrode. As a result, there is an effect in that the discharge space having the uniform and very short air gap can be realized.

In the ozone generating unit, the elastic body may be mounted onto the back face of one of the electrodes to cover substantially the entire back face of the electrode. As a result, there are effects in that breakage of the dielectric and reduction of the air gap accuracy of the discharge space can be avoided in advance, and a stable ozone generating apparatus can be realized.

In the ozone generating apparatus, the elastic body may include the spring body. As a result, there is an effect of providing an inexpensive elastic body which can be easily mounted and replaced.

In the ozone generating apparatus, the elastic body may include an annular spring body. As a result, there is an effect in that gas leakage can be completely avoided.

In the ozone generating apparatus, a gap may be partially provided in the annular elastic body. As a result, there is an effect in that no stress is applied to the elastic body portion and the dielectric portion even when the outside atmospheric pressure is varied.

In the ozone generating apparatus, the elastic body may be made of Kovar material. As a result, there is an effect in that the elastic body can be provided at low cost.

In the ozone generating apparatus, the elastic body may be provided so as to apply the load according a predetermined formula to the dielectric. As a result, there is an effect in that the discharge space can be kept to ensure a constant air gap length without breakage of the dielectric.

In the ozone generating apparatus, the elastic body may be contracted or expanded according to its spring constant by a length found according to a predetermined formula to apply the load according to a predetermined formula to the dielectric. As a result, there is an effect in that the discharge space can be ensured to have a constant air gap length without breakage of the dielectric.

In the ozone generating apparatus, the elastic body may be made of the material having ozone resistance. As a result, there is an effect in that an ozone generating apparatus can be provided to have high durability.

In the ozone generating apparatus, fluoroplastic may be applied to a partial or entire surface of the elastic body. As a result, there is an effect in that an ozone generating apparatus can be provided to have high ozone resistance and high durability.

In the ozone generating apparatus, the elastic body may be entirely made of fluoroplastic. As a result, there is an effect in that an ozone generating apparatus can be provided to have high ozone resistance and high durability.

In the ozone generating apparatus, the elastic body may be made of ethylene propylene rubber. As a result, there is an effect in that an ozone generating apparatus can be provided to have high ozone resistance and high durability.

In the ozone generating apparatus, the electrode and the elastic body may be formed by molding process. As a result, in addition to the effects of the invention, there are effects in that, for example, gas leakage at the elastic body portion can be avoided.

In the ozone generating apparatus, the elastic body may be surrounded by the electrodes at the same potential. As a result, in addition to the effects of the invention, there are effects in that: no electric field is not generated in the elastic body, and material is not degraded due to generation of the void discharge.

In the ozone generating apparatus, at a rate of one elastic body to the plurality of ozone generating units, the elastic body may be interposed between the ozone generating units. As a result, there are effects in that breakage of the dielectric and reduction of the air gap accuracy of the discharge space can be avoided in advance, and the number of parts can be reduced to realize cost reduction.

In the ozone generating apparatus, the ozone generating units may be respectively positioned by the supporting poles. As a result, there are effects in that the electrodes can be easily positioned during installation of the electrodes in the ozone generating units, and maintenance can be carried out in a short time.

In the ozone generating apparatus, the supporting poles may be provided to have a cage-shaped form. As a result, there are effects in that the component parts can be more easily positioned in the ozone generating units at lower cost.

In the ozone generating apparatus, -the elastic body may be provided to press the ozone generating unit. As a result, there are effects in that, for example, the discharge space can be stably supported, and breakage of the dielectric and reduction of the air gap accuracy of the discharge space can be avoided in advance.

In the ozone generating apparatus, the refrigerant passing mechanism for passing the refrigerant may be disposed adjacent to at least one of the electrodes of the ozone generating unit. As a result, there are effects in that, for example, the ozone generating unit can be assembled with the ozone generating unit taken out of the ozone generating apparatus main bony, and the assembly operation is facilitated and water leakage hardly occurs in the main body.

In the ozone generating apparatus, when one ozone generating unit is stacked and disposed adjacent to the other ozone generating unit, at least one of the electrodes of the one ozone generating unit and an electrode of the other ozone generating unit may define the sealed space to pass the gas only between the electrodes of the ozone generating unit and through the adjacently stacked ozone generating units. As a result, some effects can be obtained. For example, when the ozone generating units are stacked to provide an ozone generating apparatus having a multi-stage structure, no vessel is required to accommodate the ozone generating units and form the gas passage for ozonizing the gas. Further, the ozone generating apparatus can be provided to have the multi-stage structure by simply stacking the ozone generating units.

In the ozone generating apparatus, the vessel for accommodating the ozone generating units may be provided, and the vessel may be provided with the sliding means for sliding the vessel. As a result, there are effects of, for example, facilitation of operation such as assembly operation, check operation, replacement operation for the ozone generating unit.

In the ozone generating apparatus, non-discharge portions may be provided in such a way that one pair of combs are alternately combined. As a result, there are effects in that, for example, a gas can uniformly flow along the non-discharge portion, and the ozone can be efficiently generated.

In the ozone generating apparatus, the water channel may be provided in the electrode to pass the cooling water, thereby efficiently avoiding a rise of temperature of the electrode,. and efficiently generating the ozone. Further, there are effects in that, for example, an inexpensive and light metallic electrode having a high cooling performance can be employed.

In the ozone generating apparatus, the water channel may be partially provided with a small sectional area, When the cooling water is applied to the plurality of electrodes in parallel, there is no risk that a great amount of cooling water is applied to only partial electrodes, and a uniform amount of cooling water can flow between the electrodes. As a result, there is an effect in that a stable ozone generating apparatus can be provided to cause no variation in a cooling performance.

In the ozone generating apparatus, the water channel may be partially provided with the by-pass for removing bubbles. As a result, there are effects in that, for example, the bubbles can be removed immediately after generation thereof, and a cooling performance is not degraded due to the bubbles.

In the ozone generating apparatus, the moving means may be provided for the electrode. As a result, some effects can be obtained. For example, when the dielectric is inserted in or removed from between the electrodes, the inserting operation or the removing operation can be easily carried out. Further, breakage of the dielectric can be avoided during the operations.

In the ozone generating apparatus, the positioning means for positioning the dielectric may be attached to the electrode. As a result, there is an effect in that a high position accuracy can be easily obtained by simply interposing the dielectric between the electrodes.

In the ozone generating apparatus, the concave portion may be provided in the electrode, and the spacer may be partially provided with the fitting portion for fitting with the concave portion. As a result, there is an effect in that the spacer can be easily interposed between the electrodes even when a plurality of ozone generating units are stacked in a horizontal direction.

In the ozone generating apparatus, the electrode may be formed by holding the metal having high coefficient of heat transfer between the metallic plates having low coefficient of heat transfer. As a result, some effects can be obtained. For example, it is possible to provide a light capacity water channel for the cooling water so as to use a thin metallic plate having low coefficient of heat transfer, resulting in enhancement of a heat removing efficiency. Further, it is also possible to improve an air gap length accuracy of the discharge space.

In the ozone generating apparatus, the space may be provided in one of the electrodes to accommodate the other electrode, and power may be supplied to the accommodated electrode through the power supply terminal. As a result, there is an effect in that the ozone generating apparatus can be provided to have a compact shape.

In the ozone generating apparatus, the elastic body may be mounted to the back face of the electrode at a position corresponding to the mounting position of the spacer. As a result, there is an effect in that the dielectric is never broken due to pressure of the elastic body.

While preferred embodiments of the invention have been described using specific terms, such description is for illustrative purposes only, and it is to be understood that changes and variations may be made without departing from the spirit or scope of the following claims.

What is claimed is:

1. An ozone generating apparatus comprising at least one ozone generating unit, said at least one ozone generating unit including:
   two electrodes mutually opposed to generate a voltage discharge in response to high voltage applied therebetween;
   at least one dielectric interposed between the electrodes; and
   a gas supply mechanism to supply an oxygen-containing gas between the electrodes so as to generate ozone by the voltage discharge;
   wherein a discharge space has a gas pressure of one atmosphere (760 Torr) or more, the discharge space has a discharge gap length of 0.4 mm or less, and a product of the gas pressure and the discharge gap length is set to a value of 30 Torr·cm or less.

2. An ozone generating apparatus comprising at least one ozone generating unit, said at least one ozone generating unit including:
   two electrodes mutually opposed to generate a voltage discharge in response to high voltage applied therebetween;
   at least one dielectric interposed between the electrodes; and
   a gas supply mechanism to supply an oxygen and nitrogen-containing gas between the electrodes so as to generate ozone by the voltage discharge;
   wherein a nitrogen rate is higher than an oxygen rate, and a product pd of a gas pressure p of a discharge space and a discharge gap length d of the discharge space is set to a value of 120 Torr·cm or more when the discharge gap length is equal to or less than 0.6 mm.

3. An ozone generating apparatus comprising at least one ozone generating unit, said at least one ozone generating unit including:
   two electrodes mutually opposed to generate a voltage discharge in response to high voltage applied therebetween, each electrode having at least one flat surface which is parallel to at least one flat surface of the other electrode;
   at least one dielectric interposed between the electrodes to provide insulation between the electrodes;
   a gas supply mechanism to supply an oxygen-containing gas between the electrodes so as to generate ozone by the voltage discharge; and
   non-discharge portions generating no discharge dispersed over substantially an entire surface of at least one of said two electrodes and between said two electrodes to maintain a constant air gap length of the ozone generating unit.

4. An ozone generating apparatus comprising at least one ozone generating unit, said at least one ozone generating unit including:
   two electrodes mutually opposed to generate a voltage discharge in response to high voltage applied therebetween;
   at least one dielectric interposed between the electrodes to provide insulation between the electrodes;
   a gas supply mechanism to supply an oxygen-containing gas between the electrodes so as to generate ozone by the voltage discharge; and
   non-discharge portions generating no discharge dispersed over substantially an entire surface of at least one of said two electrodes and between said two electrodes to maintain a constant air gap length of the ozone generating unit;
   wherein adjacent units in the ozone generating unit are mutually opposed and stacked such that adjacent electrodes of the adjacent ozone generating units are held at the same potential.

5. An ozone generating apparatus according to claim 3, wherein high voltage having anti-phases are applied to the two electrodes.

6. An ozone generating apparatus according to claim 3, wherein a conduction layer is formed on the dielectric at an area substantially corresponding to a discharge portion causing discharge between the electrodes of the ozone generating unit, and the conduction layer being employed as at least one of the electrodes.

7. An ozone generating apparatus according to claim 3, wherein an area of the non-discharge portion is set in an approximate range of 0.5 to 120% of an area of the discharge portion causing the discharge.

8. An ozone generating apparatus according to claim 3, wherein one of the electrodes of the ozone generating unit is grounded, and the grounded electrode and the non-discharge portion being integrally formed with each other.

9. An ozone generating apparatus according to claim 8, wherein at least one of the electrodes of the ozone generating unit is made of metal, a convex portion and a concave portion being provided for a surface of the metallic electrode, and the convex portion and the concave portion forming the non-discharge portion and a discharge portion causing the discharge.

10. An ozone generating apparatus according to claim 3, wherein the dielectric and the non-discharge portion of the ozone generating unit are integrally formed with each other.

11. An ozone generating apparatus according to claim 10, wherein a convex portion and a concave portion are provided for a surface of the dielectric of the ozone generating unit, and the convex portion and the concave portion forming the non-discharge portion and a discharge space for the discharge.

12. An ozone generating apparatus according to claim 11, wherein a surface of the electrode of the ozone generating unit is cut to form the convex portion and the concave portion.

13. An ozone generating apparatus according to claim 11, wherein the same or different types of materials are deposited on a surface of the electrode of the ozone generating unit to form the convex portion and the concave portion.

14. An ozone generating apparatus according to claim 11, wherein a surface of the dielectric of the ozone generating unit is cut to form the convex portion and the concave portion.

15. An ozone generating apparatus according to claim 11, wherein the same or different types of materials are deposited on the surface of the dielectric of the ozone generating unit to form the convex portion and the concave portion.

16. An ozone generating apparatus according to claim 3, wherein at least one of the electrodes, the non-discharge portion, and the dielectric of the ozone generating unit are integrally formed.

17. An ozone generating apparatus according to claim 3, wherein at least one of the electrodes of the ozone generating unit is fitted with the dielectric.

18. An ozone generating apparatus according to claim 3, wherein a gas passage for passing the gas is defined by a discharge portion and the non-discharge portion in the ozone generating unit.

19. An ozone generating apparatus according to claim 18, wherein the non-discharge portion is disposed so as to provide the gas passage in a radial form.

20. An ozone generating apparatus according to claim 18, wherein the non-discharge portion is disposed so as to provide the gas passage in a spiral form.

21. An ozone generating apparatus comprising at least one ozone generating unit, said at least one ozone generating unit including:

two electrodes mutually opposed to generate a voltage discharge in response to high voltage applied therebetween;

at least one dielectric interposed between the electrodes to provide insulation between the electrodes;

a gas supply mechanism to supply an oxygen-containing gas between the electrodes so as to generate ozone by the voltage discharge; and non-discharge portions generating no discharge dispersed over substantially an entire surface of at least one of said two electrodes and between said two electrodes to maintain a constant air gap length of the ozone generating unit;

wherein non-discharge members are disposed in stepping stone fashion between the electrodes of the ozone generating unit so as to form the non-discharge portion.

22. An ozone generating apparatus according to claim 18, wherein the gas supply mechanism supplies the gas between the electrodes through a center portion of the electrode of the ozone generating unit, and exhausts the gas to an outer peripheral portion of the electrode along the gas passage.

23. An ozone generating apparatus according to claim 18, wherein the gas supply mechanism supplies the gas between the electrodes from the outer peripheral portion of the electrode of the ozone generating unit, and exhausts to a center portion of the electrode along the gas passage.

24. An ozone generating apparatus comprising at least one ozone generating unit, said at least one ozone-generating unit including:

two electrodes mutually opposed to generate a voltage discharge in response to high voltage applied therebetween. each electrode having at least one flat surface which is parallel to at least one flat surface of the other electrode;

at least one dielectric interposed between the electrodes to provide insulation between the electrodes;

a gas supply mechanism to supply an oxygen-containing gas between the electrodes so as to generate ozone by the voltage discharge; and a spacer inserted into a discharge space between said electrodes causing the discharge to maintain a constant air gap length between the electrodes of the ozone generating unit, the spacer being dispersed over substantially an entire surface of at least one of said two electrodes and between said two electrodes to maintain a constant air gap length of the ozone generatinq unit;

wherein said spacer forms a non-discharge portion causing no discharge.

25. An ozone generating apparatus according to claim 24, wherein the spacer is made of metal.

26. An ozone generating apparatus according to claim 24, wherein the spacer includes a dielectric.

27. An ozone generating apparatus according to claim 24, wherein the spacer is provided in a flat form.

28. An ozone generating apparatus according to claim 24, wherein the spacer is provided in a thread-like form.

29. An ozone generating apparatus comprising at least one ozone generating unit including:

two electrodes mutually opposed to generate a voltage discharge in response to high voltage applied therebetween;

at least one dielectric interposed between the electrodes to provide insulation between the electrodes; and a gas supply mechanism to supply an oxygen-containing gas between the electrodes so as to generate ozone by the voltage discharge;

wherein an elastic body is mounted onto a back face of one of the electrodes of the ozone generating unit to cover substantially the entire back face of the electrode.

30. An ozone generating apparatus according to claim 29, wherein the elastic body includes a spring body.

31. An ozone generating apparatus according to claim 30, wherein the elastic body includes an annular spring body.

32. An ozone generating apparatus according to claim 31, wherein an annular portion of the elastic body is partially provided with a gap to discharge air from the elastic body.

33. An ozone generating apparatus according to claim 30, wherein the elastic body includes an elastic body made of Kovar material.

34. An ozone generating apparatus according to claim 29, wherein, when $q_d$ means load applied by the elastic body to the dielectric, the load $q_d$ is set to meet the expression:

$$q_d \approx q_e \times (E_d/E_e) \times (t_d/t_e)^3$$

where $E_e$ means Young's modulus of the electrode, $t_e$ is a thickness of the electrode, $E_d$ is Young's modulus of the dielectric, $t_d$ is a thickness of the dielectric, and $q_e$ is a pressure difference applied to the electrode.

35. An ozone generating apparatus according to claim 32, wherein, when the elastic body includes n spring bodies having a spring constant k (kgf/mm), a relational expression $q_d \cdot S = nkl$ is held, provided that the load $q_d$ applied by the elastic body to the dielectric is a value meeting the expression:

$$q_d \bigcirc q_e \cdot (E_d/E_e) \cdot (t_d/t_e)^3$$

where S is a surface area of the electrode, n is a number of spring bodies, $E_e$ is Young's modulus of the electrode, $t_e$ is a thickness of the electrode, $E_d$ is Young's modulus of the dielectric, $t_d$ is a thickness of the dielectric, and $q_e$ is a pressure difference applied to the electrode.

36. An ozone generating apparatus according to claim 29, wherein the elastic body is made of material having ozone resistance.

37. An ozone generating apparatus according to claim 29, wherein fluoroplastic is applied to a partial or entire surface of the elastic body.

38. An ozone generating apparatus according to claim 29, wherein the elastic body is entirely made of fluoroplastic.

39. An ozone generating apparatus according to claim 29, wherein the elastic body is made of ethylene propylene rubber.

40. An ozone generating apparatus according to claim 29, wherein the electrode and the elastic body are formed by molding process.

41. An ozone generating apparatus comprising at least one ozone generating unit said at least one ozone generating unit including:

two electrodes mutually opposed to generate a voltage discharge in response to high voltage applied therebetween;

at least one dielectric interposed between the electrodes to provide insulation between the electrodes;

a gas supply mechanism to supply an oxygen-containing gas between the electrodes so as to generate ozone by the voltage discharge; and a spacer disposed between said electrodes to maintain a constant air gap length of the ozone generating unit;

wherein a refrigerant passing mechanism for passing refrigerant to cool the electrodes of the ozone generating unit is disposed adjacent to at least one of the electrodes.

42. An ozone generating apparatus according to claim 3, wherein a vessel is provided to accommodate the ozone generating units, and the vessel including sliding means for sliding the vessel.

43. An ozone generating apparatus comprising at least one ozone generating unit, each unit including:

two electrodes mutually opposed to generate a voltage discharge in response to high voltage applied therebetween;

at least one dielectric interposed between the electrodes to provide insulation between the electrodes;

a gas supply mechanism to supply an oxygen-containing gas between the electrodes so as to generate ozone by the voltage discharge; and non-discharge portions comprising a pair of alternately combined combs disposed between said electrodes.

44. An ozone generating apparatus according to claim 3, wherein a water channel for passing cooling water is provided in at least one of the electrodes.

45. An ozone generating apparatus according to claim 44, wherein the water channel is provided with a port having a smaller sectional area than a sectional area of said channel.

46. An ozone generating apparatus according to claim 44, wherein the water channel is provided with a by-pass for removing bubbles.

47. An ozone generating apparatus according to claim 3, wherein at least one of the electrodes is provided with moving means for moving the electrode.

48. An ozone generating apparatus according to claim 3, wherein at least one of the electrodes is provided with positioning means for setting a position of the dielectric.

49. An ozone generating apparatus according to claim 24, wherein a concave portion for anchoring the spacer is provided in at least one of the electrodes, and the spacer is partially provided with a fitting portion for fitting with the concave portion in the electrode.

50. An ozone generating apparatus according to claim 3, wherein at least one of the electrodes is formed by holding metal having high coefficient of heat transfer between two metallic plates having low coefficient of heat transfer.

51. An ozone generating apparatus according to claim 3, wherein a space is provided in one of the electrodes to accommodate the other electrode and the dielectric therein, and a power supply terminal being mounted to supply high voltage to the accommodated electrode.

52. An ozone generating apparatus according to claim 24, wherein an elastic body is mounted to a back face of one of the electrodes of the ozone generating unit at a position corresponding to a mounting position of the spacer.

* * * * *